(12) United States Patent
Watanabe et al.

(10) Patent No.: US 7,405,889 B2
(45) Date of Patent: Jul. 29, 2008

(54) OPTICAL SYSTEM AND IMAGING SYSTEM INCORPORATING IT

(75) Inventors: Masahito Watanabe, Hachioji (JP); Kazuteru Kawamura, Hachioji (JP)

(73) Assignee: Olympus Imaging Corp. and Olympus Corporation, Tokyo (JP)

( * ) Notice: Subject to any disclaimer, the term of this patent is extended or adjusted under 35 U.S.C. 154(b) by 233 days.

(21) Appl. No.: 11/210,809

(22) Filed: Aug. 25, 2005

(65) Prior Publication Data
US 2006/0056067 A1    Mar. 16, 2006

(30) Foreign Application Priority Data
Aug. 26, 2004  (JP) ............................. 2004-246220
May 20, 2005  (JP) ............................. 2005-147615

(51) Int. Cl.
G02B 9/00    (2006.01)
G02B 15/14   (2006.01)

(52) U.S. Cl. ........................... 359/754; 359/691
(58) Field of Classification Search ........... 359/691, 359/754
See application file for complete search history.

(56) References Cited

U.S. PATENT DOCUMENTS

| | | | |
|---|---|---|---|
| 2,548,569 A * | 4/1951 | Tolle | 359/753 |
| 4,993,814 A | 2/1991 | Hata | |
| 5,940,220 A * | 8/1999 | Suenaga et al. | 359/660 |
| 6,025,961 A | 2/2000 | Kohno et al. | |
| 7,123,424 B2 * | 10/2006 | Sekine | 359/719 |
| 2003/0210471 A1 | 11/2003 | Mihara et al. | |

* cited by examiner

*Primary Examiner*—Scott J. Sugarman
*Assistant Examiner*—Dawayne A Pinkney
(74) *Attorney, Agent, or Firm*—Kenyon & Kenyon LLP

(57) ABSTRACT

The invention relates to an optical system that is capable of providing a zoom lens having improved image-formation capability with a reduced number of lenses, and fabricating a slim yet high-performance digital or video camera. The optical system comprises a cemented lens having a cementing surface on its optical axis. Air contact surfaces on the light ray entrance and exit sides of the cemented lens G2 are aspheric, and at least one cementing surface in the cemented lens G2 satisfies condition (1).

$$6.4 < |(r/R)| \tag{1}$$

Here r is the axial radius of curvature of the cementing surface, and R is the maximum diameter of the cementing surface.

4 Claims, 39 Drawing Sheets

OPTICAL SYSTEM AND IMAGING SYSTEM INCORPORATING IT

This application claims benefits of Japanese Application No. 2004-246220 filed in Japan on Aug. 26, 2004 and No. 2005-147615 filed in Japan on 5.20, 2005, the contents of which are herein incorporated by this reference.

BACKGROUND OF THE INVENTION

The present invention relates generally to an optical system and an imaging system incorporating it, and more particularly to a zoom lens well suitable in construction for use on digital or video cameras, in which its optical system portion is so elaborated that albeit having a high zoom ratio, it can be slimmed down with reduced influences of decentration and so little or no performance deteriorations, and an imaging system incorporating the same.

There is now a growing demand for slimming down zoom lenses in general and those for digital cameras in particular. With digital cameras using small-format image pickup devices, in general, lenses may be designed to be smaller than those used with silver halide cameras. However, lens part fabrication errors, and errors upon incorporation of lens parts in a lens barrel become relatively large, often incurring performance deteriorations due to decentration and, hence, resulting in yield drops. Often for slimming down cameras, lenses that form a zoom lens must be as few as possible, and as many aspheric surfaces as possible must be used for correction of aberrations with fewer lenses.

However, such an optical system is susceptible of image-formation capability drops by reason of relative decentration between aspheric lenses due to fabrication errors, and so it is still difficult to offer a sensible tradeoff between high-yield mass fabrication and slimming-down.

Reductions in the number of lenses through use of many aspheric surfaces, for instance, are set forth in patent publications 1, 2, 3 and 4; in any case, however, the sensitivity to decentration of aspheric surfaces in the second lens group is unacceptably high, failing to reduce the total thickness of each lens group to a sufficient level.

There are also patent publications 5, 6 and 7. However, with the zoom lens of patent publication 5 there are problems such as noticeable performance deterioration (regarding off-axis aberrations in particular) ascribable to decentration of fabrication errors of individual lenses, and inadequate correction of chromatic aberrations by reason of a small Abbe constant difference between lenses that forms a cemented lens. The zoom lenses of patent publications 5 and 6 are less than satisfactory in terms of slimming-down, because no aspheric surface is used at all.

Patent Publication 1
JP (A) 1-183616
Patent Publication 2
JP (A) 10-282416
Patent Publication 3
JP (A) 11-95102
Patent Publication 4
JP (A) 11-142734
Patent Publication 5
JP (A) 2004-102211
Patent Publication 6
JP (A) 2002-350726
Patent Publication 7
JP (A) 2004-198855

SUMMARY OF THE INVENTION

According to the first embodiment of the first aspect of the invention, there is provided an optical system comprising a cemented lens having a cementing surface on an optical axis of the optical system, wherein air contact surfaces that are on a light ray entrance side and a light ray exit side of said cemented lens are aspheric and at least one cementing surface in said cemented lens satisfies condition (1):

$$6.4 < |(r/R)| \tag{1}$$

where r is the radius of curvature of the cementing surface on the optical axis and R is the maximum diameter of the cementing surface.

According to the second embodiment of the first aspect of the invention, there is provided an optical system comprising, in order from an object side to an image plane side thereof, a first lens group having negative refracting power, and a second lens group having positive refracting power which, upon zooming, is positioned nearer to the image plane side than said first lens group with a variable spacing therebetween, wherein:

said second lens has only three lenses, a lens located in said second lens group and nearest to an image plane side thereof and a lens located on an object side thereof are provided as a cemented lens cemented at a surface on an optical axis of the optical system, and a d-line refractive index $n_{23}$ of said lens nearest to said image plane side and a d-line refractive index $n_{22}$ Of the lens cemented to the object side of said lens satisfy condition (2):

$$0.31 < |n_{22} - n_{23}| \tag{2}$$

According to the third embodiment of the first aspect of the invention, there is provided an optical system comprising, in order from an object side to an image plane side thereof, a first lens group having negative refracting power, and a second lens group having positive refracting power which, upon zooming, is positioned nearer to the image plane side than said first lens group with a variable spacing therebetween, wherein:

said second lens group has only three lenses, and a lens located in said second lens group and nearest to an image plane side thereof and a lens located on an object side thereof are provided as a cemented lens cemented at a surface on an optical axis of the optical system, and the optical system comprises an aperture stop interposed between an exit surface in said first lens group and an entrance surface of said cemented lens, wherein:

a d-line basis Abbe constant $v_{23}$ of said lens nearest to the image plane side and a d-line basis Abbe constant $n_{22}$ of the lens cemented to said lens satisfy condition (3):

$$40.3 < |v_{22} - v_{23}| \tag{3}$$

According to the first embodiment of the second aspect of the invention, there is provided an optical system comprising, in order from an object side thereof, a first lens group of negative refracting power, and a second lens group of positive refracting power, wherein:

the optical system comprises a cemented lens comprising three or more lenses including at least one negative lens, wherein the cemented lens has generally positive refracting power, and the optical system has a zoom ratio of 2 or higher, and satisfies conditions (11) and (12):

$$|F_{oc}/F_{ci}| < 0.95 \tag{11}$$

$$0.05 < D_{co}/D_{ci} < 20 \tag{12}$$

where $F_{co}$ is the focal length of the lens located in said cemented lens and nearest to its object side, $F_{ci}$ is the focal length of the lens located in said cemented lens and nearest to its image plane side, $D_{co}$ is the axial thickness of the lens located in said cemented lens and nearest to its object side, and $D_{ci}$ is the axial thickness of the lens located in said cemented lens and nearest to its image plane side.

According to the second embodiment of the second aspect of the invention, there is provided an optical system comprising, in order from an object side thereof, a first lens group of negative refracting power, and a second lens group of positive refracting power, wherein:

the optical system comprises a cemented lens comprising three or more lenses including at least one negative lens, wherein the cemented lens has generally positive refracting power, and the optical system has a zoom ratio of 2 or higher, and satisfies condition (13):

$$10<|R_1/r_1| \tag{13}$$

where $r_1$ is the radius of curvature of the surface nearest to the object side of said cemented lens, and $R_1$ is the radius of curvature of the cementing surface located in said cemented lens and nearest to its object side.

According to the third aspect of the second aspect of the invention, there is provided an optical system comprising, in order from an object side thereof, a first lens group of negative refracting power, and a second lens group of positive refracting power, wherein:

the optical system comprises a cemented lens comprising three or more lenses including at least one negative lens, wherein the cemented lens has generally positive refracting power and the object-side surface of said cemented lens is convex, and the optical system has a zoom ratio of 2 or higher, and satisfies condition (14):

$$0.7<|R_2/r_2| \tag{14}$$

where $r_2$ is the radius of curvature of the surface nearest to the image plane side of said cemented lens, and $R_2$ is the radius of curvature of the cementing surface located in said cemented lens and nearest to its image plane side.

According to the fourth embodiment of the second aspect of the invention, there is further provided an optical system comprising a cemented lens having a cementing surface on an optical axis of the optical system, wherein lenses that form said cemented lens satisfy conditions (15) and (16):

$$40<v_{max}-v_{min}<80 \tag{15}$$

$$23.7>v_{min} \tag{16}$$

where $v_{max}$ is the maximum of Abbe constants that the lenses in said cemented lens have, and $v_{min}$ is the minimum of Abbe constants that the lenses in said cemented lens have.

According to the fifth embodiment of the second aspect of the invention, there is provided an optical system comprising a cemented lens having a cementing surface on an optical axis, wherein lenses that form said cemented lens satisfy conditions (15), (16), (17), (18) and (19):

$$40<v_{max}-v_{min}<80 \tag{15}$$

$$23.7>v_{min} \tag{16}$$

$$60<v_{max} \tag{17}$$

$$1.8<n_{dmax} \tag{18}$$

$$1.55>n_{dmin} \tag{19}$$

where $v_{max}$ is the maximum of Abbe constants that the lenses in said cemented lens have, $v_{min}$ is the minimum of Abbe constants that the lenses in said cemented lens have, $n_{dmax}$ is the maximum of refractive indices that the lenses in said cemented lens have, and $n_{dmin}$ is the minimum of refractive indices that the lenses in said cemented lens have.

The present invention embraces an imaging system comprising each of such optical systems as recited above, and an electronic image pickup device for converting an optical image formed through the optical system into electric signals.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
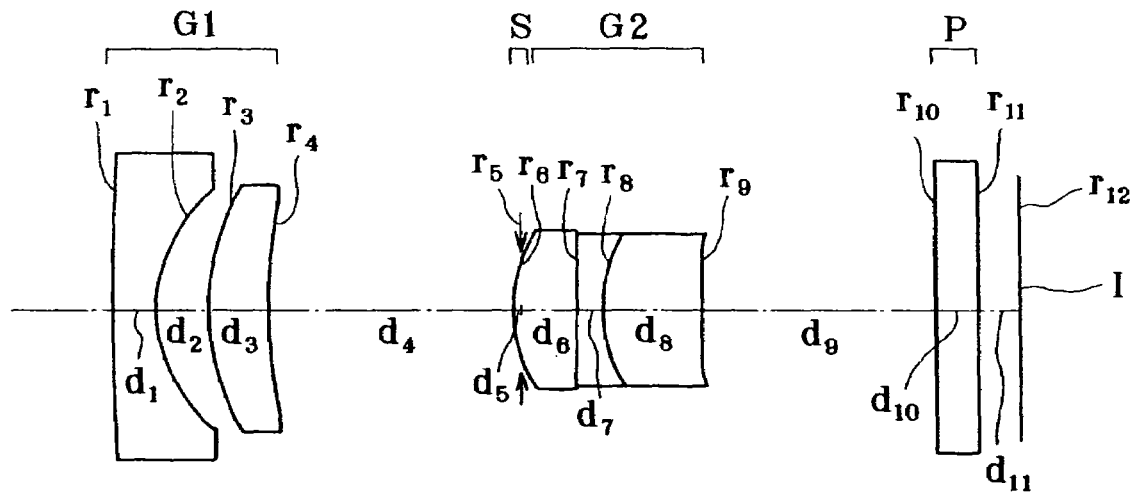
FIGS. 1(a), 1(b) and 1(c) are illustrative in lens arrangement section of Example 1 of the zoom optical system according to the invention at a wide-angle end, an intermediate setting and a telephoto end, respectively, upon focusing on an infinite object point.

First of all, possible arrangements of the optical systems according to the first and second aspects of the invention will be explained. Then, their examples will be given.

The first optical system according to the first aspect of the invention is characterized by comprising a cemented lens having a cementing surface on an optical axis, wherein air contact surfaces that are on a light ray entrance side and a light ray exit side of said cemented lens are aspheric and at least one cementing surface in said cemented lens satisfies condition (1):

$$6.4 < |(r/R)| \tag{1}$$

where r is the radius of curvature of the cementing surface on the optical axis and R is the maximum diameter of the cementing surface.

The advantage of, and the requirement for, the first optical system set up as recited above is now explained.

When the cemented lens is set up with adjustment of the relative decentration of aspheric surfaces before and after the cementing surface, parts other than the adjusted portion have little or no influence on performance.

As the radius of curvature of the cementing surface on the optical axis becomes less than the lower limit of 6.4 to condition (1), the radius of curvature of the cementing surface becomes smaller relative to the diameter of the cementing surface. This renders the entrance and exit surfaces of lenses likely to undergo relative decentration at the time of cementing, and so complicated decentration aberrations are likely to occur due to both the entrance and exit surfaces being aspheric.

According to the second embodiment of the first aspect of the invention, the first optical system is further characterized in that said cemented lens comprises a plurality of cementing surfaces.

The advantage of, and the requirement for, the second optical system set up as recited above is now explained.

In this embodiment, the cemented lens is composed of a plurality of lenses. This facilitates correction of chromatic aberrations, astigmatism, field curvature, etc. Provision of a plurality of cementing surfaces ensures that the lenses are cemented together in such a way as to cancel out the influences of relative decentration. The cemented lens could be composed of not only three but also four or more lenses.

According to the third embodiment of the first aspect of the invention, the second optical system is further characterized in that the cemented lens is composed of three lenses.

The advantage of, and the requirement for, the third optical system set up as recited above is now explained. To make the total length of the optical system short while the influences of decentration are kept back, it is desired that the cemented lens be composed of three lenses.

According to the fourth embodiment of the first aspect of the invention, any one of the first to third optical systems is further characterized in that it is provided as an image-formation optical system, wherein said image-formation optical system comprises:

a positive lens group comprising said cemented lens and having positive refracting power, a negative lens group of negative refracting power, which, upon zooming, is positioned on the object side of said positive lens group with a variable spacing between them, and an aperture stop interposed between the exit surface in said negative lens group and the exit surface in said positive lens group.

The advantage of, and the requirement for, the fourth optical system set up as recited above is now explained.

By making the spacing between the positive lens group and the negative lens group variable, it is possible to have an image-formation optical system having zooming functions.

With this embodiment wherein the aperture stop is located near or within the positive lens group, the diameter of the second lens group can be smaller than that of other lens group(s). This is favorable for increasing refracting power.

On the other hand, this positive lens group has a reduced lens diameter, and so increasing refracting power causes the lenses in the positive lens group to have increasing influences on decentration. If the cemented lens according to the invention is used for that positive lens group, aberrations can then be well corrected at aspheric surfaces even with increased refracting power, simultaneously with reductions in the influences of decentration occurring among the lenses.

The fifth optical system of the first aspect of the invention is characterized by comprising, in order from its object side to its image plane side, a first lens group having negative refracting power and a second lens group having positive refracting power, which, upon zooming, is positioned nearer to the image plane side than the first lens group with a variable spacing between them, wherein:

said second lens group has only three lenses, the lens nearest to the image plane side of said second lens group and a lens located on the object side thereof are provided as a cemented lens cemented at a surface on an optical axis, and the d-line refractive index $n_{23}$ of said lens nearest to said image plane side and the d-line refractive index $n_{22}$ of said lens cemented to the object side of said lens satisfy condition (2):

$$0.31 < |n_{22} - n_{23}| \quad (2)$$

The advantage of, and the requirement for, the fifth optical system set up as recited above is now explained.

As the second lens group is made up of three lenses, it helps offer a balanced tradeoff between correction of aberrations at the second lens group and size reductions.

Incorporation of the cemented lens in the second lens group is favorable for correction of chromatic aberrations.

With too small a radius of curvature of the cementing surface, on the other hand, there are some considerable influences of decentration at the time of cementing. Here, if the lenses to be cemented together have a refractive index difference suitable enough to satisfy condition (2), it is then possible to mitigate the influences of decentration at the time of cementing, because the cementing surface can have a large radius of curvature while its refracting power is kept intact.

According to the sixth embodiment of the first aspect of the invention, the fifth optical system is further characterized in that said three lenses are a positive lens, a negative lens and a positive lens as viewed in order from its object side, wherein a cementing surface that is the object-side surface of the positive lens nearest to the image plane side is a refracting surface of negative refracting power.

The advantage of, and the requirement for, the sixth optical system set up as recited above is now explained.

By allowing the cementing surface of the negative and positive lenses to have negative refracting power, the principal points of the whole second lens group are so nearer to the object side that the spacing between the principal points of the first lens group of negative refracting power and those of the second lens group of positive refracting power can become narrower at the telephoto end. This works for achieving higher zoom ratios.

The seventh optical system of the first aspect of the invention is characterized by comprising, comprising, in order from an object side to an image plane side thereof, a first lens group having negative refracting power, and a second lens group having positive refracting power, which, upon zooming, is positioned nearer to the image plane side than said first lens group with a variable spacing therebetween, wherein:

said second lens group has only three lenses, and the lens nearest to the image plane side of said second lens group and a lens located on the object side thereof are provided as a cemented lens cemented at a surface on an optical axis, and the optical system further comprises an aperture stop interposed between an exit surface in said first lens group and an entrance surface of said cemented lens, and the d-line basis Abbe constant $v_{23}$ of said lens nearest to the image plane side and the d-line basis Abbe constant $n_{22}$ of the lens cemented to said lens satisfy condition (3):

$$40.3 < |v_{22} - v_{23}| \quad (3)$$

The advantage of, and the requirement for, the seventh optical system set up as recited above is now explained.

As the second lens group is made up of three lenses, it helps offer a balanced tradeoff between correction of aberrations at the second lens group and size reductions.

Incorporation of the cemented lens in the second lens group is favorable for correction of chromatic aberrations.

Satisfaction of condition (3) by the cemented lens at a position of the image plane side near to the stop works for correction of longitudinal chromatic aberration and chromatic aberration of magnification.

According to the eighth embodiment of the first aspect of the invention, any one of the $5^{th}$ to $7^{th}$ optical systems is further characterized by satisfying the following conditions (4), (5) and (6).

$$-1.8 < f_1/f_w < -1.2 \quad (4)$$

$$1.1 < f_2/f_w < 1.5 \quad (5)$$

$$1.7 < f_t/f_w < 2.5 \quad (6)$$

Here $f_1$ is the focal length of the first lens group, $f_2$ is the focal length of the second lens group, $f_w$ is the focal length of the whole optical system at the wide-angle end, and $f_t$ is the focal length of the whole optical system at the telephoto end.

The advantage of, and the requirement for, the eighth optical system set up as recited above is now explained.

Conditions (4) and (5) define the moderate refracting powers of the first lens group and the second lens group in terms of focal length at the wide-angle end while, at the same time, condition (6) defines a zoom ratio.

As there are deviations from the lower limit of −1.8 to condition (4) and the upper limit of 1.5 to condition (5), the refracting power of each lens group becomes weak, resulting in an increase in the space needed for zooming movement, and in the whole length of the lens system at the time of taking.

Deviations from the upper limit of −1.2 to condition (4) and the lower limit of 1.1 to condition (5) mean that more lenses are needed for correction of aberrations at each lens group, ending up with difficulty in size reductions upon receiving them at a collapsible lens mount.

Condition (6) defines the zoom ratio well fit for users' needs and size reductions.

More preferably,
the lower limit to condition (4) should be set at −1.7,
the upper limit to condition (4) should be set at −1.3,
the lower limit to condition (5) should be set at 1.2, and
the upper limit to condition (5) should be set at 1.4.

According to the ninth embodiment of the invention, any one of the $5^{th}$ to $8^{th}$ optical systems is further characterized in that at least half of air contact surfaces are aspheric, and in an aspheric shape approximated to the following formula (A), all conical coefficients K are at most zero.

$$x=(y^2/r)/[1+\{1-(K+1)(y/r)^2\}^{1/2}]+A_4y^4+A_6y^6+A_8y^8+A_{10}y^{10} \quad (A)$$

Here r is a paraxial radius of curvature, K is a conical coefficient, and $A_4$, $A_6$, $A_8$ and $A_{10}$ are the $4^{th}$-, $6^{th}$-, $8^{th}$ - and $10^{th}$-order aspheric coefficients.

The advantage of, and the requirement for, the $9^{th}$ optical system set up as recited above is now explained. If such an arrangement is allowed to satisfy such conditions, coma and field curvature can then be corrected in a well-balanced state.

According to the $10^{th}$ embodiment of the first aspect of the invention, any one of the $5^{th}$ to $9^{th}$ optical systems is further characterized in that:

said first lens group consists of, in order from its object side, a negative lens and a positive lens, two in all, and said second lens group consists of, in order from its object side, a positive lens, a negative lens and a positive lens, three in all, and said optical system further comprises a third lens group consisting of one positive lens, which is located on an image plane side of said second lens group with a variable spacing between them, and is provided as a three-group zoom lens.

The advantage of, and the requirement for, the $10^{th}$ optical system set up as recited above is now explained. Such construction provides a lens layout that is favorable for ensuring a given angle of view at the wide-angle end, a reduction in the whole size upon received at a collapsible lens mount, and balanced aberrations.

According to the $11^{th}$ embodiment of the first embodiment of the invention, any one of the $5^{th}$ to $9^{th}$ optical systems is further characterized in that:

said first lens group consists of, in order from its object side, a negative lens and a positive lens, two in all, said second lens group consists of, in order from its object side, a positive lens, a negative lens and a positive lens, three in all, and said optical system is provided as a two-group zoom lens.

The advantage of, and the requirement for, the $11^{th}$ optical system set up as recited above is now explained. Such construction provides a lens layout that is favorable for ensuring an angle of view at the wide-angle end, a reduction in the whole size upon received at a collapsible lens mount, and balanced aberrations.

According to the $12^{th}$ embodiment of the first aspect of the invention, the $10^{th}$ or $11^{th}$ optical system is further characterized in that:

said first lens group consists of, in order from its object side, a negative lens in which the absolute value of the radius of curvature of its image-side surface is smaller than the absolute value of the radius of curvature of its object-side surface and a positive meniscus lens concave on its image side, two in all, and said second lens group consists of, in order from its object side, a positive lens in which the absolute value of the radius of curvature of its object-side surface is smaller than the absolute value of the radius of curvature of its image-side surface, a negative lens in which the absolute value of the radius of curvature of its image-side surface is smaller than the absolute value of the radius of curvature of its object-side surface and a positive lens in which the absolute value of the radius of curvature of its object-side surface is smaller than the absolute value of the radius of curvature of its image-side surface, three in all.

The advantage of, and the requirement for, the $12^{th}$ optical system set up as recited above is now explained. Such a lens arrangement works for making well-balanced correction of axial aberrations and off-axis aberrations, albeit being composed of fewer lenses. If the principal points of the second lens group are located nearer to the first lens group, it is then easier to make the focal length of the optical system on the telephoto end side longer in spite of its small-format size.

According to the $13^{th}$ embodiment of the first aspect of the invention, the $12^{th}$ optical system is further characterized in that the axial spacing between the negative lens and the positive lens in said first lens group is 1.4 mm to 1.6 mm inclusive.

The advantage of, and the requirement for, the $13^{th}$ optical system set up as recited above is now explained. This requirement is a condition for locating the principal points of the first lens group nearer to the object side while, at the same time, diminishing lens size to a suitable level.

According to the $14^{th}$ embodiment of the first aspect of the invention, any one of the $5^{th}$ to $13^{th}$ optical systems is further characterized in that the three lenses in said second lens groups are provided in the form of a cemented triplet lens.

The advantage of, and the requirement for, the $14^{th}$ optical system set up as recited above is now explained. Such an arrangement works for correcting aberrations, reducing the size of the second lens group, and diminishing the influences of decentration.

According to the $15^{th}$ embodiment of the first aspect of the invention, the $14^{th}$ optical system is further characterized in that the axial thickness of said cemented triplet lens is up to 6 mm.

The advantage of, and the requirement for, the $15^{th}$ optical system set up as recited above is now explained. The cemented triplet lens located in the second lens group is favorable for slimming down the lens system. Therefore, if the thickness of the cemented triplet lens in the second lens group is reduced down to 6 mm or less, it is possible to reduce the thickness of the optical system upon received at a collapsible lens mount.

According to the $16^{th}$ embodiment of the first aspect of the invention, the $15^{th}$ optical system is further characterized in that the axial thickness of said cemented triplet lens is up to 5.5 mm.

The advantage of, and the requirement for, the $16^{th}$ optical system set up as recited above is now explained. Satisfaction of this requirement allows the thickness of the optical system upon received at a collapsible lens mount to be much more reduced.

According to the $17^{th}$ embodiment of the first aspect of the invention, any one of the $14^{th}$ to $16^{th}$ optical systems is further characterized in that an aperture stop is located right before the object side of said cemented triplet lens, wherein the ratio of the thickness of said cemented triplet lens to the maximum diameter of said aperture stop is at least 1.4.

The advantage of, and the requirement for, the $17^{th}$ optical system set up as recited above is now explained.

Such an arrangement ensures that one reflecting surface of the cemented lens is nearer to, and another is farther away from, the aperture stop, so that correction of aberrations occurring at the second lens group is more easily achievable.

A suitable spacing between adjacent surfaces makes adjustment of principal points, lens fabrication or the like easier.

According to the 18th embodiment of the first aspect of the invention, there is provided an imaging system, characterized by comprising any one of the 5th to 9th optical systems and further including an electronic image pickup device for converting an optical image formed through said optical system into electric signals.

The advantage of, and the requirement for, the imaging system set up as recited above is now explained.

The optical system of the invention works for a lens arrangement for permitting an exit light beam to come close to verticality, and so it is applicable to an imaging system using an electronic image pickup device.

According to the 19th embodiment of the first aspect of the invention, the first imaging system is further characterized in that the angle of incidence of a chief light ray on the image pickup device in the maximum image height position at the wide-angle end of the optical system is 15° to less than 30°.

The advantage of, and the requirement for, the second imaging system set up as recited above is now explained. This requirement is a condition for offering a balance between influences of the electronic image pickup device on oblique incidence capability and size reductions. As the angle of incidence of the chief ray at the wide-angle end becomes smaller than the lower limit of 15°, it renders the optical system bulky. As the upper limit of 30° is exceeded, the angle of incidence of light on the electronic image pickup device becomes large, rendering chromatic shading likely to occur.

According to the 20th embodiment of the first aspect of the invention, the second imaging system is further characterized in that the angle of incidence of a chief light ray on the image pickup device in the maximum image height position at the wide-angle end of the optical system is at least 16°.

Referring to the advantage of, and the requirement for, the third imaging system set up as recited above, satisfaction of this-requirement is more favorable for size reductions.

According to the first embodiment of the second aspect of the invention, there is provided an optical system, characterized by comprising, in order from its object side, a first lens group of negative refracting power and a second lens group of positive refracting power and further comprising a cemented lens which has generally positive refracting power and in which three or more lenses including at least one negative lens are cemented together, wherein:

said optical system has a zoom ratio of at least 2, and satisfies conditions (11) and (12):

$$|F_{co}/F_{ci}|<0.95 \quad (11)$$

$$0.05<D_{co}/D_{ci}<20 \quad (12)$$

where $F_{co}$ is the focal length of the lens located in said cemented lens and nearest to its object side, $F_{ci}$ is the focal length of the lens located in said cemented lens and nearest to its image plane side, $D_{co}$ is the axial thickness of the lens located in said cemented lens and nearest to its object side, and $D_{ci}$ is the axial thickness of the lens located in said cemented lens and nearest to its image plane side.

The advantage of, and the requirement for, the first optical system set up as recited above is now explained.

Slim zoom lenses comprising two lens groups, negative and positive, and including a cemented lens having positive refracting power and comprising three or more lenses have already been proposed in the art. In any of those zoom lenses, however, the relative decentration of surfaces before and after a cementing surface has some considerable influences on performances. For the time being, there is a method of adjusting performance deterioration due to fabrication errors using one cementing surface; however, it is still impossible to make significant improvements in both performances at a deteriorated center and a peripheral portion of the screen.

In the invention, the power balance of the entrance- and exit-side surfaces that form the cemented lens is properly determined so that performance deteriorations at both the center and the periphery of cementing can be easily mitigated by adjustment of the relative centers of the lenses.

Condition (11) defines the power balance of the entrance- and exit-side surfaces that form the cemented lens. As the upper limit of 0.95 is exceeded, it renders it difficult to gain center adjustment for making improvements in both central performance and peripheral performance.

As the axial thickness ratio between the lens nearest to the object side and the lens nearest to the image plane side of the cemented lens deviates from the range of condition (12) or as there is a deviation from the upper limit of 20 or the lower limit of 0.05, it causes the cemented lens itself to become thicker, thwarting size reductions. It also renders correction of chromatic aberrations difficult. Otherwise, the effect that the cemented lens comprising three or more lenses should have will become slender.

According to the second embodiment of the second aspect of the invention, there is provided an optical system, characterized by comprising, in order from its object side, a first lens group of negative refracting power and a second lens group of positive refracting power and further comprising a cemented lens which has generally positive refracting power and in which three or more lenses including at least one negative lens are cemented together, wherein:

said optical system has a zoom ratio of at least 2, and is set up in such a way as to satisfy condition (13):

$$10<|R_1/r_1| \quad (13)$$

where $r_1$ is the radius of curvature of the surface nearest to the object side of said cemented lens, and $R_1$ is the radius of curvature of the cementing surface nearest to the object side of said cemented lens.

The advantage of, and the requirement for, the second optical system set up as recited above is now explained.

Slim zoom lenses comprising two lens groups, negative and positive, and including a cemented lens having positive refracting power and comprising three or more lenses have already been proposed in the art. In any of those zoom lenses, however, the relative decentration of surfaces before and after a cementing surface has some considerable influences on performances. For the time being, there is a method of adjusting performance deterioration due to fabrication errors using one cementing surface; however, it is still impossible to make significant improvements in both performances at a deteriorated center and a peripheral portion of the screen.

In the invention, the radius of curvature, $R_1$, of the lens cementing surface nearest to the entrance side of the cemented lens has a value large enough to make changes in the tilts of lens surfaces small upon adjustment of relative lens centers so that the relative lens centers can be corrected by shifting of the lens surfaces. It is thus possible to simultaneously keep center and off-axis performance against deteriorations from design values.

Condition (13) defines the shape of the lens nearest to the object side of the cemented lens, and shows that by making the radius of curvature of the cementing surface R, large, the tilts of the lenses occurring upon adjustment of the relative lens centers are reduced to prevent performance deteriorations.

According to the third embodiment of the second aspect of the invention, there is provided an optical system, characterized by comprising, in order from its object side, a first lens group of negative refracting power and a second lens group of positive refracting power and further comprising a cemented lens which has generally positive refracting power and in which three or more lenses including at least one negative lens are cemented together, wherein:

said cemented lens is convex on its object side, and said optical system has a zoom ratio of at least 2, and is set up in such a way as to satisfy condition (14):

$$0.7 < |R_2/r_2| \tag{14}$$

where $r_2$ is the radius of curvature of the surface nearest to the image plane side of said cemented lens, and $R_2$ is the radius of curvature of the cementing surface nearest to the image plane side of said cemented lens.

The advantage of, and the requirement for, the thrid optical system of the second aspect of the invention set up as recited above is now explained.

Slim zoom lenses comprising two lens groups, negative and positive, and including a cemented lens having positive refracting power and comprising three or more lenses have already been proposed in the art. In any of those zoom lenses, however, the relative decentration of surfaces before and after a cementing surface has some considerable influences on performances. For the time being, there is a method of adjusting performance deterioration due to fabrication errors using one cementing surface; however, it is still impossible to make significant improvements in both performances at a deteriorated center and a peripheral portion of the screen.

In the invention, the lens cementing surface $R_2$ nearest to the exit side of the cemented lens has a value size enough to make changes in the tilts of lens surfaces small upon adjustment of relative lens centers so that the relative lens centers can be corrected by shifting of the lens surfaces. It is thus possible to simultaneously keep center and off-axis performances against deteriorations from design values.

Condition (14) defines the shape of the lens nearest to the image plane side of the cemented lens, and shows that by making the radius of curvature of the cementing surface $R_2$ large, the tilts of the lenses occurring upon adjustment of the relative lens centers are reduced to prevent performance deteriorations.

According to the fourth embodiment of the second aspect of the invention, there is provided an optical system, characterized by comprising a cemented lens having a cementing surface on an optical axis of the optical system, wherein lenses that form said cemented lens satisfy conditions (15) and (16):

$$40 < v_{max} - v_{min} < 80 \tag{15}$$

$$23.7 > v_{min} \tag{16}$$

where $v_{max}$ is the maximum of Abbe constants that the lenses in said cemented lens have, and $v_{min}$ is the minimum of Abbe constants that the lenses in said cemented lens have.

The advantage of, and the requirement for, the fourth optical system set up as recited above is now explained.

Optical systems comprising a cemented lens with chromatic aberrations corrected with the type of vitreous material of the lenses used have already been proposed in the art. With any of those optical systems, however, it is still difficult to gain high optical performances over the entire zoom range, because the Abbe constant of the lenses forming the cemented lens is larger than represented by condition (16), and the vitreous material used deviates from the range of condition (15).

In the invention, the materials, etc. of the respective lenses that form the cemented lens are properly determined, thereby providing an optical system capable of satisfactory correction of chromatic aberrations in particular over the entire zoom range.

A deviation from the lower limit to the range of condition (15), that is, 40, will result in under-correction of chromatic aberrations, and a departure from the upper limit to the range of condition (15), that is, 80, will lead to overcorrection.

According to the fifth embodiment of the second aspect of the invention, there is provided an optical system, characterized by comprising a cemented lens having a cementing surface on an optical axis of the optical system, wherein lenses that form said cemented lens satisfy conditions (15), (16), (17), (18) and (19):

$$40 < v_{max} - v_{min} < 80 \tag{15}$$

$$23.7 > v_{min} \tag{16}$$

$$60 < vmax \tag{17}$$

$$1.8 < n_{dmax} \tag{18}$$

$$1.55 > n_{dmin} \tag{19}$$

where $v_{max}$ is the maximum of Abbe constants that the lenses in said cemented lens have, $v_{min}$ is the minimum of Abbe constants that the lenses in said cemented lens have, $n_{dmax}$ is the maximum of refractive indices that the lenses in said cemented lens have, and $n_{dmin}$ is the minimum of refractive indices that the lenses in said cemented lens have.

The advantage of, and the requirement for, the fifth optical system set up as recited above is now explained.

Optical systems comprising a cemented lens with chromatic aberrations corrected with the type of vitreous material of the lenses used have already been proposed in the art. With any of those optical systems, however, it is still difficult to gain high optical performances over the entire zoom range, because vitreous materials having refractive indices and Abbe constants deviating from the ranges defined by conditions (15) to (19) are used for the lenses forming the cemented lens, resulting in,difficulty in correction of chromatic aberrations in particular.

In the invention, the materials, etc. of the lenses that form the cemented lens are properly determined, thereby providing an optical system capable of satisfactory correction of chromatic aberrations in particular over the entire zoom range.

A deviation from the lower limit to the range of condition (15), that is, 40, will result in under-correction of chromatic aberrations, and a departure from the upper limit to the range of condition (15), that is, 80, will lead to overcorrection.

When there is any departure from the range of condition (18) or the minimum of the refractive indices that the lenses forming the cemented lens have is less than 1.8, field curvature and spherical aberrations will occur.

According to the sixth embodiment of the second aspect of the invention, either one of the $4^{th}$ and $5^{th}$ optical systems is further characterized by comprising two lens groups, i.e., a lens group of negative refracting power and a lens group of positive refracting power.

The advantage of, and the requirement for, the 6th optical system set up as recited above is now explained.

Such a two-group arrangement comprising a lens group of negative refracting power and a lens group of positive refracting power is the least requirement for gaining a zoom ratio of as high as 2 or greater with well-corrected aberrations. A combination of that requirement with the condition for the third optical system of the second aspect of the invention ensures further size reductions, because the powers of other lenses can be enhanced.

According to the seventh embodiment of the second aspect of the invention, any one of the 1st to 6th optical systems is further characterized in that at least one of air contact surfaces on the light ray entrance and exit sides of said cemented lens is aspheric.

The advantage of, and the requirement for, the seventh optical system set up as recited above is now explained.

Although the cementing of three or more lenses including at least one negative lens causes aberration correction capability to become low in proportion to fewer lens elements, yet this can be compensated for by using an aspheric surface for at least one of the air contact surfaces of the cemented lens with the result that the whole optical system can be further slimmed down. Especially if this requirement is combined with condition (11) or (13), severer fabrication tolerances imposed by the location of the aspheric surface are then lessened by enhanced center adjustment effects, thereby ensuring ease of fabrication.

According to the eighth embodiment of the second aspect of the invention, any one of the 1st to 7th optical systems is further characterized in that said cemented lens consists of three lenses.

The advantage of, and the requirement for, the eighth optical system set up as recited above is now explained.

Use of the cemented lens with three lenses cemented together enables chromatic aberrations to be full-corrected, and the cementing of three lenses helps hold back performance degradation by decentration, because the amount of decentration of lens elements can be easily reduced.

According to the ninth embodiment of the second aspect of the invention, any one of the 1st to 8th optical systems is further characterized in that said second lens group comprises a triplet lens wherein a positive first lens, a negative second lens and a positive third lens are arranged in order from its object side.

The advantage of, and the requirement for, the ninth optical system set up as recited above is now explained.

By incorporating in the second lens group an optical system in which the positive first lens, the negative second lens and the positive third lens are arranged in order from its object side, axial aberrations, field curvature and chromatic aberrations are primarily well correctable.

According to the 10th embodiment of the second aspect of the invention, any one of the 1st to 9th optical systems is further characterized in that the second lens group consists only of the triplet lens.

The advantage of, and the requirement for, the 10th optical system set up as recited above is now explained.

With the second lens group consisting only of the triplet lens, compactness is achievable while aberrations inclusive of chromatic aberrations are well balanced.

According to the 11th embodiment of the second aspect of the invention, any one of the 1st to 10th optical systems is further characterized in that focusing is carried out by movement of one group of lenses.

The advantage of, and the requirement for, the 11th optical system set up as recited above is now explained.

Such an arrangement is simple in mechanism, and helps reduce aberration fluctuations from the wide-angle end to the telephoto end.

According to the 12th embodiment of the second aspect of the invention, any one of the 1st to 11th optical systems is further characterized in that said second lens group moves monotonously from the image plane side to the object side, and said first lens group moves in a convex locus toward the image plane side.

The advantage of, and the requirement for, the 12th optical system set up as recited above is now explained.

Such an arrangement is simple in mechanism, and enables the total length of the lens system to be shortened upon taking. When the aperture stop is located in unison with the second lens group, it is possible to make the diameter of the first lens group small because the entrance pupil in the wide-angle mode is set at a shallow position.

According to the 13th embodiment of the second aspect of the invention, any one of the 1st to 3rd optical systems is further characterized by satisfying condition (15):

$$40 < \nu_{max} - \nu_{min} < 80 \quad (15)$$

where $\nu_{max}$ is the maximum of Abbe constants that the lenses in said cemented lens have, and $\nu_{min}$ is the minimum of Abbe constants that the lenses in said cemented lens have.

The advantage of, and the requirement for, the 13th optical system set up as recited above is now explained.

When the Abbe constant difference between the lenses forming the cemented lens satisfies condition (15), the optical system is well corrected primarily for chromatic aberrations, guaranteeing compactness and high optical performance all over the zoom range. Especially when it comes to a lens system made up of a cemented lens and other lens or lenses, the ability of the cemented lens to correct chromatic aberrations is so enhanced that the power of other lens system can be increased with fewer lenses, achieving compactness and making it easy for a zoom lens to have a high zoom ratio.

According to the 14th embodiment of the second aspect of the invention, any one of the 1st to 12th optical systems is further characterized in that the lens nearest to the object side of the triplet lens and the lens nearest to the image plane side thereof are formed of the same vitreous material.

The advantage of, and the requirement for, the 14th optical system set up as recited above is now explained.

Use of the same vitreous material helps reduce the types of the vitreous materials used, making fabrication management easy and achieving cost reductions.

According to the 15th embodiment of the second aspect of the invention, any one of the 1st to 3rd and the 6th to 14th optical systems is further characterized in that said cemented lens is concave on its object side, and further satisfies condition (20):

$$0.50 < D_{n1}/\Sigma d < 0.95 \quad (20)$$

where $D_{n1}$ is a distance from the surface located in said cemented lens and nearest to its object side to the surface having the largest negative refracting power in said cemented lens, and $\Sigma d$ is the total thickness of said cemented lens.

The advantage of, and the requirement for, the 15$^{th}$ optical system set up as recited above is now explained.

Satisfaction of condition (20) permits the surface of negative power in the cemented lens to be suitably spaced away from the object-side surface having positive power, so that with chromatic aberrations corrected, the principal points of the second lens group especially at the telephoto end come close to the first lens group. This works for achievement of high zoom ratios.

As the upper limit of 0.95 to condition (2) is exceeded, it renders it difficult to fabricate the subsequent lens (located on the image plane side with respect to the negative power surface in the cemented lens), because its thickness becomes too small. As the lower limit of 0.50 is not reached, it causes the surface of negative power to come too close to the entrance surface (nearest to the object side), rendering control of the principal points difficult and high zoom ratios hard to achieve.

According to the 16$^{th}$ embodiment of the second aspect of the invention, the 15$^{th}$ optical system is further characterized by satisfying condition (21):

$$0.05 < D_{n2}/\Sigma d < 0.35 \quad (21)$$

where $D_{n2}$ is a distance from the surface having the largest refracting power in said cemented lens to the surface located in said cemented lens and nearest to its image plane side.

The advantage of, and the requirement for, the 16$^{th}$ optical system set up as recited above is now explained.

Satisfaction of condition (21) makes the distance from the surface of negative power in the cemented lens to the exit surface (nearest to the image plane side) so moderately short that the positions of the principal points of the second lens group can be suitably controlled to achieve a high zoom ratio and gain compactness upon the optical system received at a collapsible lens mount.

As the upper limit of 0.35 to condition (21) is exceeded, it works against compactness upon the optical system received at a collapsible lens mount, because the cemented lens becomes too thick. Otherwise, difficulty is encountered in bringing the principal point positions at the telephoto end in particular close to the first lens group, working against achieving high zoom ratios. As the lower limit of 0.05 is not reached, a fabrication problem arises because the thickness of lenses from the negative power surface to the exit surface becomes too small.

According to the 17$^{th}$ embodiment of the second aspect of the invention, any one of the 1$^{st}$ to 3$^{rd}$ and the 6$^{th}$ to 16$^{th}$ optical systems is further characterized in that said cemented lens is convex on its object side, and further satisfies condition (22):

$$-1.5 < (r_1+r_2)/(r_1-r_2) < -0.5 \quad (22)$$

where $r_1$ is the radius of curvature of the surface nearest to the object side of said cemented lens, and $r_2$ is the radius of curvature of the surface nearest to the image plane side of said cemented lens.

The advantage of, and the requirement for, the 17$^{th}$ optical system set up as recited above is now explained.

Condition (22) defines the shape of the cemented lens. More specifically, the cemented lens is configured such that its main positive power is allocated to the entrance surface (nearest to the object side). This is an arrangement favorable for achieving size reductions and high zoom ratios while various aberrations are corrected in a well-balanced state.

As the upper limit of −0.5 to condition (22) is exceeded, the power of the entrance surface becomes weak (or the power of the exit surface becomes strong), rendering control of the principal point positions at the telephoto end in particular difficult. Otherwise, it is difficult to slim down the lens located in the cemented lens and nearer to its image plane side, rendering size reductions difficult. As the lower limit of −1.5 is not reached, the power of the entrance surface becomes too strong (or the power of the exit surface tends to become negative), rendering relative correction of aberrations difficult.

According to the 18$^{th}$ embodiment of the second aspect of the invention, any one of the 1$^{st}$ to 3$^{rd}$ and the 6$^{th}$ to 17$^{th}$ optical systems is further characterized in that said cemented lens is convex on its object side, and said negative lens is cemented to the image plane side of the lens nearest to the object side, with satisfaction of conditions (23) and (24):

$$-1.0 < R_1/F_2 < -0.05 \quad (23)$$

$$0.50 < D_1/\Sigma d < 0.95 \quad (24)$$

where $R_1$ is the radius of curvature of the cementing surface located in said cemented lens and nearest to its object side, $F_2$ is the focal length of said second lens group, $D_1$ is the axial thickness of the lens located in said cemented lens and nearest to its object side, and $\Sigma d$ is the total thickness of said cemented lens.

The advantage of, and the requirement for, the 18$^{th}$ optical system set up as recited above is now explained.

As the negative lens is cemented to the lens in the cemented lens, which is located nearest to its object side, and the cementing surface in the cemented lens, which is nearest to its object side, is allowed to have negative power large enough to satisfy condition (23), it makes good correction of chromatic aberrations (especially longitudinal chromatic aberration) while achieving compactness. Further, as this surface of negative power is spaced away from the entrance surface in such a way as to satisfy condition (24), it enables the principal point positions of the second lens group especially at the telephoto end to come so close to the first lens group that high zoom ratios are achievable with various aberrations corrected in a well-balanced state.

As the upper limit of −0.05 to condition (23) is exceeded, the curvature (power) of the cementing surface on the object side becomes too tight, and upon adjustment of relative lens centers, there is a large change in the tilts of the lenses. This in turn causes center or off-axis performances to be apart from the design values, even when the relative lens centers are corrected by shifting of the lens surfaces. As the lower limit of −1.0 is not reached, the curvature (power) of the cementing surface nearest to the object side becomes too loose, rendering chromatic aberrations hard to correct.

As the upper limit of 0.95 to condition (24) is exceeded, it renders it difficult to fabricate the subsequent lens (located on the image plane side with respect to the lens nearest to the object side of the cemented lens), because its thickness becomes too small. Otherwise, the cemented lens becomes too thick for compactness. As the lower limit of 0.50 is not reached, it causes the surface of negative power to come too close to the entrance surface (nearest to the object side), rendering control of the principal points difficult and high zoom ratios hard to achieve.

According to the 19$^{th}$ embodiment of the second aspect of the invention, any one of the 1$^{st}$ to 3$^{rd}$ and the 6$^{th}$ to 17$^{th}$ optical systems is further characterized in that said cemented lens is convex on its object side, and said negative lens is cemented to the lens located in said cemented lens and nearest to its image plane side, with satisfaction of conditions (25) and (26):

$$2.5 < |R_1/F_2| \quad (25)$$

$$0.45 < R_2/F_2 < 2.3 \quad (26)$$

where $R_1$ is the radius of curvature of the cementing surface located in said cemented lens and nearest to its object side, $F_2$ is the focal length of the second lens group, and $R_2$ is the radius of curvature of the cementing surface located in said cemented lens and nearest to its image plane side.

The advantage of, and the requirement for, the 19$^{th}$ optical system set up as recited above is now explained.

As satisfaction of condition (25) allows the cementing surface nearest to the object side of the cemented lens to have weak positive or negative power, it works for mitigating the influences of decentration. It also enables the cementing surface nearest to the object side to come so close to a planar surface while keeping the power of the cemented lens intact, so that the radius of curvature of each lens located on the image plane side with respect to the lens nearest to the object side becomes large (or each lens comes close to a planar surface). This in turn enables the subsequent lenses (on the image plane side with respect to the cementing surface nearest to the object side) to be made so thin that compactness, slimming and cemented lens fabrication are easily achievable. As satisfaction of condition (26) allows the cementing surface located in the cemented lens and nearest to its image plane side to have negative power, it is good for correction of chromatic aberrations. It also works for high zoom ratios, because the principal point positions of the second lens group at a cementing surface away from the entrance surface (nearest to the object side) and especially at the telephoto end come close to the first lens group.

As the lower limit of 2.5 to condition (25) is not reached, the curvature of the cementing surface nearest to the object side becomes too tight, and upon adjustment of relative lens centers, there is an increasing change in the tilts of the lens surfaces. As a result, there are center or off-axis performance deteriorations from the design values, even when the relative centers are corrected by shifting of the lens surfaces.

As the upper limit of 2.3 to condition (26) is exceeded, the curvature of the cementing surface nearest to the image plane side slacks, rendering chromatic aberrations hard to correct. Otherwise, there is a need for the other lens (such as the cementing surface nearest to the object side) to have an increased power for correction of chromatic aberrations. To, in this case, bring the principal point positions of the second lens group at the telephoto end close to the first lens group for the purpose of high zoom ratios, a thicker lens must be used to space the entrance surface suitably away from the lens surface having that negative power, often failing to achieve compactness. As the lower limit of 0.45 is not reached, the curvature of the cementing surface nearest to the image plane side becomes too tight. This requires for the surface nearest to the object side to have a tighter curvature to correct various aberrations in a well-balanced state with the result that the lens nearest to the image plane side tends to become thick. Otherwise, the surface nearest to the image plane side tends to have negative power, and there is a need for the surface nearest to the object side to have a tighter curvature to keep the power of the cemented lens, resulting in difficulty in relative correction of various aberrations.

According to the 20$^{th}$ embodiment of the second aspect of the invention, the 19$^{th}$ optical system is further characterized by satisfaction of conditions (22) and (27):

$$-1.5 < (r_1 + r_2)/(r_1 - r_2) < -0.5 \tag{22}$$

$$0.05 < D_3/\Sigma d < 0.30 \tag{27}$$

where $r_1$ is the radius of curvature of the surface nearest to the object side of said cemented lens, $r_2$ is the radius of curvature of the surface nearest to the image plane side of said cemented lens, $D_3$ is the axial thickness of the lens located in said cemented lens and nearest to its image plane side, and $\Sigma d$ is the total thickness of said cemented lens.

The advantage of, and the requirement for, the 20$^{th}$ optical system set up as recited above is now explained.

Satisfaction of condition (22) allows the main positive power of the cemented lens to be allocated to the entrance surface (nearest to the object side). This works for compactness and high zoom ratios while various aberrations are corrected in a well-balanced state. Simultaneous satisfaction of conditions (22) and (26) enables the lens located in the cemented lens and nearest to its image side to be made thin enough to satisfy condition (27). This is favorable for high zoom ratios, because the surface subsequent to the cementing surface of negative power nearest to the image plane side comes close to that cementing surface nearest to the image plane side, and so the principal point positions of the second lens group especially at the telephoto end comes close to the first lens group.

As the upper limit of −0.5 to condition (22) is exceeded, the power of the entrance surface becomes weak (or the power of the exit surface becomes strong), rendering adjustment of the principal point positions especially at the telephoto end difficult. Otherwise, it is difficult to thin the lens located in the cemented lens and nearer to its image plane, and so achieve compactness. Falling short of the lower limit of −1.5 causes the power of the entrance surface to become too strong (or it causes the power of the exit surface to be likely to be negative), rendering relative correction of aberrations difficult.

Exceeding the upper limit of 0.30 to condition (27) causes the cemented lens to tend to become thick, resulting difficulty in achieving compactness. Otherwise, the curvature of the surface nearest to the image plane side becomes too tight to adjust the principal point positions. Falling short of the lower limit of 0.05 causes the surface nearest to the image plane side to come too close to the cementing surface nearest to the image plane side. In other words, the lens nearest to the image plane side becomes too thin to fabricate.

According to the 21$^{st}$ embodiment of the second aspect of the invention, any one of the 1$^{st}$ to 3$^{rd}$ and the 6$^{th}$ to 20$^{th}$ optical systems is further characterized by satisfaction of conditions (25) and (16):

$$40 < \nu_{max} - \nu_{min} < 80 \tag{25}$$

$$23.7 > \nu_{min} \tag{16}$$

where $\nu_{max}$ is the maximum of Abbe constants that the lenses in said cemented lens have, and $\nu_{min}$ is the minimum of Abbe constants that the lenses in said cemented lens have.

The advantage of, and the requirement for, the 21$^{st}$ optical system set up as recited above is now explained.

Optical systems comprising a cemented lens with chromatic aberrations corrected with the type of vitreous material of the lenses used have already been proposed in the art. With any of those optical systems, however, it is still difficult to gain high optical performances over the entire zoom range, because the Abbe constant of the lenses forming the cemented lens is larger than represented by condition (16), and the vitreous material used deviates from the range of condition (25).

In the invention, the materials, etc. of the respective lenses that form the cemented lens are properly determined, thereby providing an optical system capable of satisfactory correction of chromatic aberrations in particular over the entire zoom range.

A deviation from the lower limit to the range of condition (25), that is, 40, will result in under-correction of chromatic aberrations, and a departure from the upper limit to the range of condition (25), that is, 80, will lead to overcorrection.

According to the 22$^{nd}$ embodiment of the second aspect of the invention, the 21$^{st}$ optical system is further characterized by satisfying conditions (17), (18) and (19):

$$60 < \nu_{max} \quad (17)$$

$$1.8 < n_{dmax} \quad (18)$$

$$1.55 > n_{dmin} \quad (19)$$

where $\nu_{max}$ is the maximum of Abbe constants that the lenses in said cemented lens have, $n_{dmax}$ is the maximum of refractive indices that the lenses in said cemented lens have, and $n_{dmin}$ is the minimum of refractive indices that the lenses in said cemented lens have.

The advantage of, and the requirement for, the 22$^{nd}$ optical system set up as recited above is now explained.

Optical systems comprising a cemented lens with chromatic aberrations corrected with the type of vitreous material of the lenses used have already been proposed in the art. With any of those optical systems, however, it is still difficult to gain high optical performances over the entire zoom range, because vitreous materials having refracting indices and Abbe constants deviating from the ranges defined by conditions (17) to (19) are used for the lenses forming the cemented lens, resulting in difficulty in correction of chromatic aberrations in particular.

In the invention, the materials, etc. of the lenses that form the cemented lens are properly determined, thereby providing an optical system capable of satisfactory correction of chromatic aberrations in particular over the entire zoom range.

When there is a departure from the range of condition (18) or the maximum of the refractive indices that the lenses in the cemented lens have does not reach 1.8, field curvature and spherical aberrations will occur.

According to the 23$^{rd}$ embodiment of the second aspect of the invention, either one of the 4$^{th}$ and 5$^{th}$ optical systems is further characterized in that said cemented lens includes at least one positive lens and at least one negative lens.

The advantage of, and the requirement for, the 23$^{rd}$ optical system set up as recited above is now explained.

Incorporation of at least one positive lens and at least one negative lens in the cemented lens makes good correction of chromatic aberrations possible. In this case, the Abbe constant of the negative lens is preferably smaller than that of the positive lens.

According to the 24$^{th}$ embodiment of the second aspect of the invention, any one of the 1$^{st}$ to 23$^{rd}$ optical systems is further characterized in that said cemented lens has a double-convex form at or near the optical axis.

The advantage of, and the requirement for, the 24$^{th}$ optical system set up as recited above is now explained.

With the double-convex form of the cemented lens, it is possible to bring the entrance and exit surfaces of the cemented lens approximate to a symmetric system that ensures that various aberrations are more easily corrected in a well-balanced state.

According to the 25$^{th}$ embodiment of the second aspect of the invention, any one of the 7$^{th}$ to 24$^{th}$ optical systems is further characterized in that said exit-side aspheric surface is configured in such a way as to have an increasing divergent effect with distance of the center of the lens.

The advantage of, and the requirement for, the 25$^{th}$ optical system set up as recited above is now explained.

Provision of such an aspheric surface ensures that axial and off-axis aberrations are correctable at the surface nearest to the image plane side in a well-balanced state.

The present invention also encompasses an imaging system, characterized by comprising any one of the 1$^{st}$ to 25$^{th}$ optical systems according to the second aspect of the invention, and further comprising an electronic image pickup device for converting an optical image formed through said optical system into electric signals.

The imaging system has the same advantages and requirements as already described.

More preferable ranges of conditions (11) to (27) as mentioned above are set out below. In the values given below, the rightmost one is the most preferable limit.

| Condition | Lower Value | Upper Value |
|---|---|---|
| (11) | — | 0.93/0.85/0.80 |
| (12) | 1.0/2.0/2.5 | 15/10/7.5/5.5 |
| (13) | 12/14.5/20 | — |
| (14) | 0.75/0.80 | — |
| (15) | — | 70/60/55 |
| (16) | — | 23.0/22.5 |
| (17) | 63.5/64.0 | — |
| (18) | — | — |
| (19) | — | — |
| (20) | 0.60/0.68 | 0.90/0.85 |
| (21) | 0.08/0.10/0.12 | 0.32/0.30/0.25 |
| (22) | −1.3/−1.0 | −0.65/−0.70/−0.80/−0.85 |
| (23) | −0.90 | −0.25/−0.35/−0.50 |
| (24) | 0.55/0.60 | 0.85/0.80/0.75 |
| (25) | 3.0/4.5/5.0 | —/5.5/6.5/9.0 |
| (26) | 0.5/0.6/0.7 | 2.0/1.5 |
| (27) | 0.08/0.11 | 0.25/0.22 |

It is herein understood that some or all of the above conditions should preferably be satisfied at the same time.

With the invention as detailed above, it is possible to obtain a zoom lens of improved image-formation capability with a reduced number of lenses, and fabricate a slim yet high-performance digital or video camera.

It is also possible to obtain an optical system which, albeit having high zoom ratios, can be slimmed down with performance deteriorations minimized by reduced influences of decentration, and so achieve a slim yet high-performance digital or video camera having high zoom ratios.

Figure 1B:
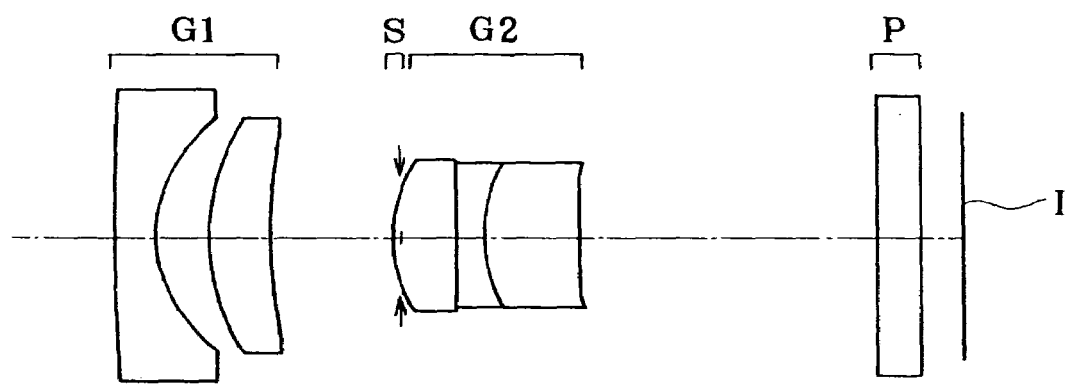
Figure 1C:
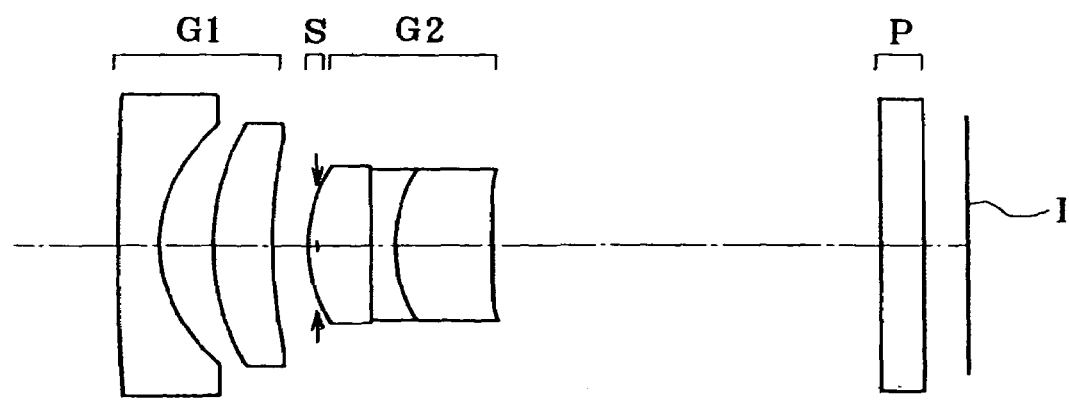

The present invention is now explained in further details with reference to Examples 1 to 17. FIGS. 1(*a*), 1(*b*) and 1(*c*) through FIGS. 17(*a*), 17(*b*) and 17(*c*) are illustrative in lens section of Examples 1 to 17 at their wide-angle end, in their intermediate setting and at their telephoto end, respectively, upon focusing on an infinite object point. In these drawings, a first lens group is indicated at G1, an aperture stop at S, a second lens group at G2, a third lens group at G3, a plane-parallel plate such as a filter at P, a plane-parallel plate that forms a low-pass filter provided with a wavelength limiting coating for limiting infrared light, etc. at F, a cover glass for an image pickup device at C, and an image plane at I.

EXAMPLE 1

As shown in FIG. 1, Example 1 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a concave locus toward the object side, and is positioned nearer to the image plane side of the zoom lens system at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet lens consisting of, in order from its object side, a double-convex positive lens, a double-concave negative lens and a double-convex positive lens. Three aspheric surfaces are used: one for the image plane-side surface of the negative meniscus lens in the first lens group G1, one for the surface nearest to the object side of the triplet lens forming the second lens group G2, and one for the surface nearest to the image plane side thereof.

EXAMPLE 2

Figure 2A:
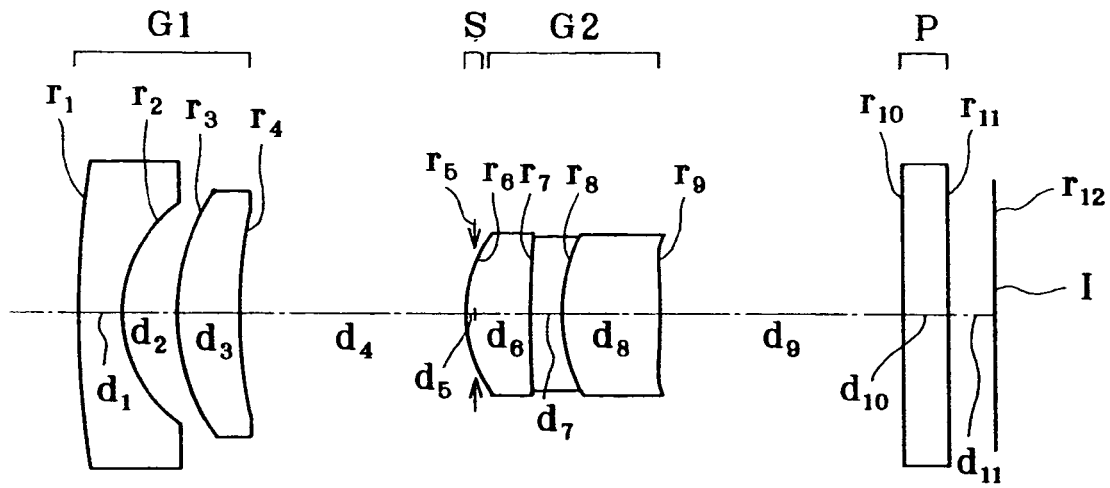
FIGS. 2(a), 2(b) and 2(c) are views, as in FIGS. 1(a), 1(b) and 1(c), of Example 2 of the zoom optical system according to the invention.
Figure 2B:
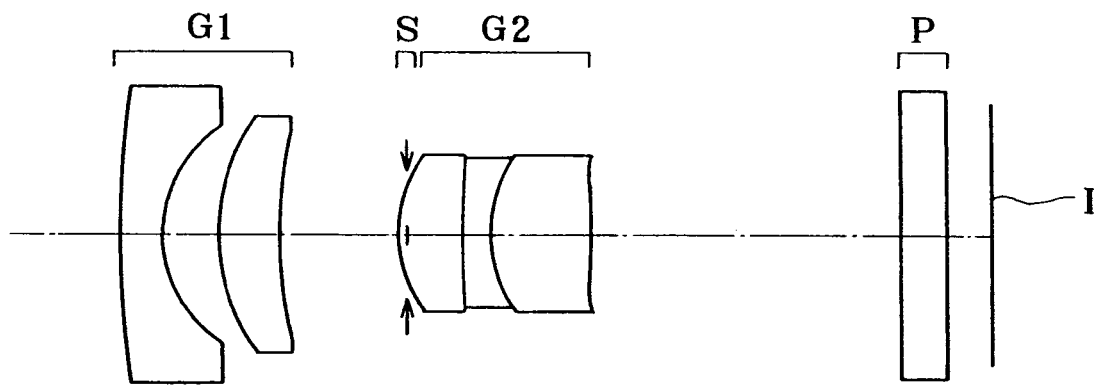
Figure 2C:
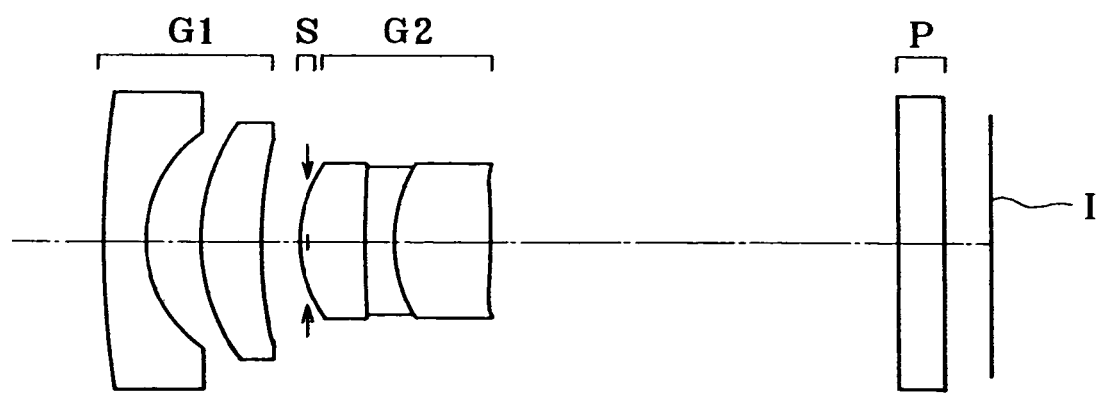

As shown in FIG. 2, Example 2 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a concave locus toward the object side, and is positioned nearer to the image plane side of the zoom lens system at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet lens consisting of, in order from its object side, a positive meniscus lens convex on its object side, a negative meniscus lens convex on its object side and a double-convex positive lens. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 3

Figure 3A:
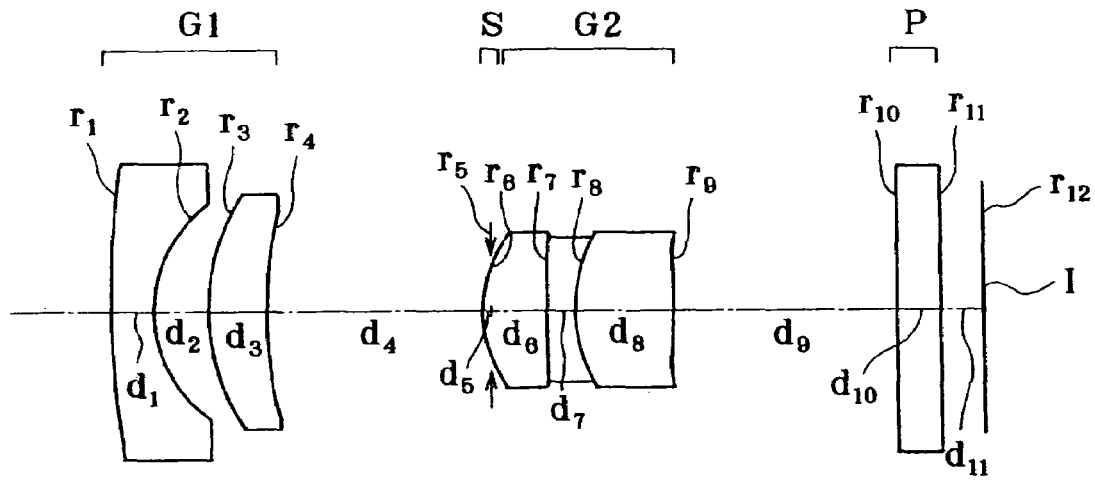
FIGS. 3(a), 3(b) and 3(c) are views, as in FIGS. 1(a), 1(b) and 1(c), of Example 3 of the zoom optical system according to the invention.
Figure 3B:
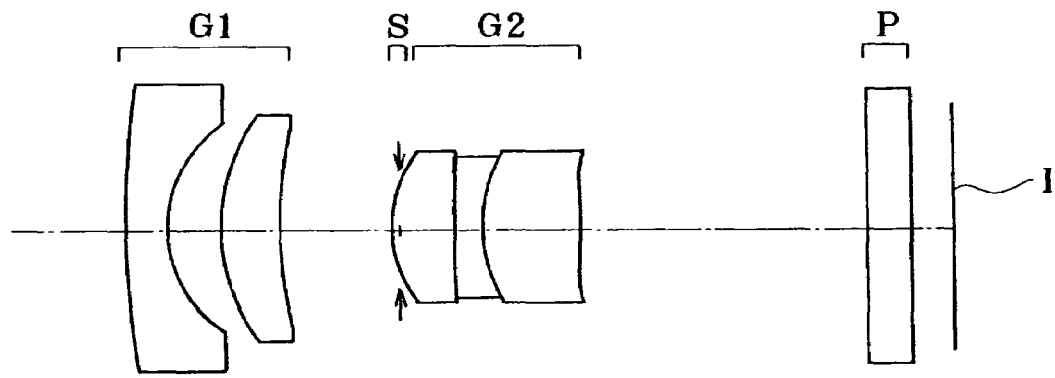
Figure 3C:
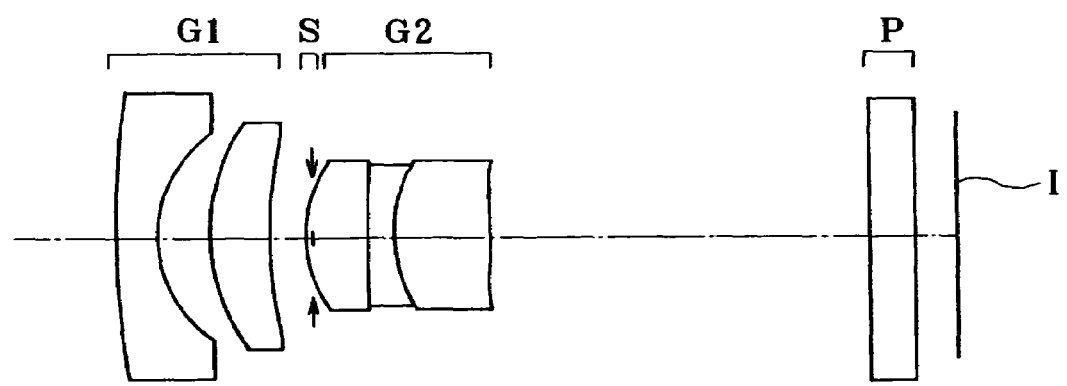

As shown in FIG. 3, Example 3 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a concave locus toward the object side, and is positioned nearer to the image plane side of the zoom lens system at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet lens consisting of, in order from its object side, a positive meniscus lens convex on its object side, a negative meniscus lens convex on its object side and a double-convex positive lens. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 4

Figure 4A:
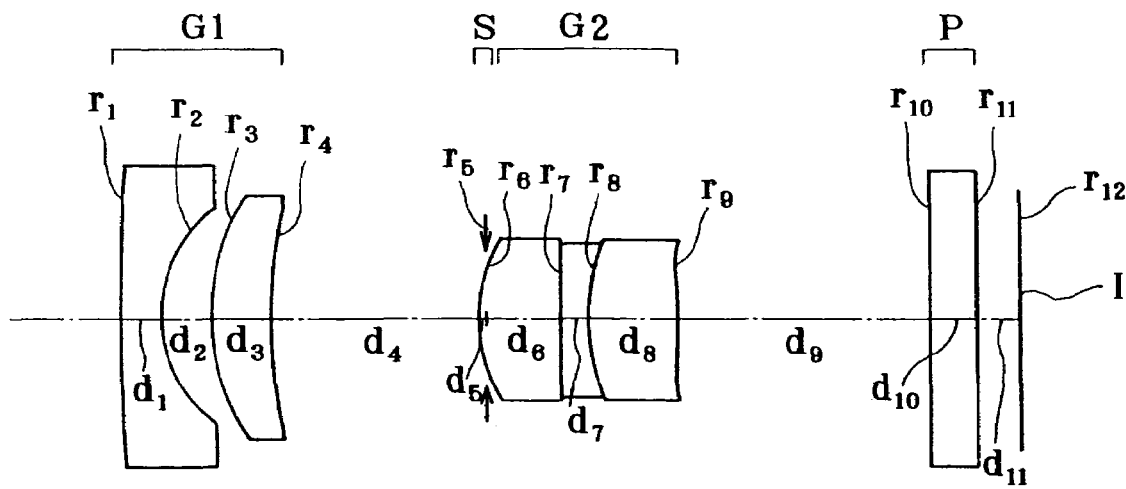
FIGS. 4(a), 4(b) and 4(c) are views, as in FIGS. 1(a), 1(b) and 1(c), of Example 4 of the zoom optical system according to the invention.
Figure 4B:
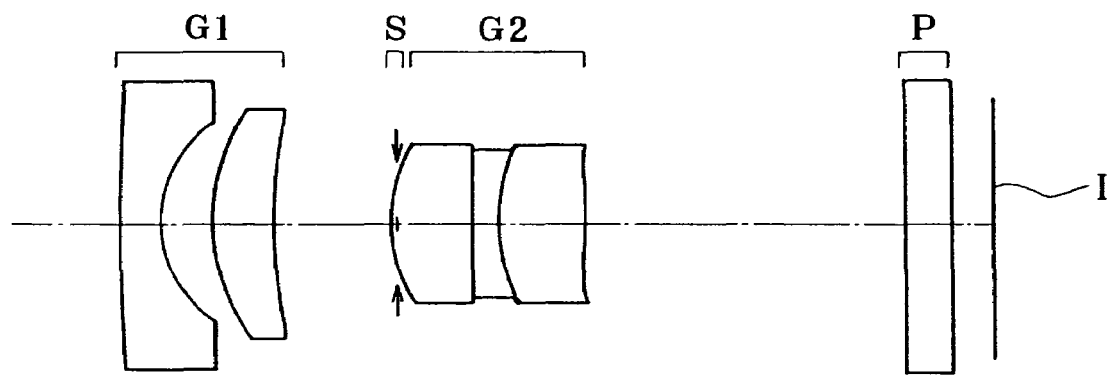
Figure 4C:
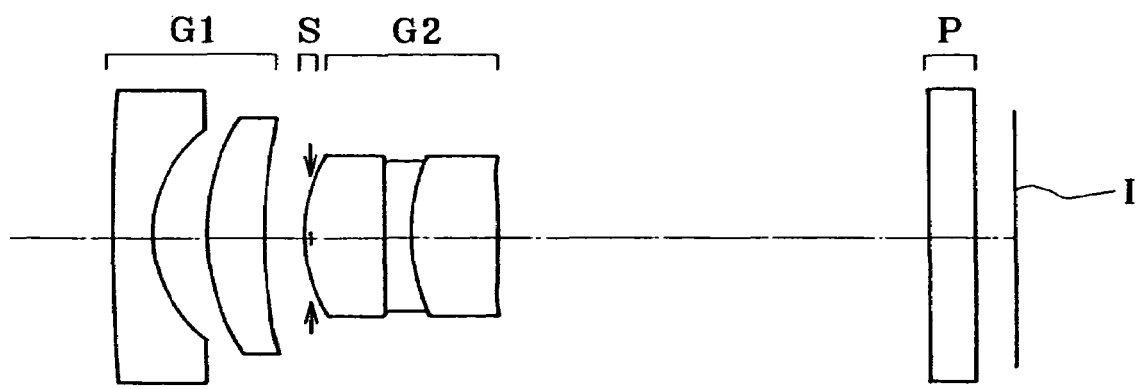

As shown in FIG. 4, Example 4 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a concave locus toward the object side, and is positioned nearer to the image plane side of the zoom lens system at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet lens consisting of, in order from its object side, a positive meniscus lens convex on its object side, a negative meniscus lens convex on its object side and a double-convex positive lens. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 5

Figure 5A:
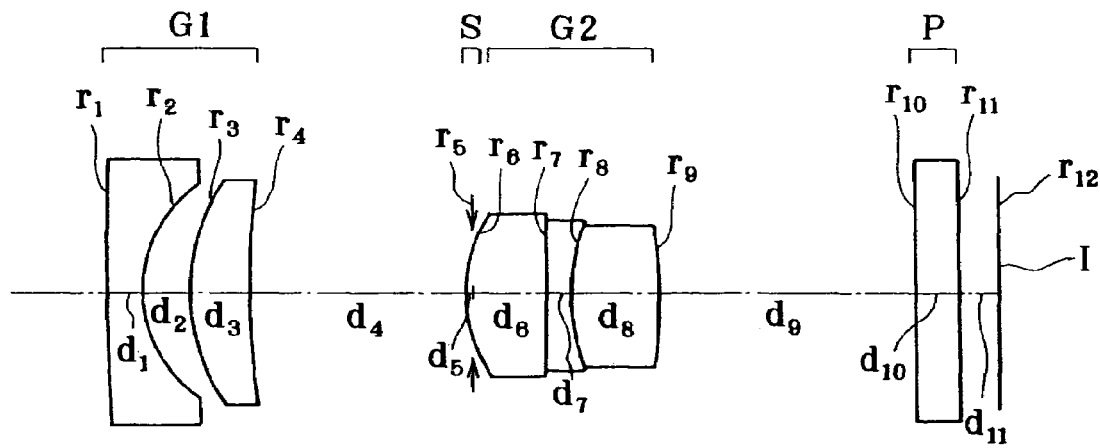
FIGS. 5(a), 5(b) and 5(c) are views, as in FIGS. 1(a), 1(b) and 1(c), of Example 5 of the zoom optical system according to the invention.
Figure 5B:
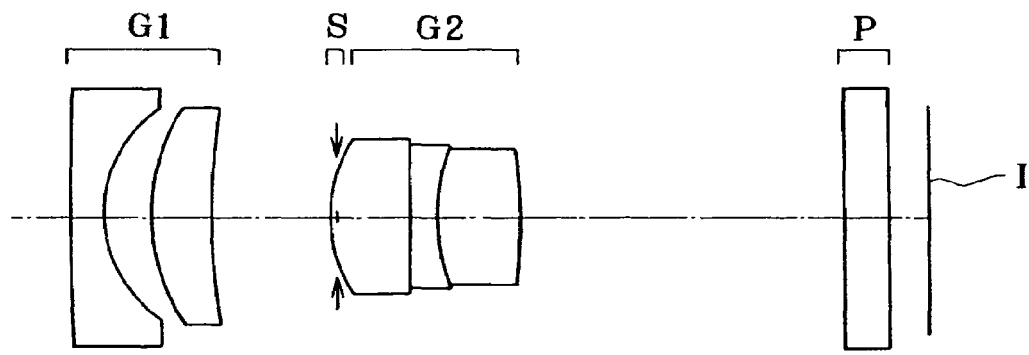
Figure 5C:
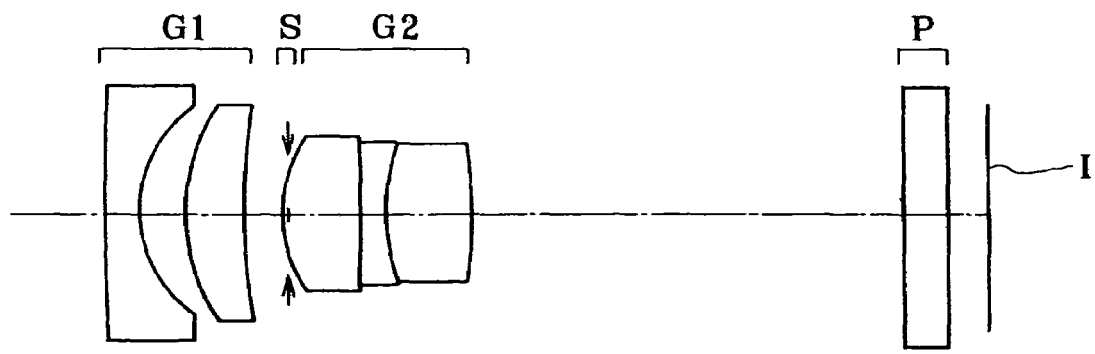

As shown in FIG. 5, Example 5 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a concave locus toward the object side, and is positioned nearer to the image plane side of the zoom lens system at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet lens consisting of, in order from its object side, a double-convex positive lens, a double-concave negative lens and a double-convex positive lens. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 6

Figure 6A:
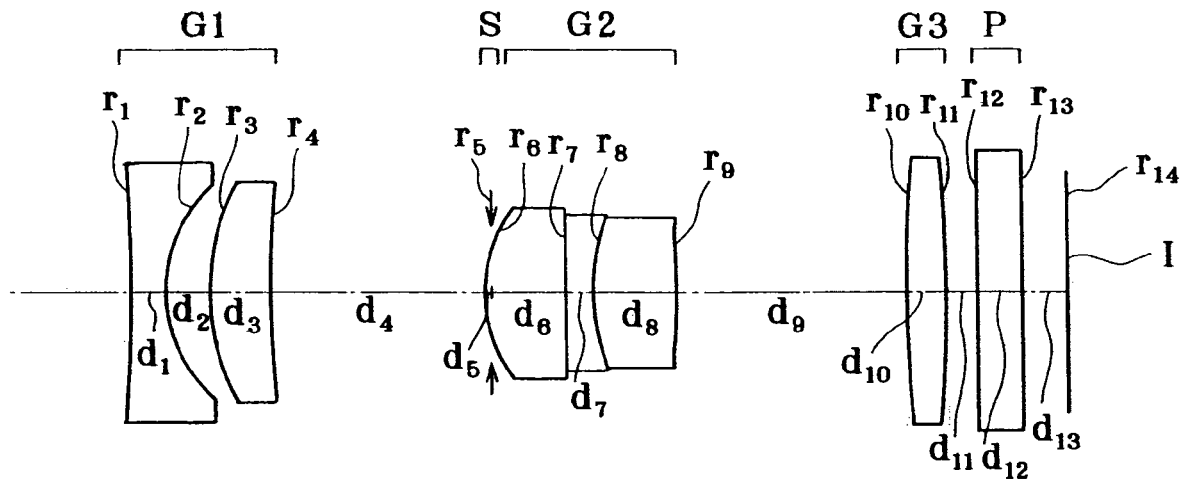
FIGS. 6(a), 6(b) and 6(c) are views, as in FIGS. 1(a), 1(b) and 1(c), of Example 6 of the zoom optical system according to the invention.
Figure 6B:
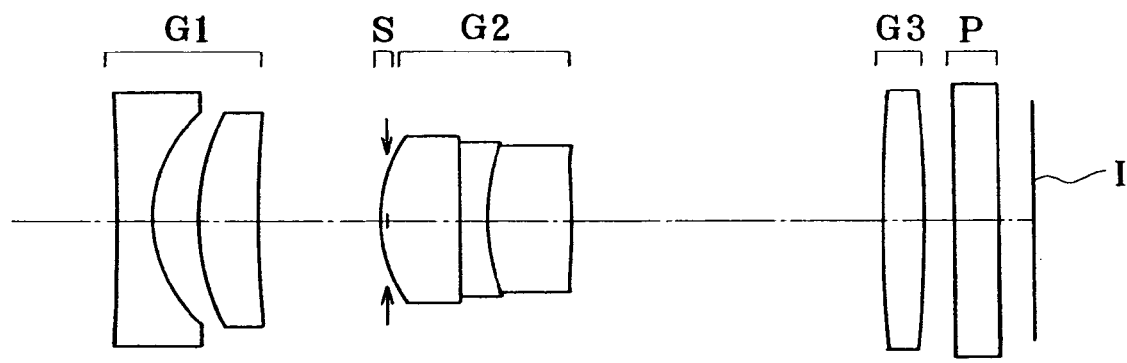
Figure 6C:
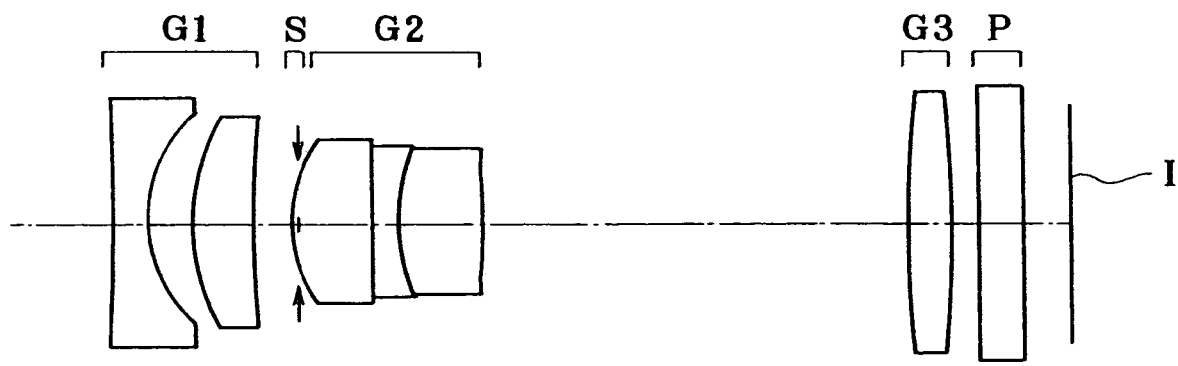

As shown in FIG. 6, Example 6 is directed to a zoom optical system made up of, in order its object side, a first lens group G1 having negative refracting power, an aperture stop S, a second lens group G2 having positive refracting power and a third lens group G3 having positive refracting power. Upon zooming from the wide-angle end to the telephoto end of the zoom lens system, the first lens group G1 moves in a concave locus toward the object side, and is positioned nearer to the object side of the zoom lens system at the telephoto end than at the wide-angle end. The second lens group G2 moves monotonously toward the object side in unison with the aperture stop S. The third lens group G3 moves in a concave locus toward the object side, and is positioned nearer to the object side at the telephoto end than at the wide-angle end.

The first lens group G1 is composed of, in order from its object side, a double-concave negative lens and a positive meniscus lens convex on its object side, the second lens group G2 is composed of a triplet lens consisting of, in order from its object side, a positive meniscus lens convex on its object side, a negative meniscus lens convex on its object side and a double-convex positive lens, and the third lens group G3 is composed of one double-convex positive lens. Three aspheric surfaces are used: one for the image plane-side surface of the double-concave negative lens in the first lens group G1, one for the surface nearest to the object side of the triplet lens forming the second lens group G2, and one for the surface nearest to the image plane-side thereof.

EXAMPLE 7

Figure 7A:
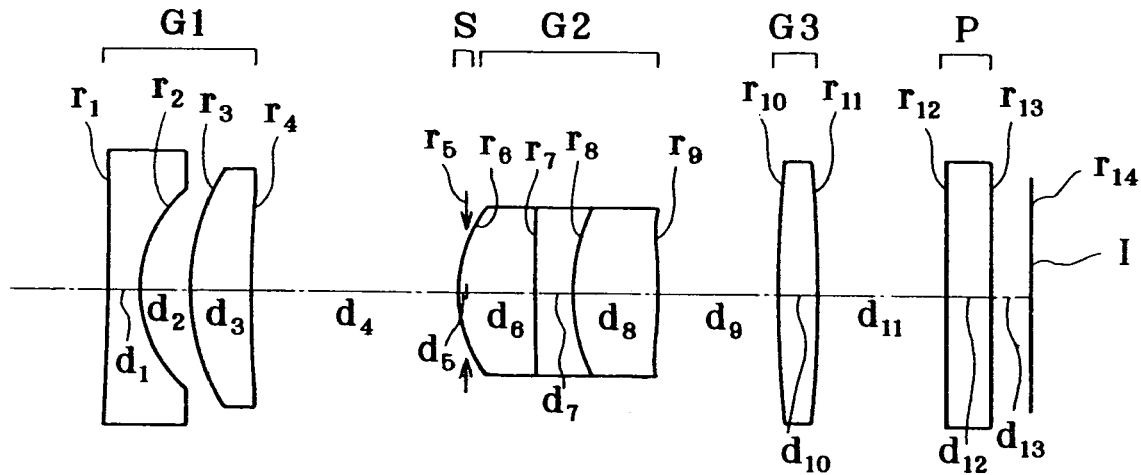
FIGS. 7(a), 7(b) and 7(c) are views, as in FIGS. 1(a), 1(b) and 1(c), of Example 7 of the zoom optical system according to the invention.
Figure 7B:
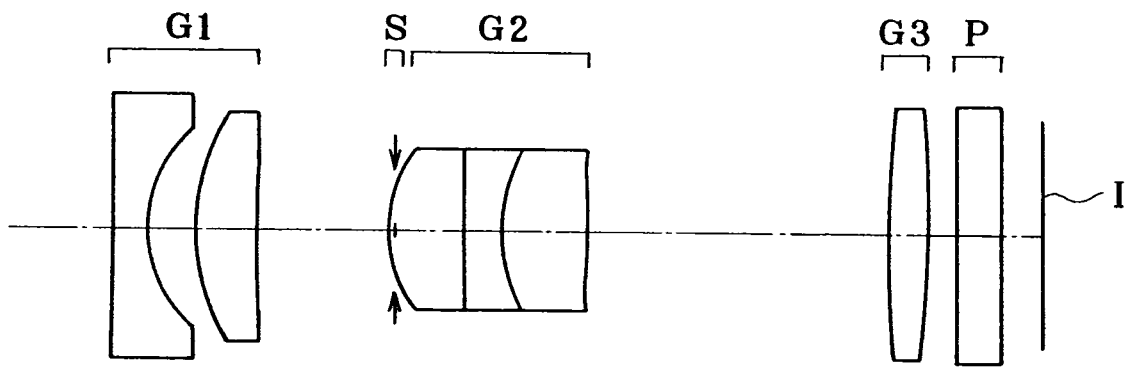
Figure 7C:
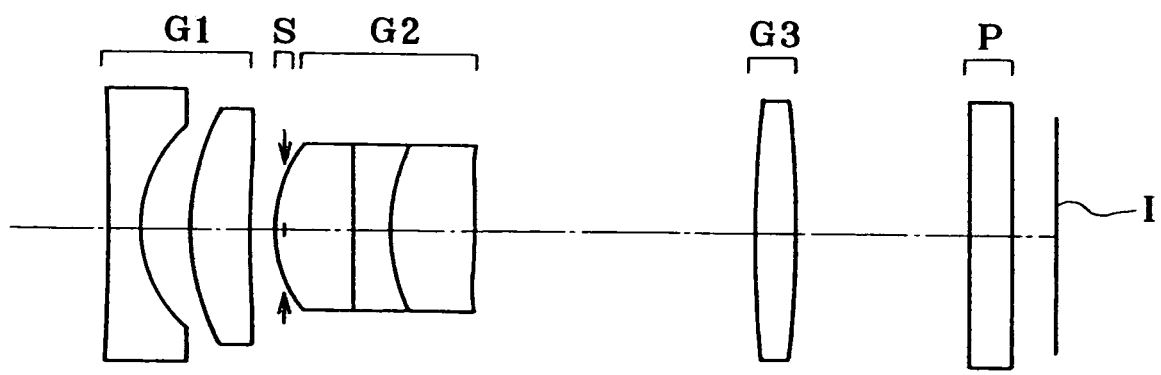

As shown in FIG. 7, Example 7 is directed to a zoom optical system made up of, in order its object side, a first lens group G1 having negative refracting power, an aperture stop S, a second lens group G2 having positive refracting power and a third lens group G3 having positive refracting power. Upon zooming from the wide-angle end to the telephoto end of the zoom lens system, the first lens group G1 moves toward the object side. The second lens group G2 moves monotonously toward the object side in unison with the aperture stop S. The third lens group G3 moves in a concave locus toward the object side, and is positioned nearer to the object side at the telephoto end than at the wide-angle end.

The first lens group G1 is composed of, in order from its object side, a double-concave negative lens and a positive meniscus lens convex on its object side, the second lens group G2 is composed of a triplet lens consisting of, in order from its object side, a positive meniscus lens convex on its object side, a negative meniscus lens convex on its object side and a double-convex positive lens, and the third lens group G3 is composed of one double-convex positive lens. Three aspheric surfaces are used: one for the image plane-side surface of the double-concave negative lens in the first lens group G1, one for the surface nearest to the object side of the triplet lens forming the second lens group G2, and one for the surface nearest to the image plane-side thereof.

EXAMPLE 8

Figure 8A:
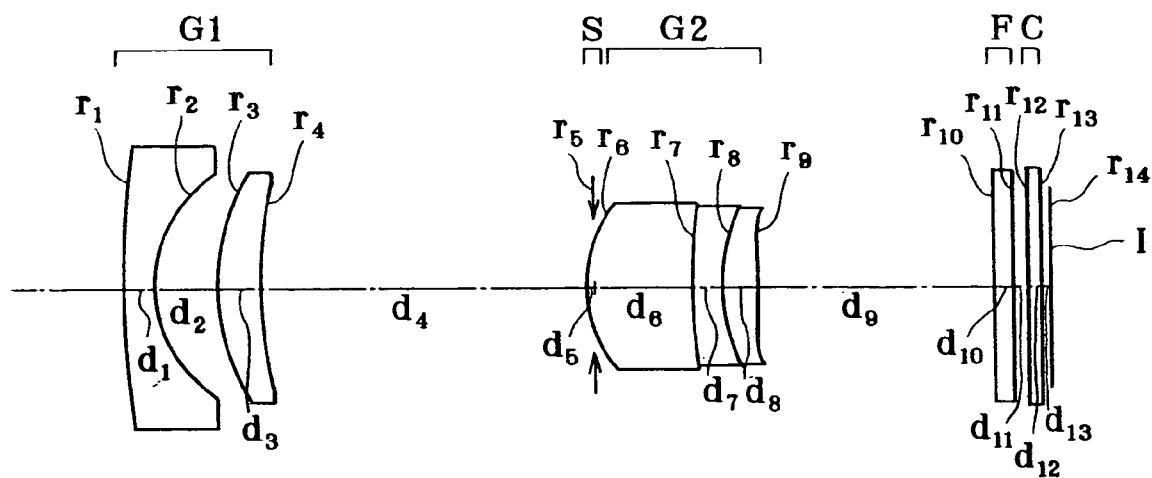
FIGS. 8(a), 8(b) and 8(c) are views, as in FIGS. 1(a), 1(b) and 1(c), of Example 8 of the zoom optical system according to the invention.
Figure 8B:
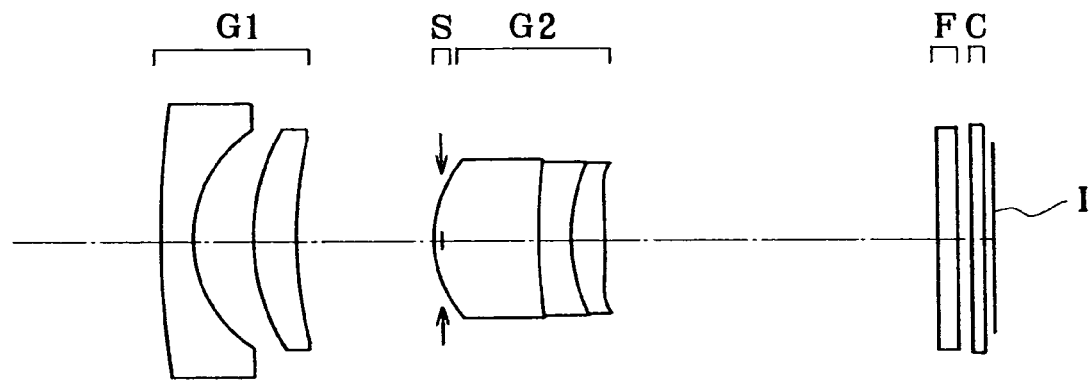
Figure 8C:
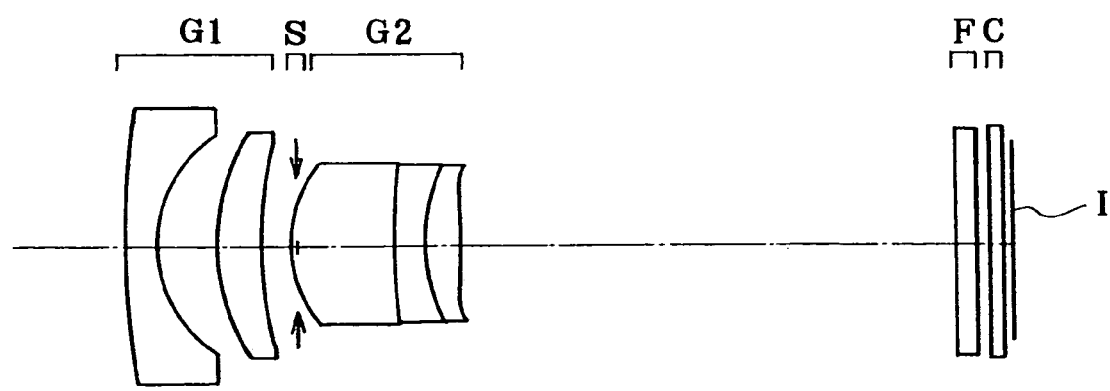

As shown in FIG. 8, Example 8 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a convex locus toward the image plane side of the zoom optical system, and is positioned nearer to the image plane side at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet lens consisting of, in order from its object side, a positive meniscus lens convex on its object side, a negative meniscus lens convex on its object side and a double-convex positive lens. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 9

Figure 9A:
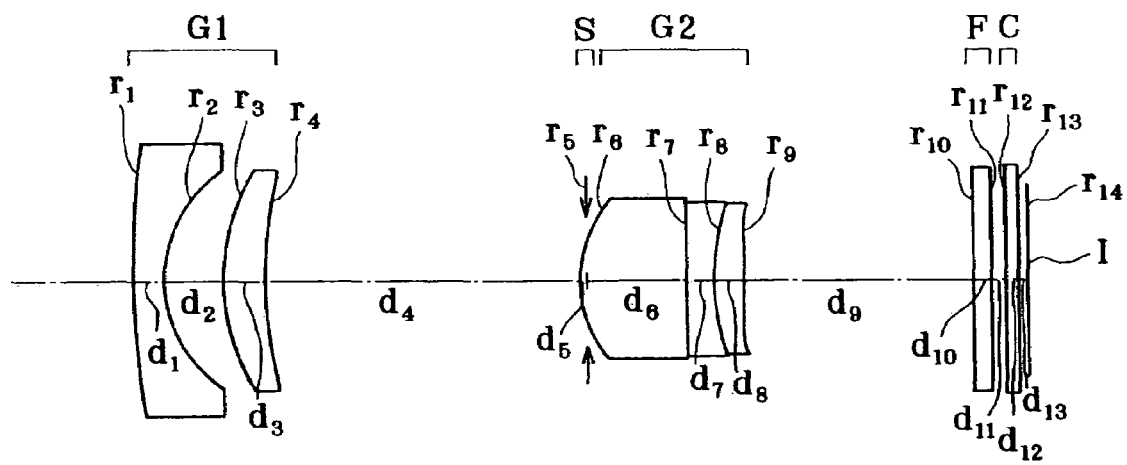
FIGS. 9(a), 9(b) and 9(c) are views, as in FIGS. 1(a), 1(b) and 1(c), of Example 9 of the zoom optical system according to the invention.
Figure 9B:
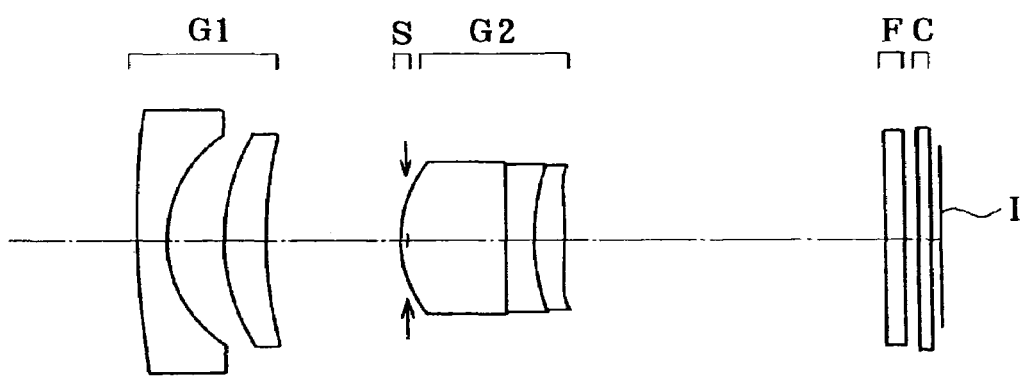
Figure 9C:
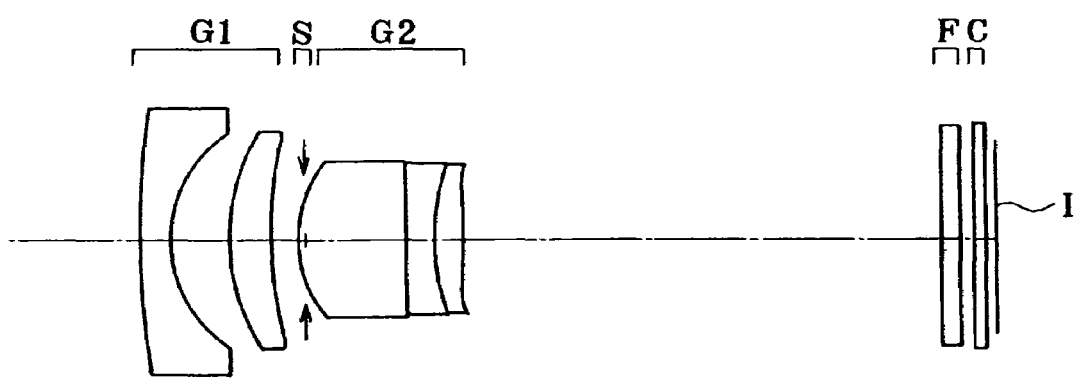

As shown in FIG. 9, Example 9 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a convex locus toward the image plane side of the zoom optical system, and is positioned nearer to the image plane side at the telephoto end than at the wide-angle end. The second lens group G2 moves monotonously toward the object side in unison with the aperture stop S.

The first-lens group G1 is composed of, in order from its object side, a negative meniscus lens convex on its object side and a positive meniscus lens convex on its object side, and the second lens group G2 is composed of a triplet lens consisting of, in order from its object side, a positive meniscus lens convex on its object side, a negative meniscus lens convex on its object side and a double-convex positive lens. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 10

Figure 10A:
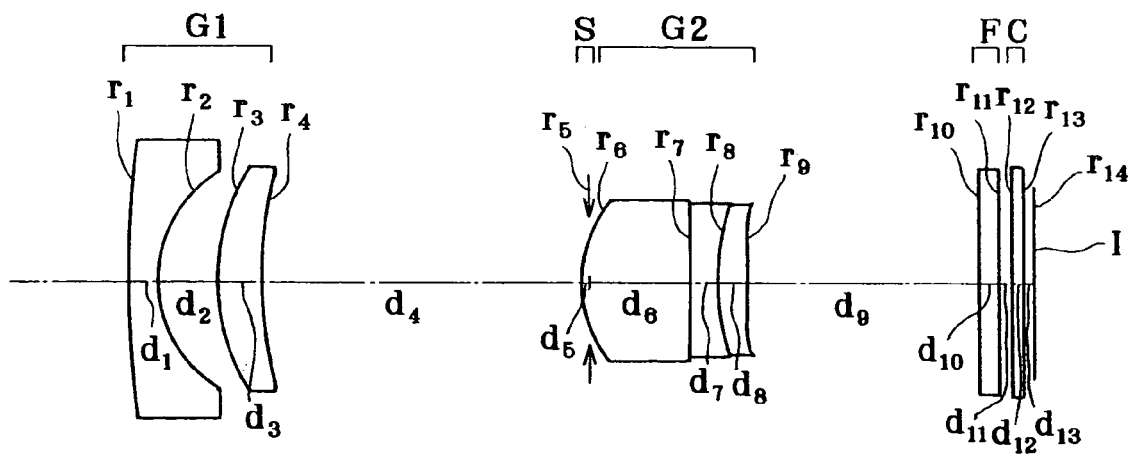
FIGS. 10(a), 10(b) and 10(c) are views, as in FIGS. 1(a), 1(b) and 1(c), of Example 10 of the zoom optical system according to the invention.
Figure 10B:
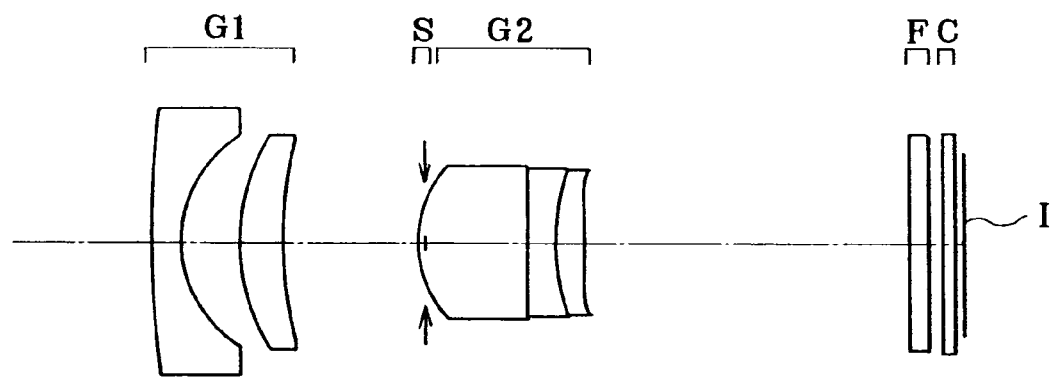
Figure 10C:
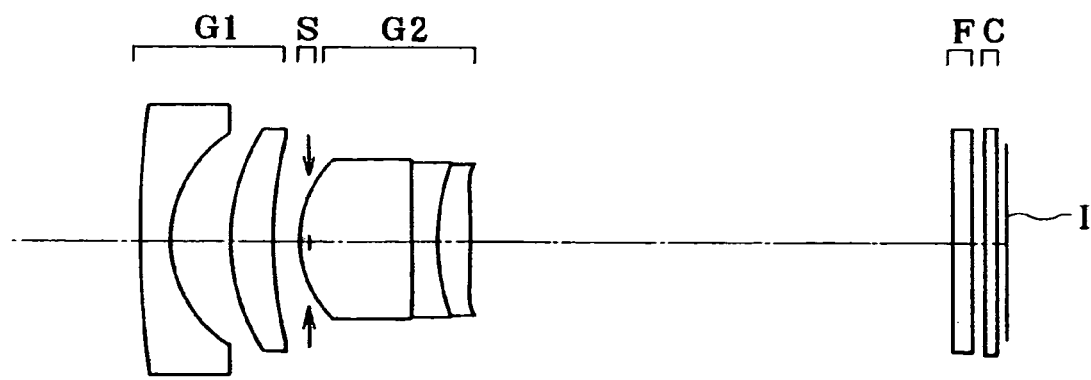

As shown in FIG. 10, Example 10 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a convex locus toward the image plane side of the zoom optical system, and is positioned nearer to the image plane side at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet lens consisting of, in order from its object side, a plano-convex lens convex on its object side, a plano-concave negative lens and a double-convex positive lens. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 11

Figure 11A:
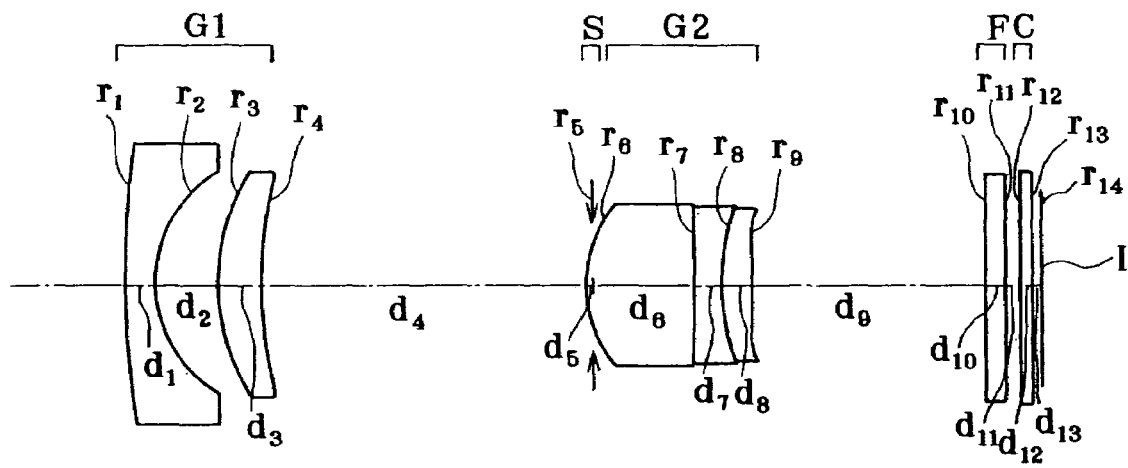
FIGS. 11(a), 11(b) and 11(c) are views, as in FIGS. 1(a), 1(b) and 1(c), of Example 11 of the zoom optical system according to the invention.
Figure 11B:
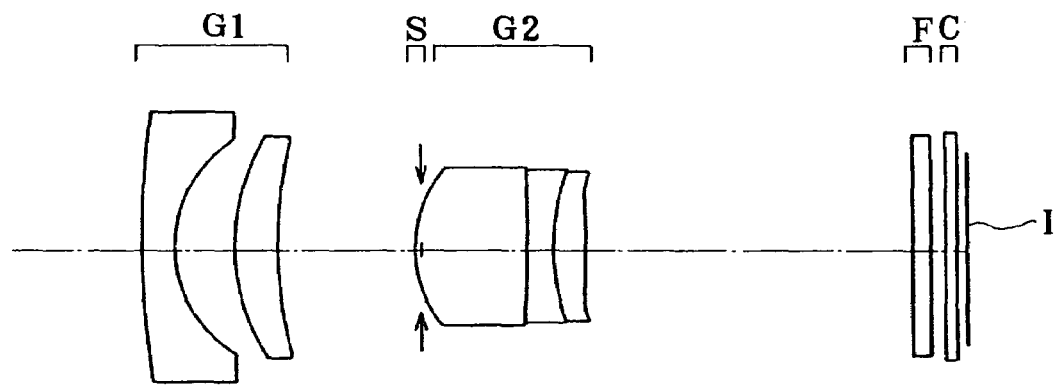
Figure 11C:
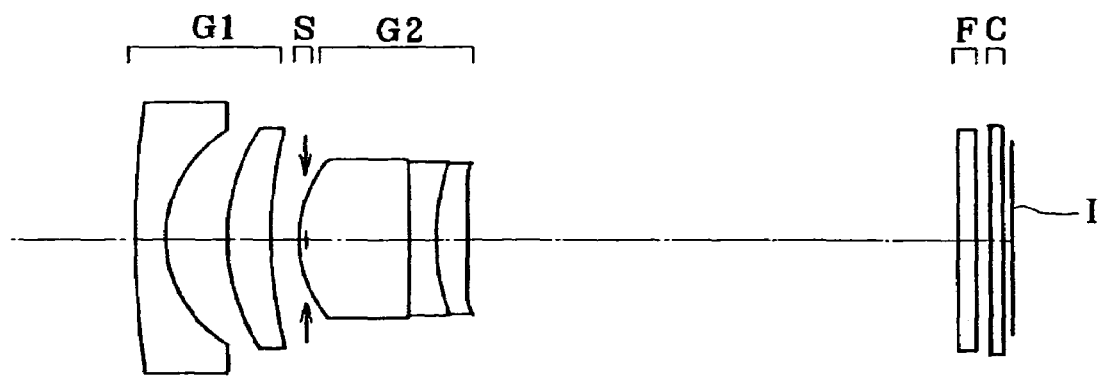

As shown in FIG. 11, Example 11 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a convex locus toward the image plane side of the zoom optical system, and is positioned nearer to the image plane side at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet consisting of, in order from its object side, a double-convex positive lens, a double-concave negative lens and a double-convex positive lens. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 12

Figure 12A:
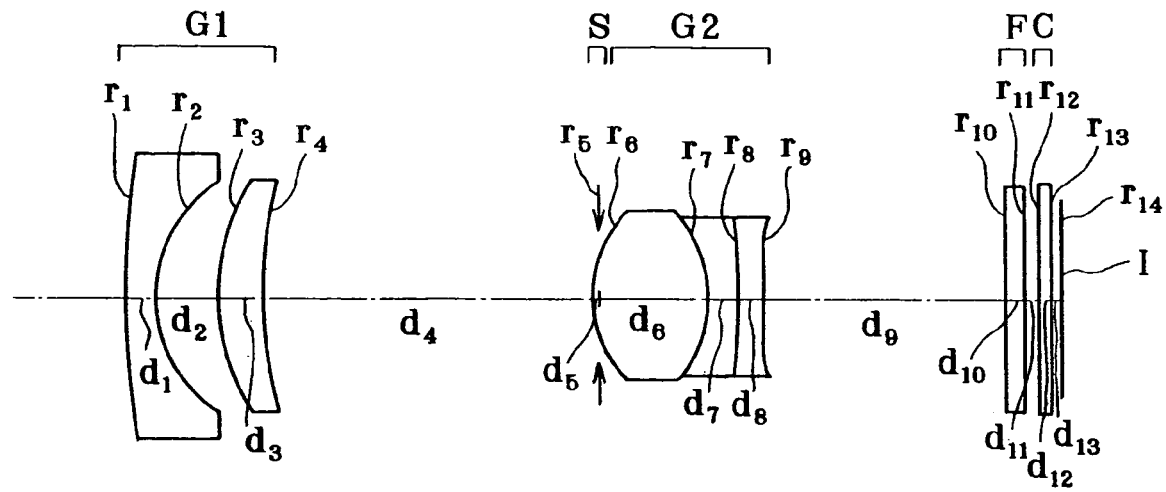
FIGS. 12(a), 12(b) and 12(c) are views, as in FIGS. 1(a), 1(b) and 1(c), of Example 12 of the zoom optical system according to the invention.
Figure 12B:
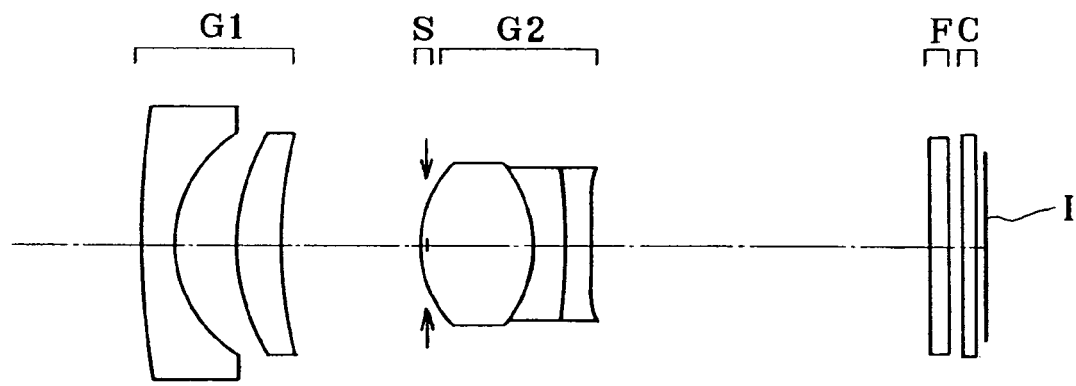
Figure 12C:
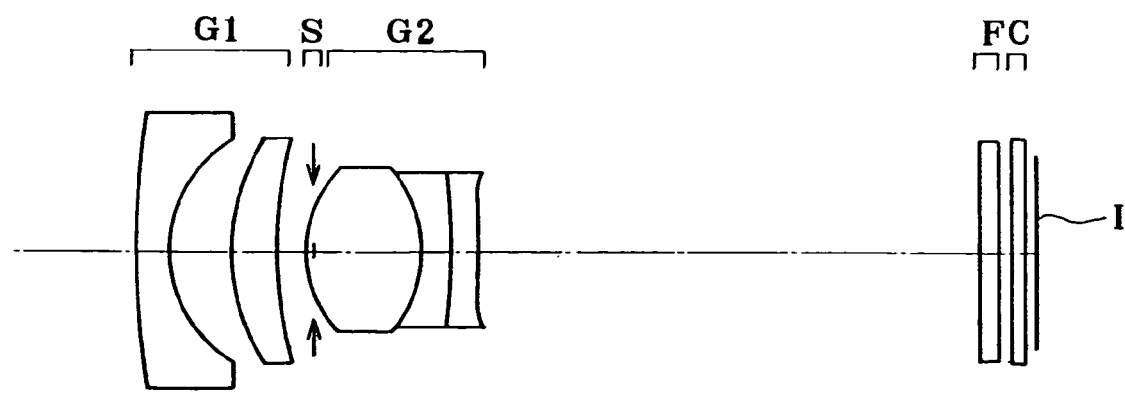

As shown in FIG. 12, Example 12 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a convex locus toward the image plane side of the zoom optical system, and is positioned nearer to the image plane side at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet consisting of, in order from its object side, a double-convex positive lens, a negative meniscus lens convex on its image plane side and a negative meniscus lens convex on its image plane side. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 13

Figure 13A:
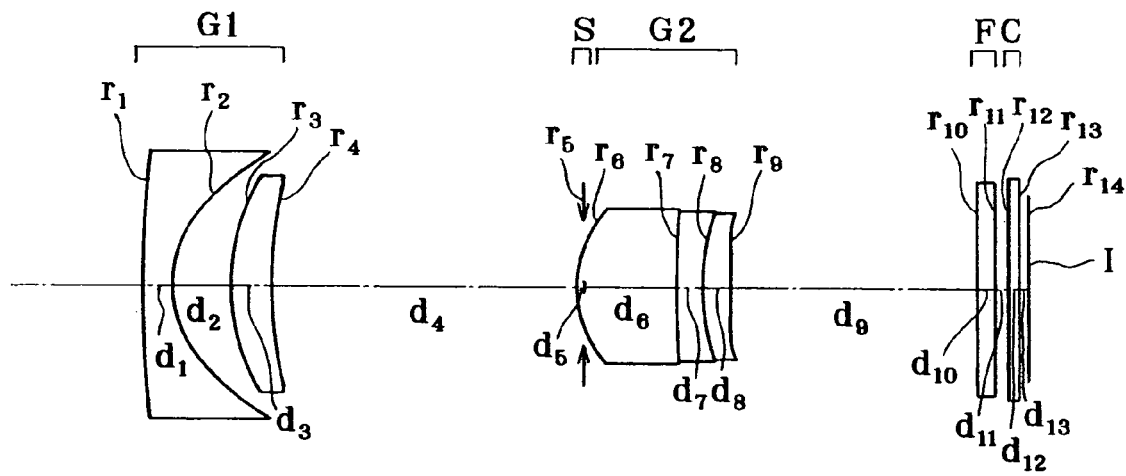
FIGS. 13(a), 13(b) and 13(c) are views, as in FIGS. 1(a), 1(b) and 1(c), of Example 13 of the zoom optical system according to the invention.
Figure 13B:
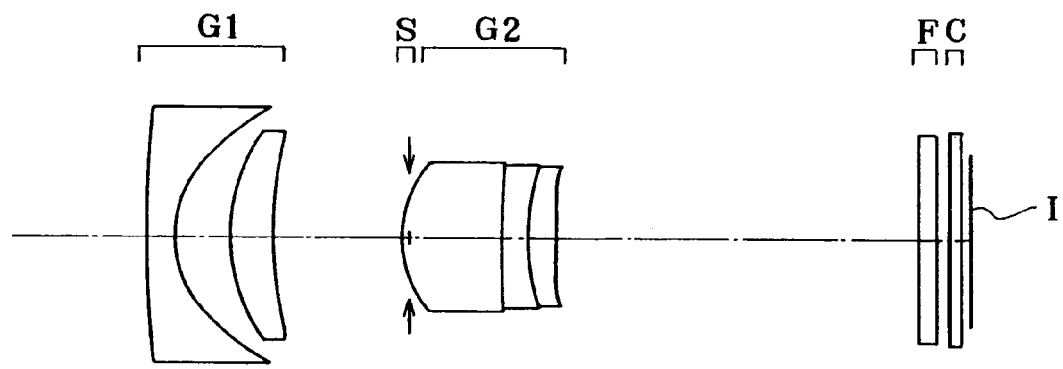
Figure 13C:
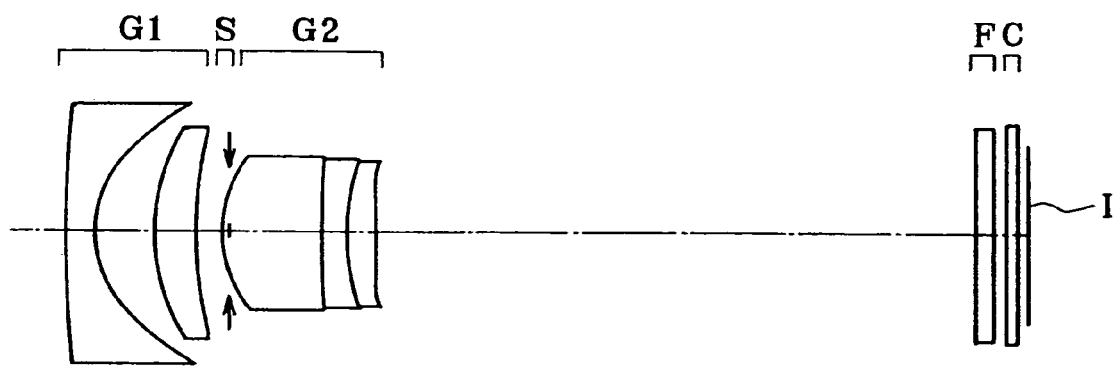

As shown in FIG. 13, Example 13 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a convex locus toward the image plane side of the zoom optical system, and is positioned nearer to the object side at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet lens consisting of, in order from its object side, a positive meniscus lens convex on its object side, a negative meniscus lens convex on its object side and a double-convex positive lens. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 14

Figure 14A:
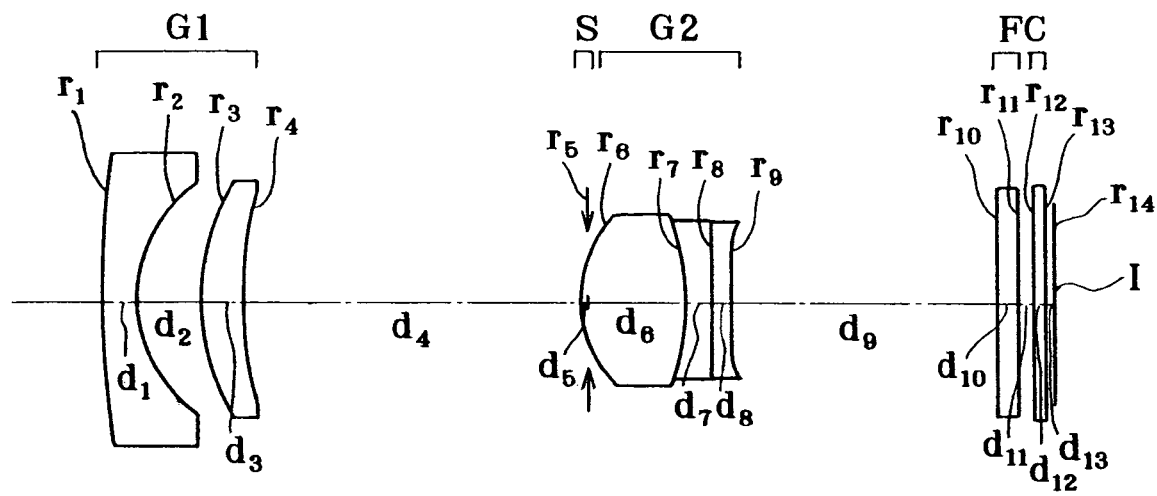
FIGS. 14(a), 14(b) and 14(c) are views, as in FIGS. 1(a), 1(b) and 1(c), of Example 14 of the zoom optical system according to the invention.
Figure 14B:
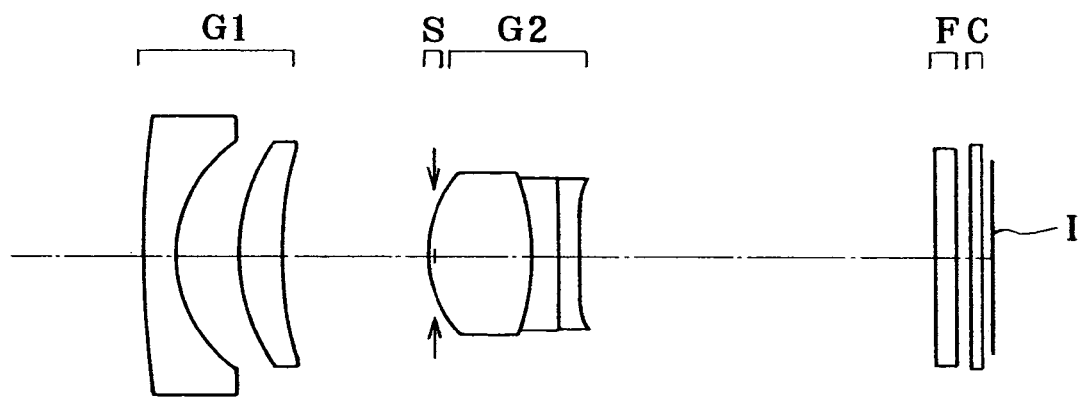
Figure 14C:
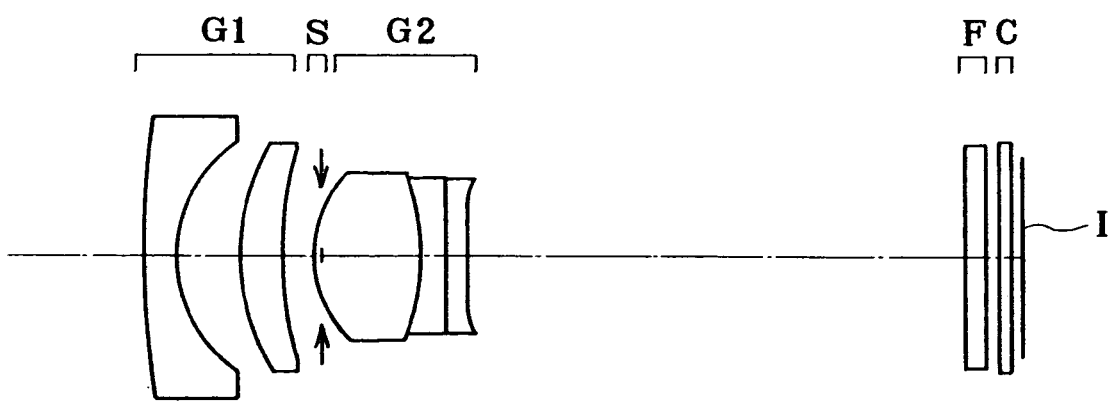

As shown in FIG. 14, Example 14 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a convex locus toward the image plane side of the zoom optical system, and is positioned nearer to the image plane side at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet lens consisting of, in order from its object side, a double-convex positive lens, a negative meniscus lens convex on its image plane side and a positive meniscus lens convex on its image plane side. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 15

Figure 15A:
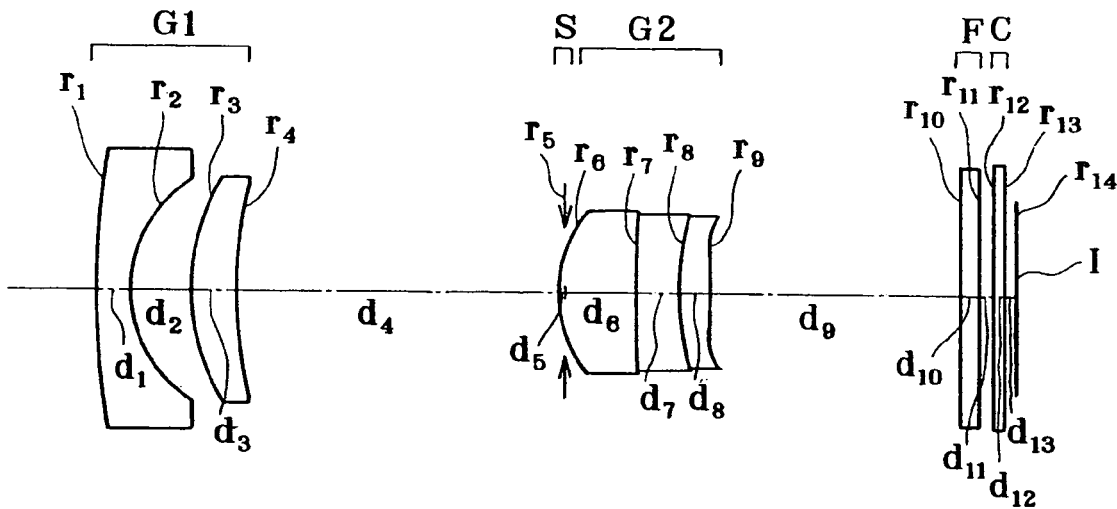
FIGS. 15(a), 15(b) and 15(c) are views, as in FIGS. 1(a), 1(b) and 1(c), of Example 15 of the zoom optical system according to the invention.
Figure 15B:
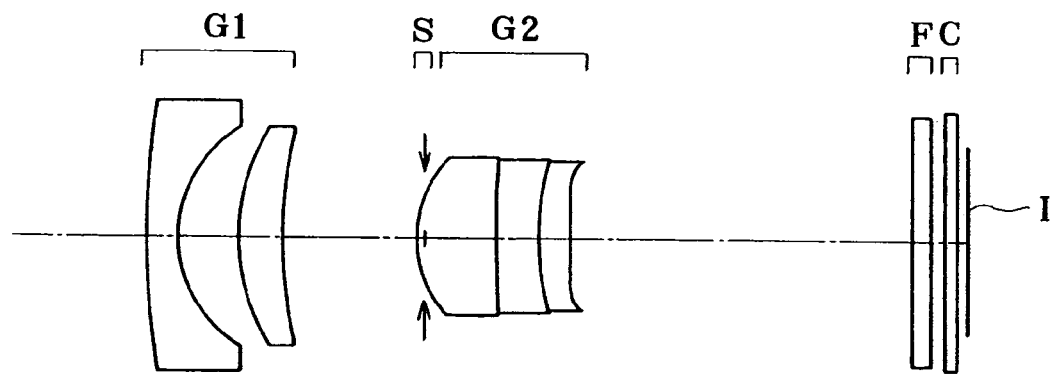
Figure 15C:
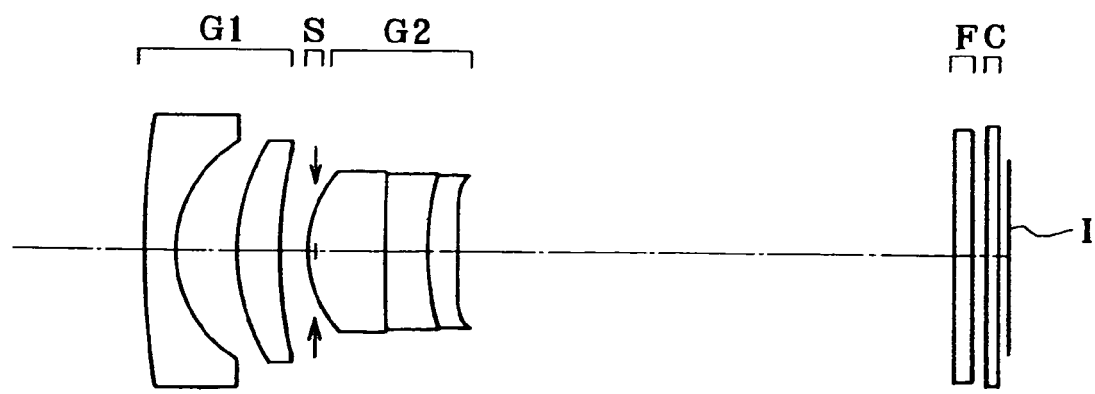

As shown in FIG. 15, Example 15 is directed to a zoom optical system made up of, in order its object side, a first lens group G1 having negative refracting power, an aperture stop S and a second lens group G2 having positive refracting power. Upon zooming from the wide-angle end to the telephoto end of the zoom lens system, the first lens group G1 moves in a convex locus toward the image plane side of the zoom optical system, and is positioned nearer to the image plane side at the telephoto end than at the wide-angle end. The second lens group G2 moves monotonously toward the object side in unison with the aperture stop S.

The first lens group G1 is composed of, in order from its object side, a negative meniscus lens convex on its object side and a positive meniscus lens convex on its object side, and the second lens group G2 is composed of a triplet lens consisting of, in order from its object side, a positive meniscus lens convex on its object side, a positive meniscus lens convex on its object side and a double-convex positive lens. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 16

Figure 16A:
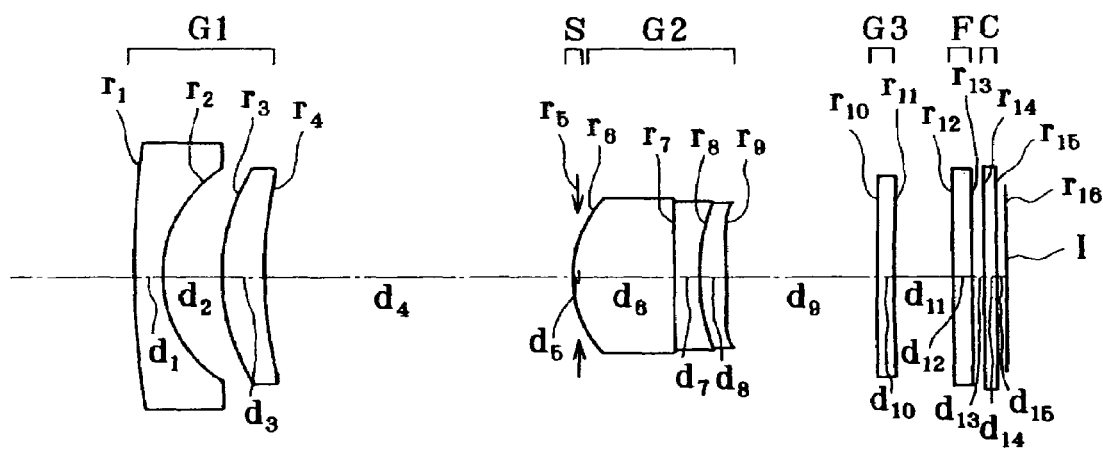
FIGS. 16(a), 16(b) and 16(c) are views, as in FIGS. 1(a), 1(b) and 1(c), of Example 16 of the zoom optical system according to the invention.
Figure 16B:
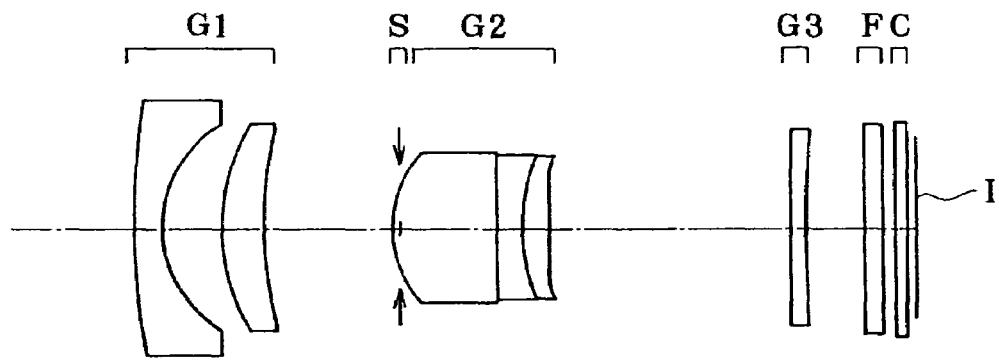
Figure 16C:
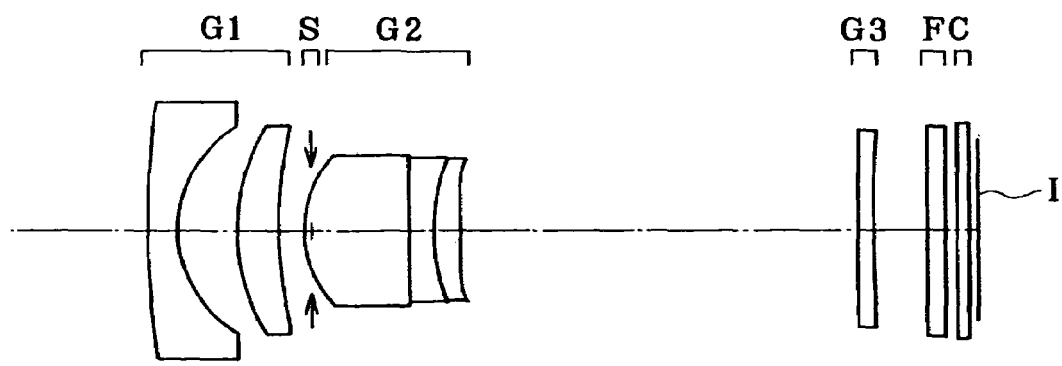

As shown in FIG. 16, Example 16 is directed to a zoom optical system made up of, in order its object side, a first lens group G1 having negative refracting power, an aperture stop S, a second lens group G2 having positive refracting power and a third lens group G3 having weak negative refracting power. Upon zooming from the wide-angle end to the telephoto end of the zoom lens system, the first lens group G1 moves in a convex locus toward the image plane side of the zoom optical system, and is positioned nearer to the image plane side at the telephoto end than at the wide-angle end. The second lens group G2 moves monotonously toward the object side in unison with the aperture stop S, and the third lens group G3 moves toward the image plane side for compensation for an image plane.

The first lens group G1 is composed of, in order from its object side, a negative meniscus lens convex on its object side and a positive meniscus lens convex on its object side, the second lens group G2 is composed of a triplet consisting of, in order from its object side, a positive meniscus lens convex on its object side, a negative meniscus lens convex on its object side and a double-convex positive lens, and the third lens group G3 is composed of one negative meniscus lens convex on its object side. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

EXAMPLE 17

Figure 17A:
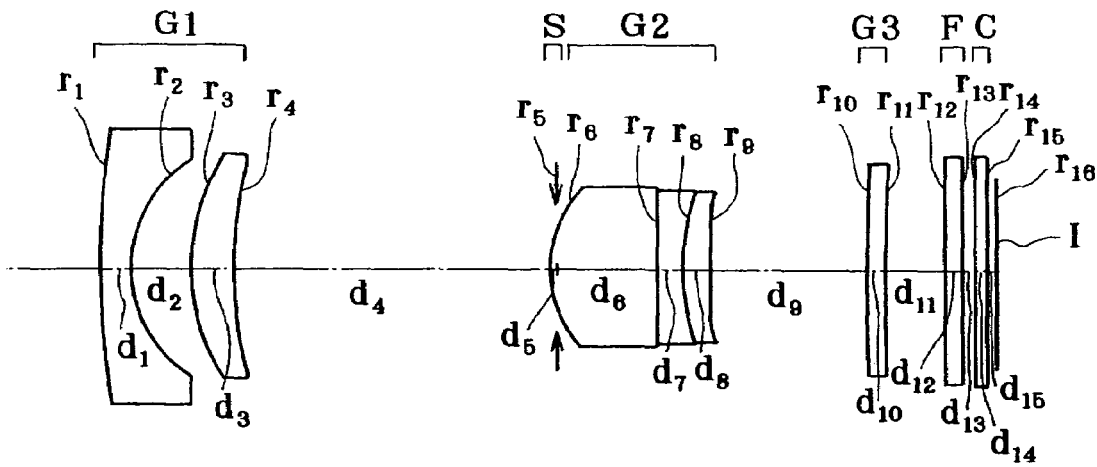
FIGS. 17(a), 17(b) and 17(c) are views, as in FIGS. 1(a), 1(b) and 1(c), of Example 17 of the zoom optical system according to the invention.
Figure 17B:
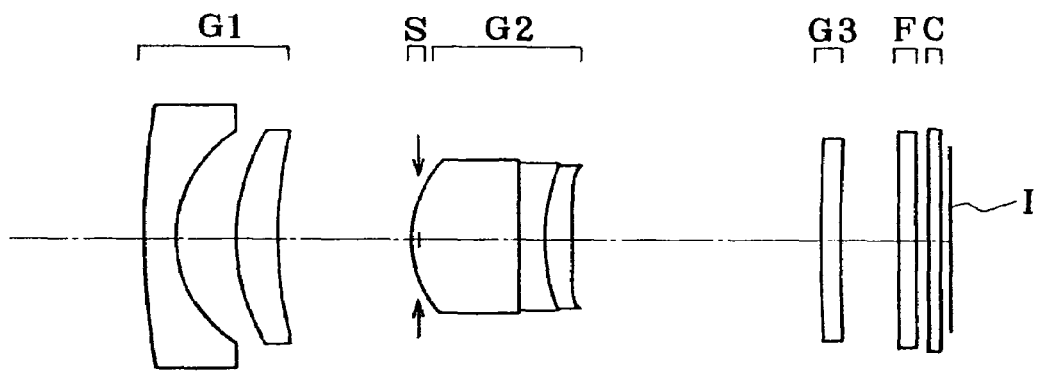
Figure 17C:
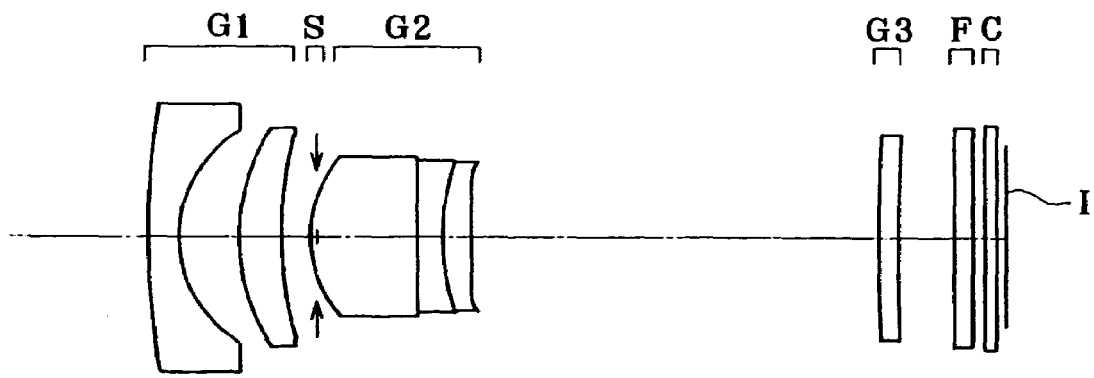
Figure 18A:
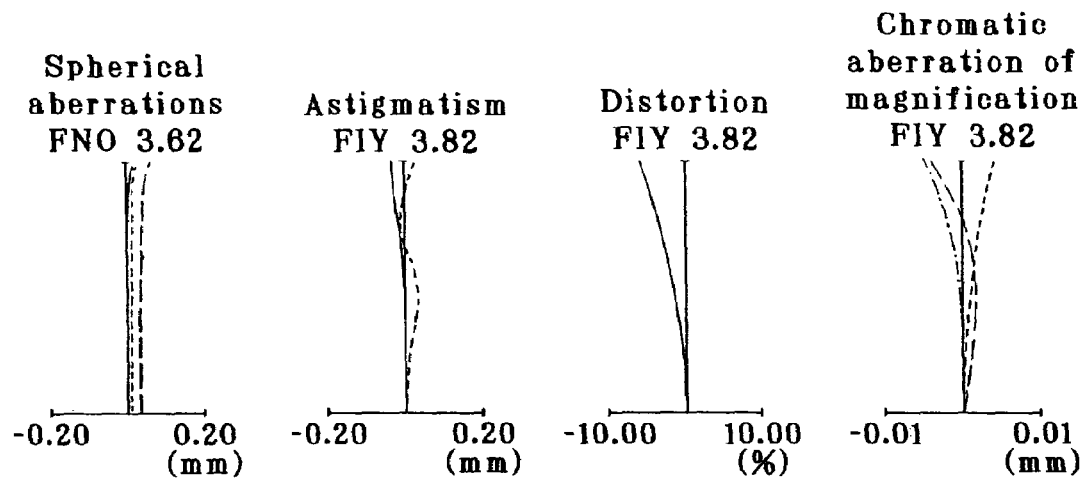
FIGS. 18(a), 18(b) and 18(c) are aberration diagrams for Example 1 upon focusing on an infinite object point.
Figure 18B:
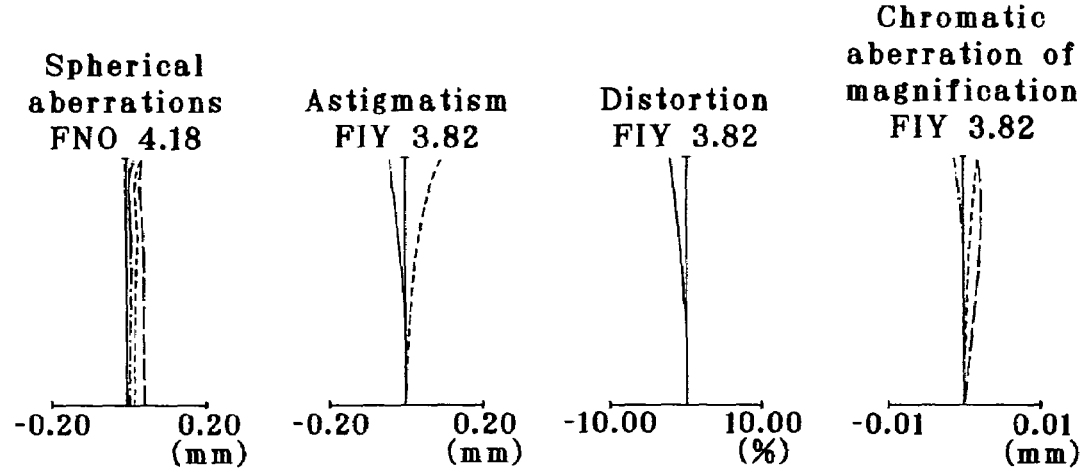
Figure 18C:
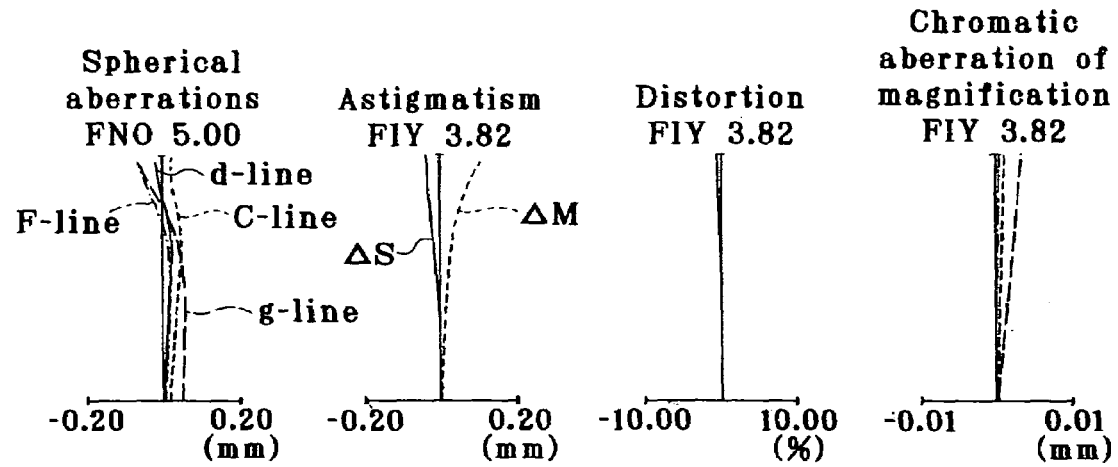
Figure 19A:
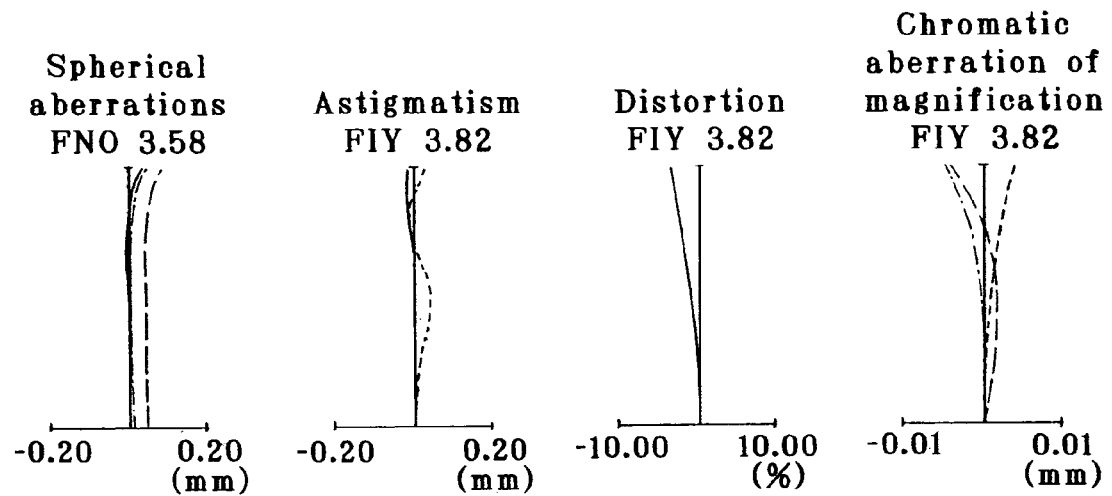
FIGS. 19(a), 19(b) and 19(c) are aberration diagrams for Example 2 upon focusing on an infinite object point.
Figure 19B:
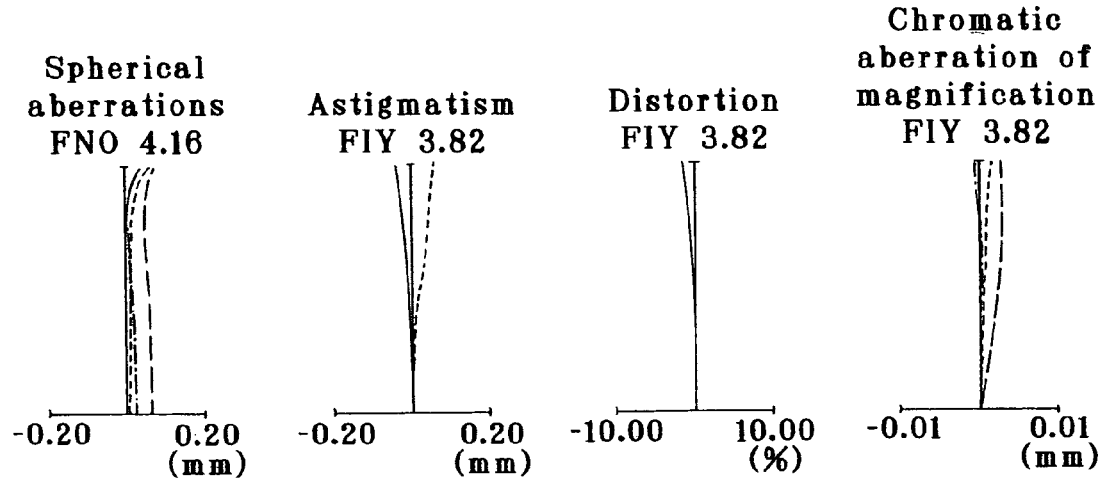
Figure 19C:
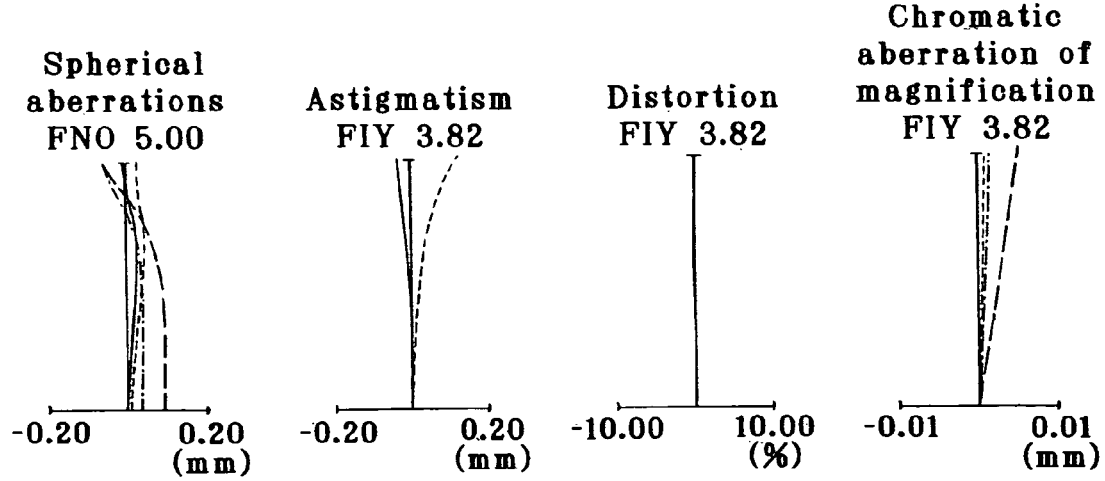
Figure 20A:
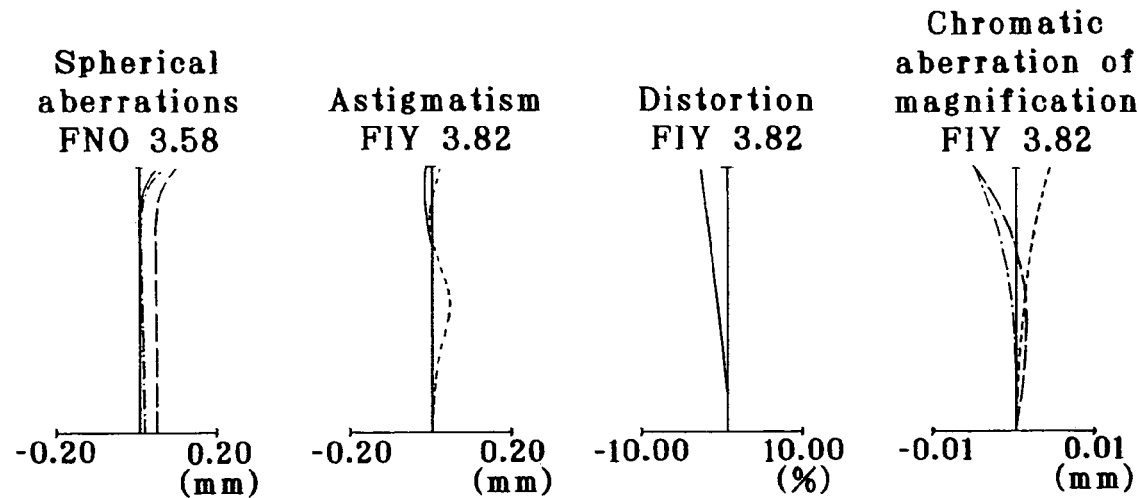
FIGS. 20(a), 20(b) and 20(c) are aberration diagrams for Example 3 upon focusing on an infinite object point.
Figure 20B:
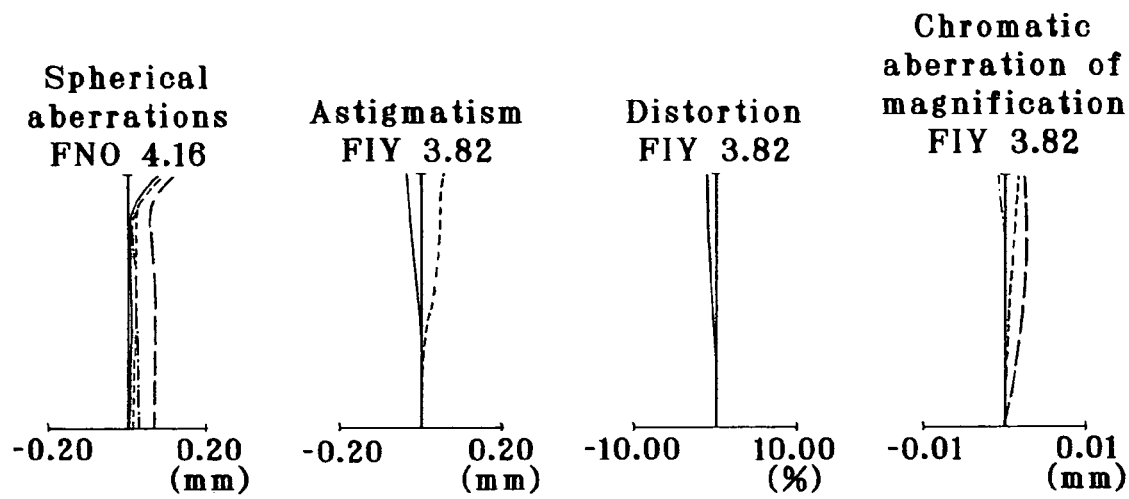
Figure 20C:
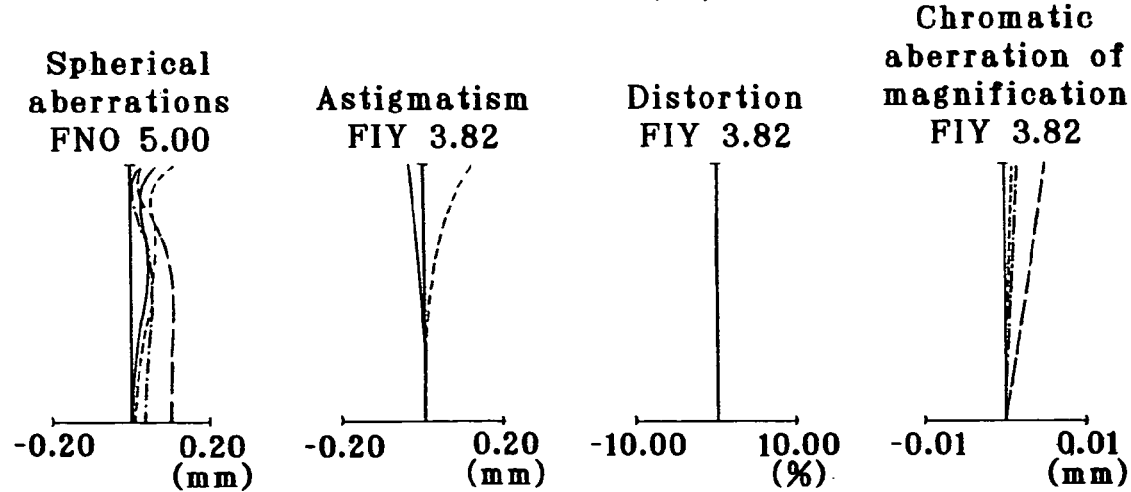
Figure 21A:
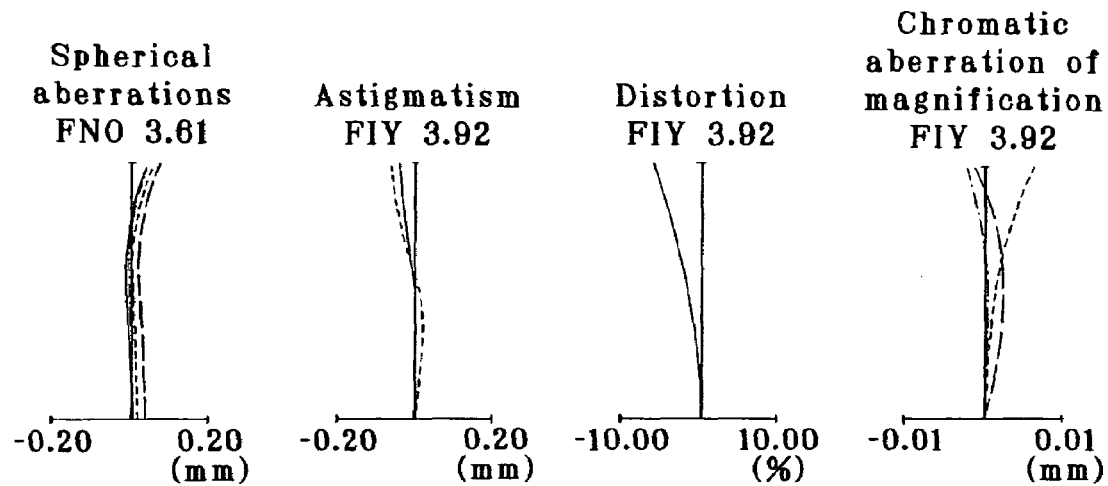
FIGS. 21(a), 21(b) and 21(c) are aberration diagrams for Example 4 upon focusing on an infinite object point.
Figure 21B:
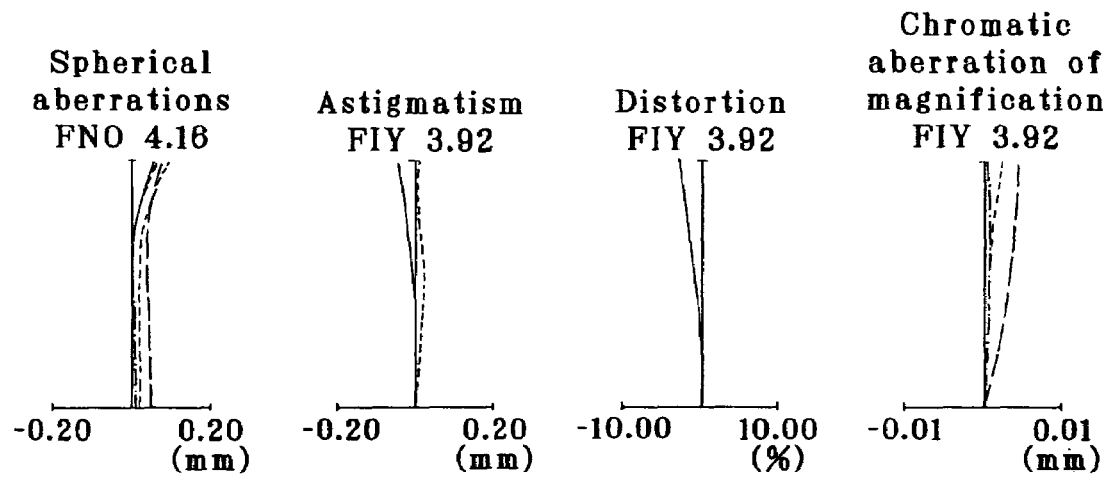
Figure 21C:
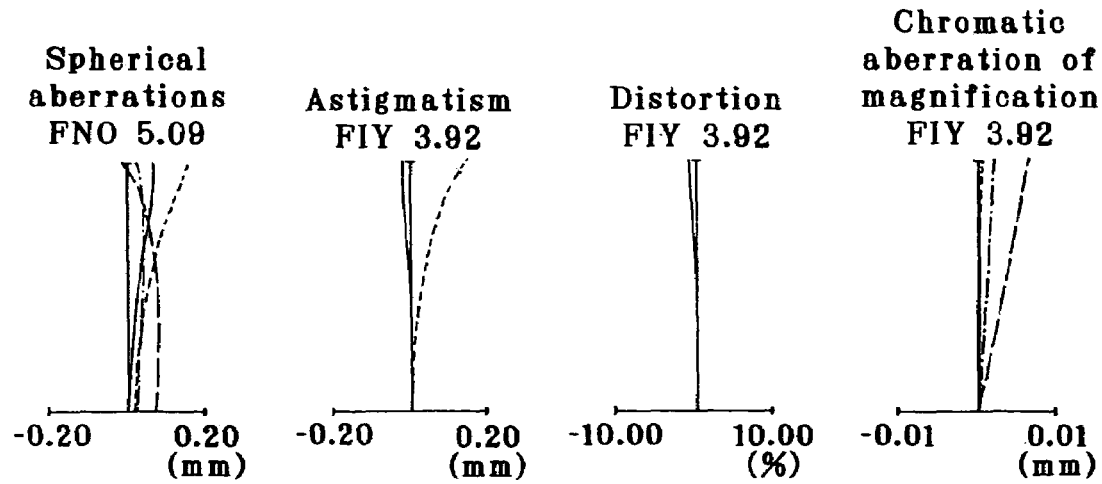
Figure 22A:
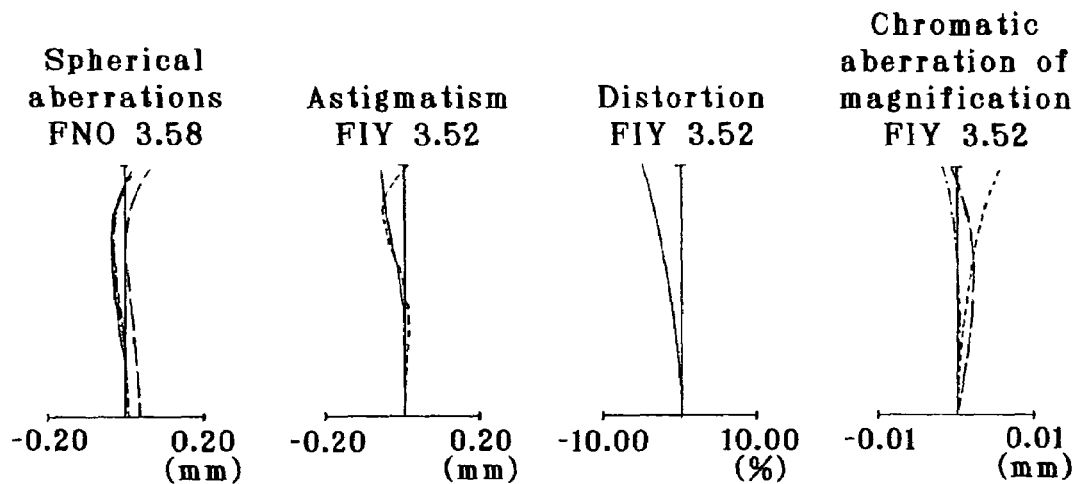
FIGS. 22(a), 22(b) and 22(c) are aberration diagrams for Example 5 upon focusing on an infinite object point.
Figure 22B:
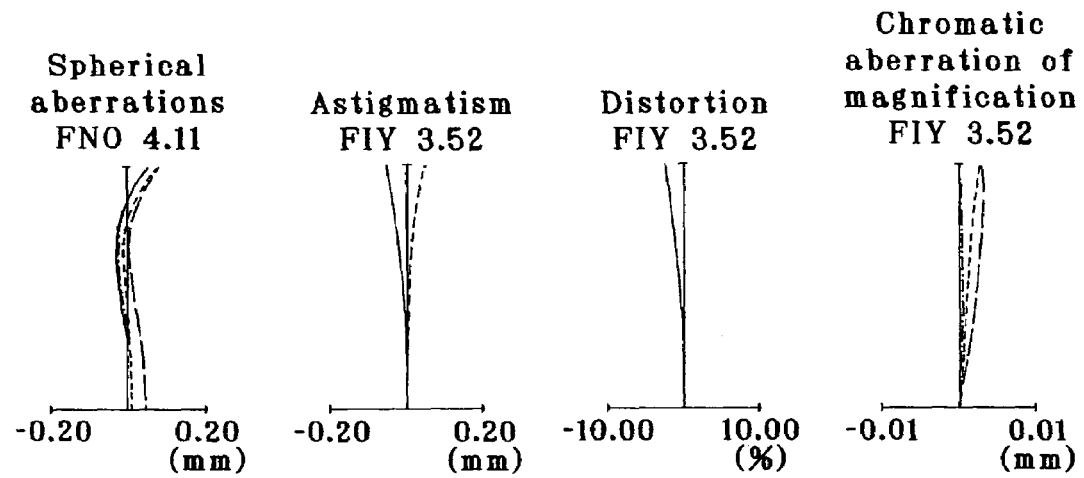
Figure 22C:
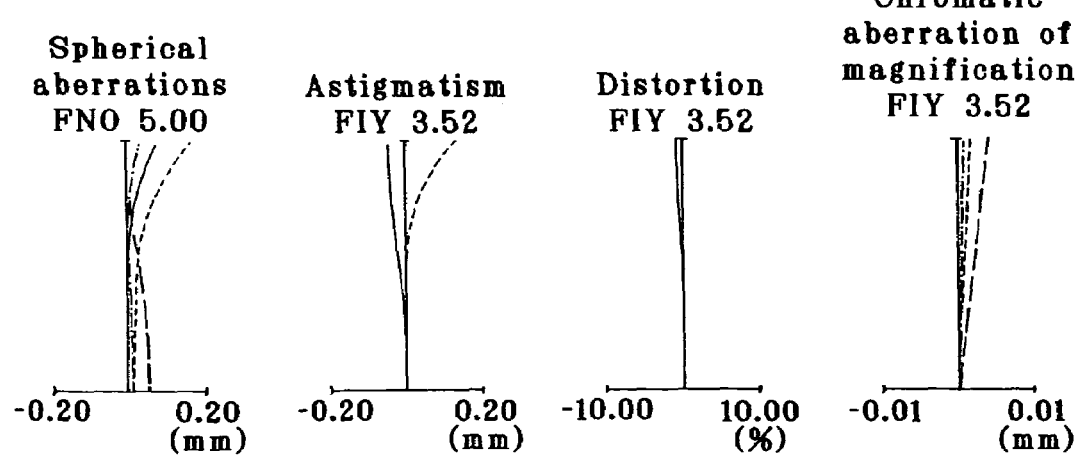
Figure 23A:
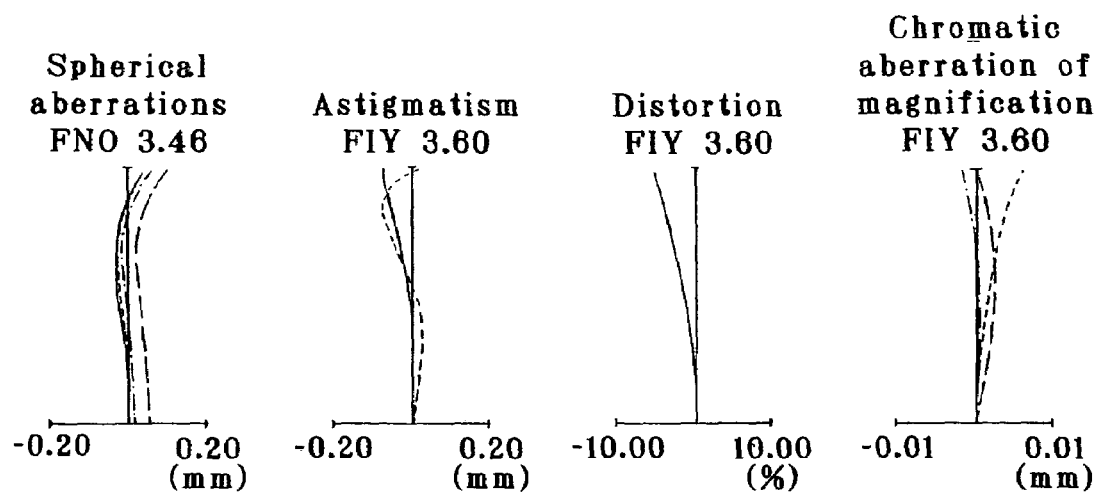
FIGS. 23(a), 23(b) and 23(c) are aberration diagrams for Example 6 upon focusing on an infinite object point.
Figure 23B:
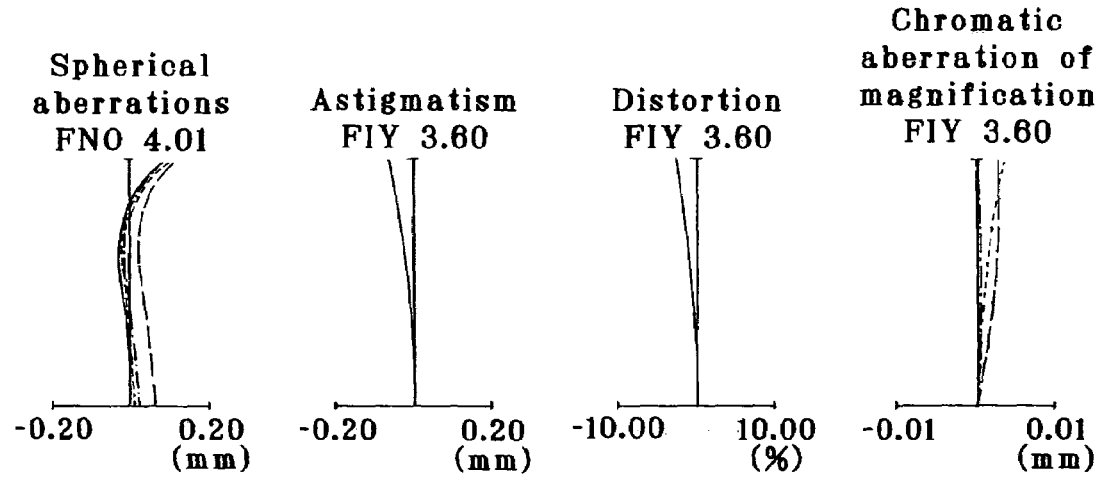
Figure 23C:
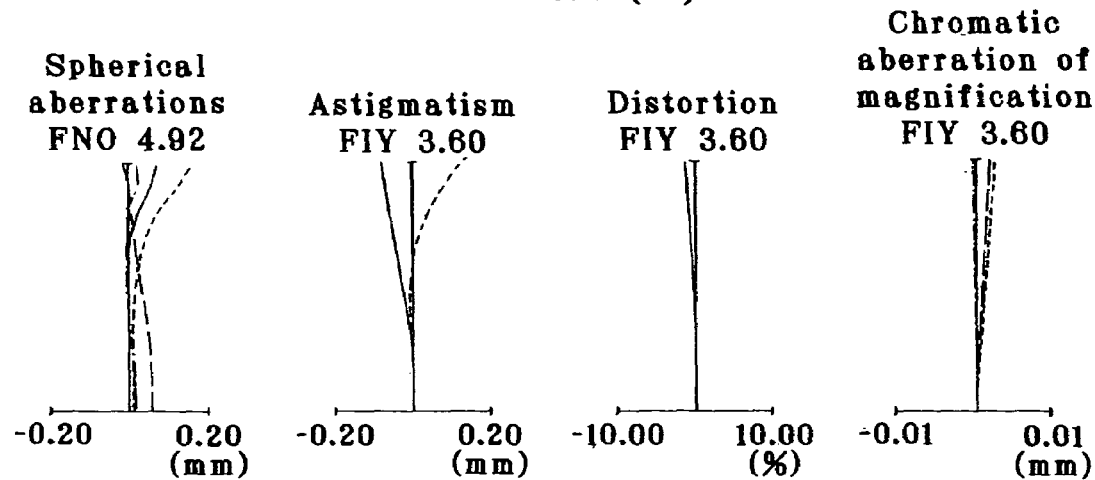
Figure 24A:
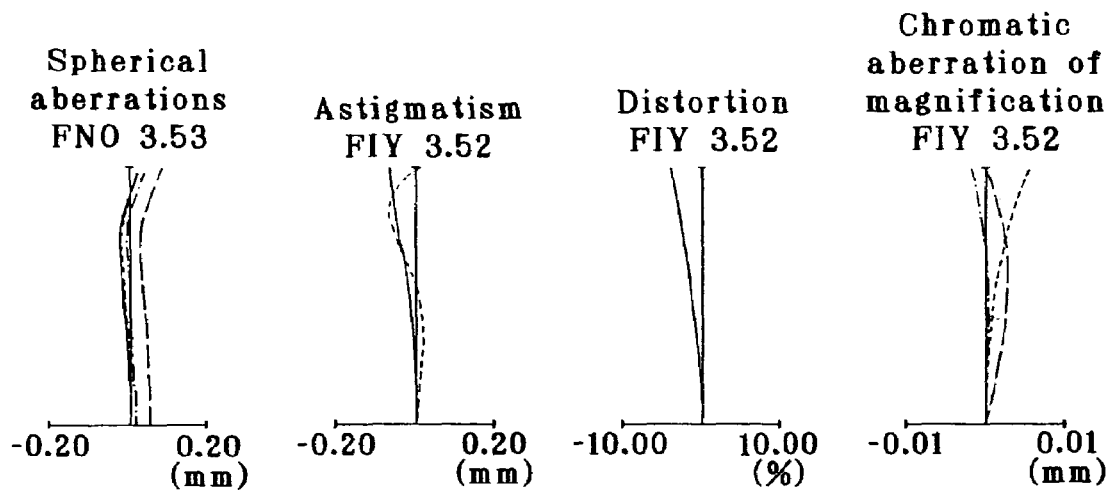
FIGS. 24(a), 24(b) and 24(c) are aberration diagrams for Example 7 upon focusing on an infinite object point.
Figure 24B:
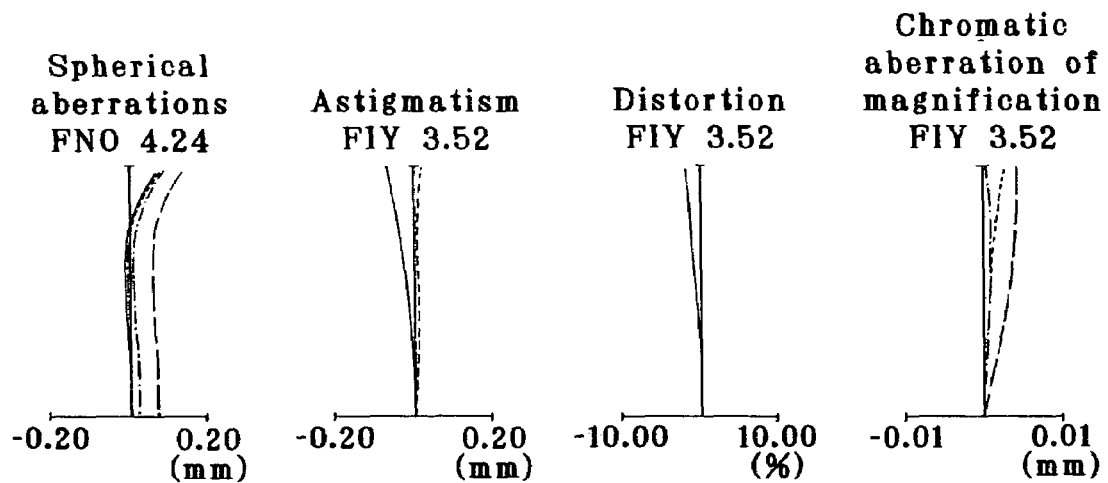
Figure 24C:
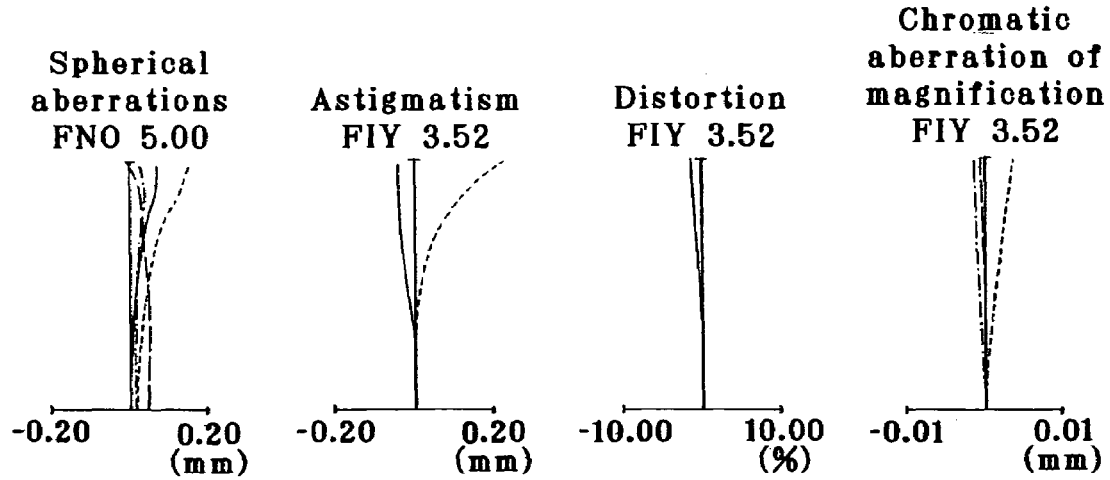
Figure 25A:
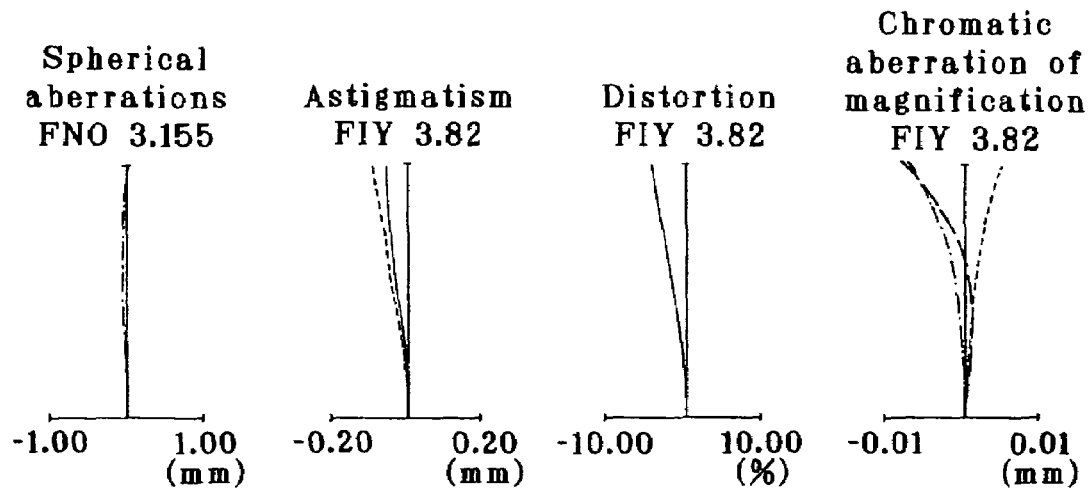
FIGS. 25(a), 25(b) and 25(c) are aberration diagrams for Example 8 upon focusing on an infinite object point.
Figure 25B:
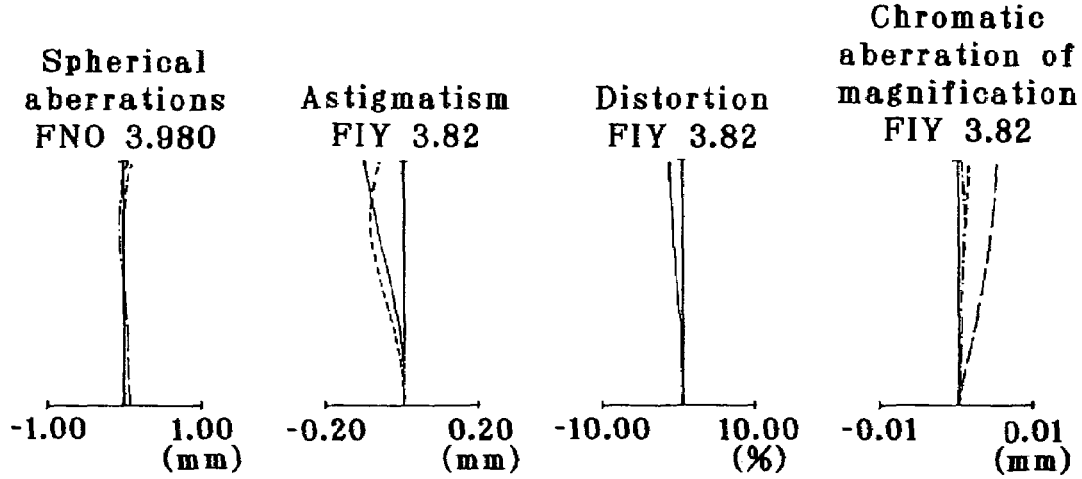
Figure 25C:
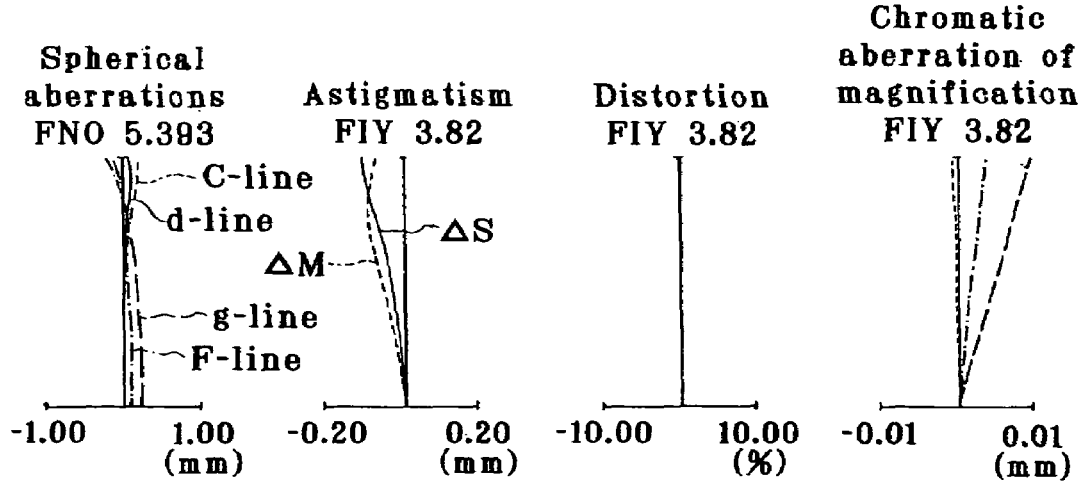
Figure 26A:
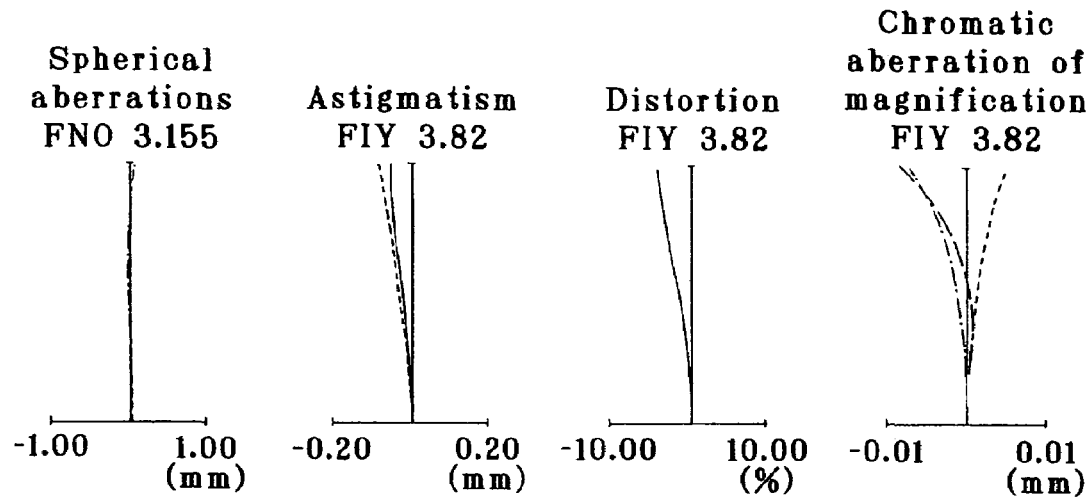
FIGS. 26(a), 26(b) and 26(c) are aberration diagrams for Example 9 upon focusing on an infinite object point.
Figure 26B:
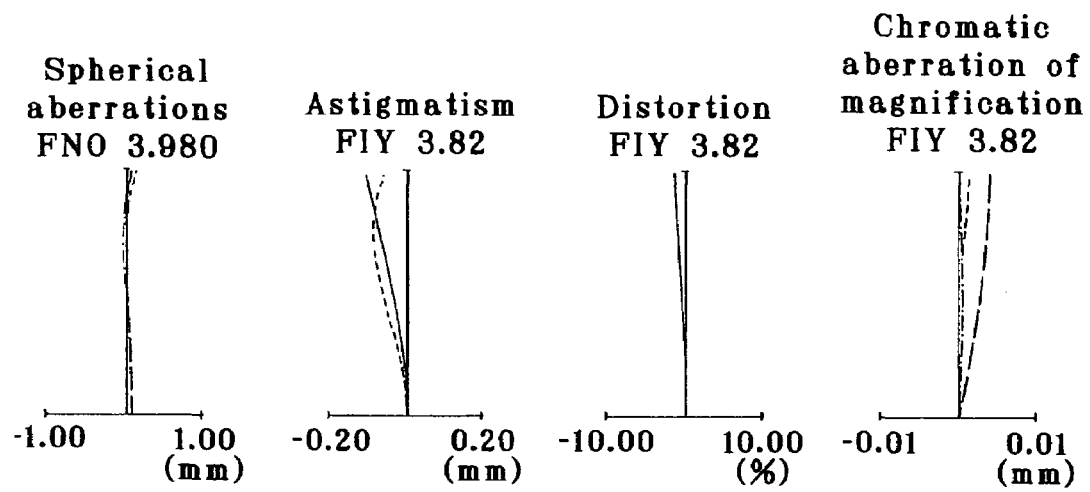
Figure 26C:
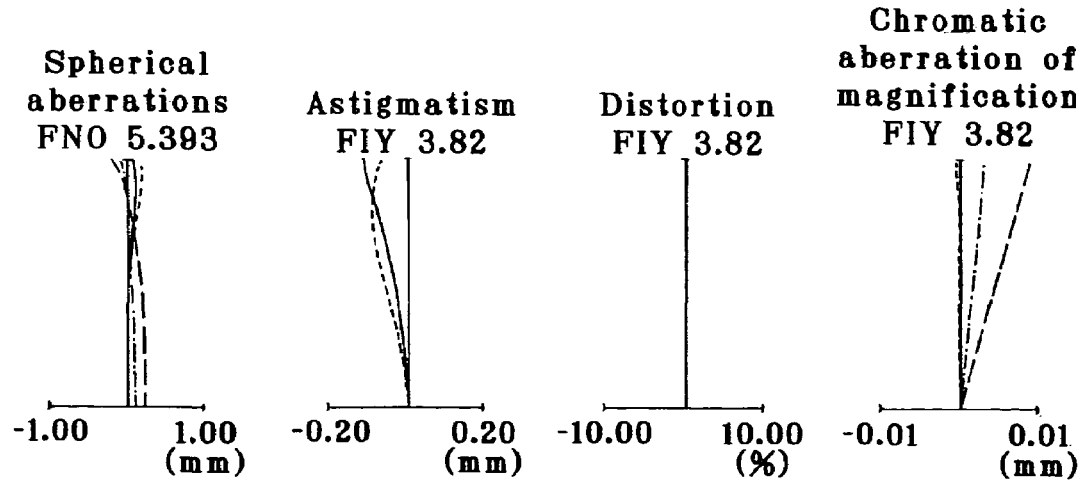
Figure 27A:
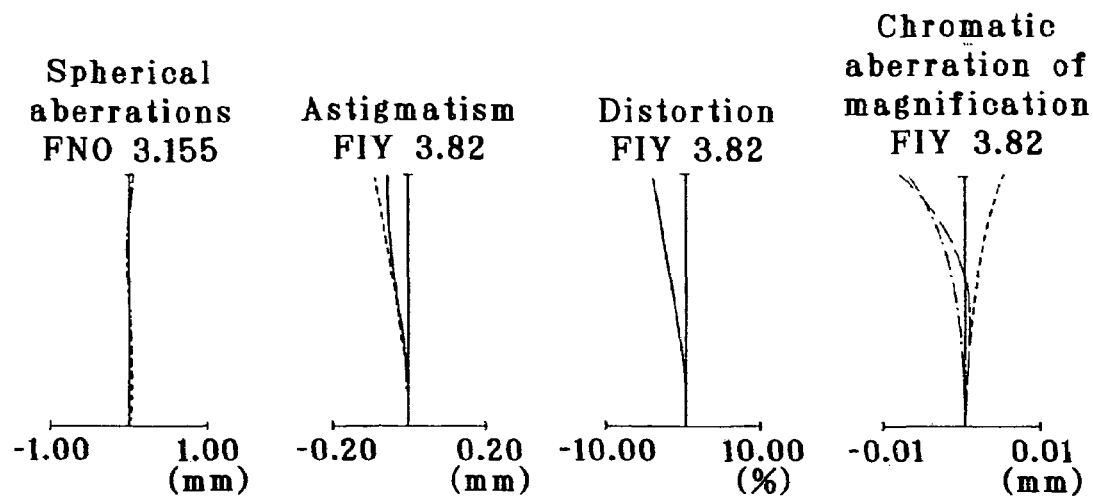
FIGS. 27(a), 27(b) and 27(c) are aberration diagrams for Example 10 upon focusing on an infinite object point.
Figure 27B:
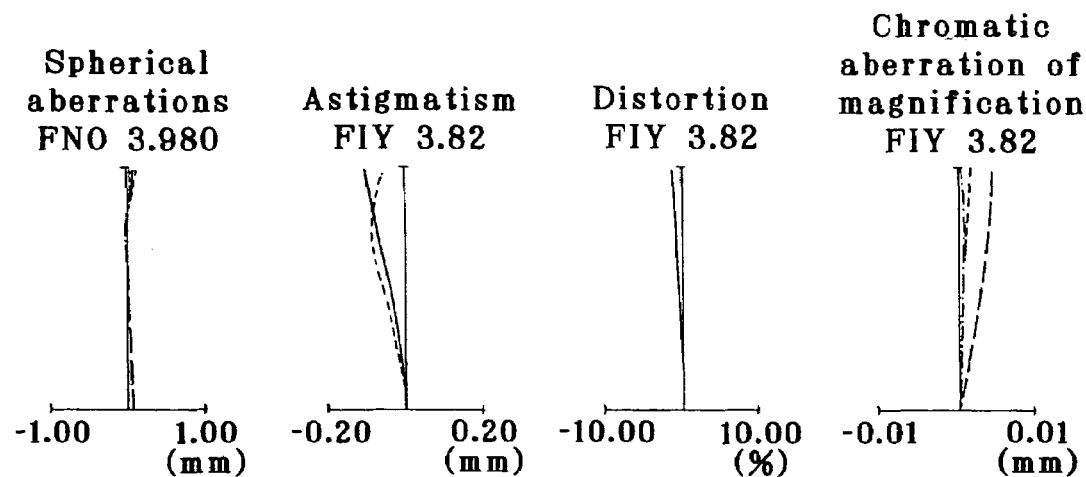
Figure 27C:
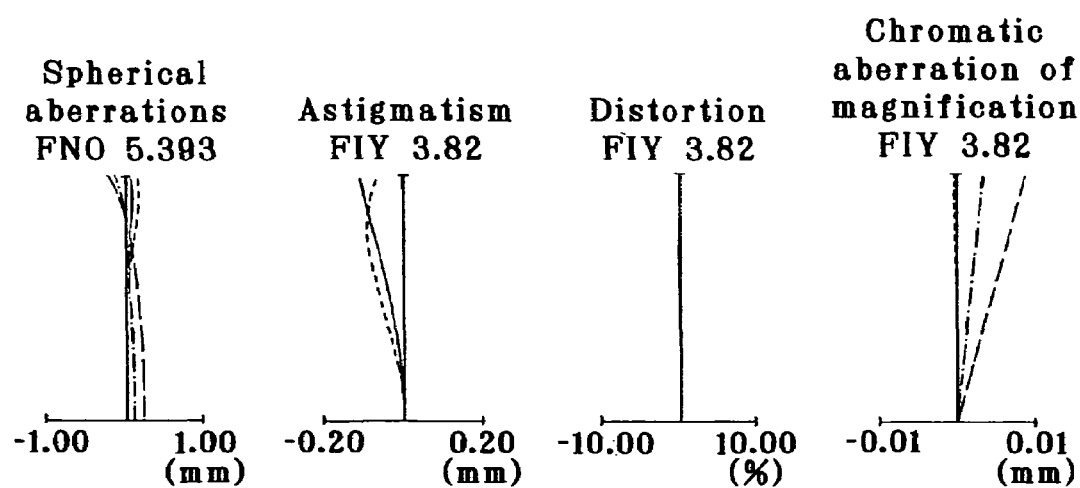
Figure 28A:
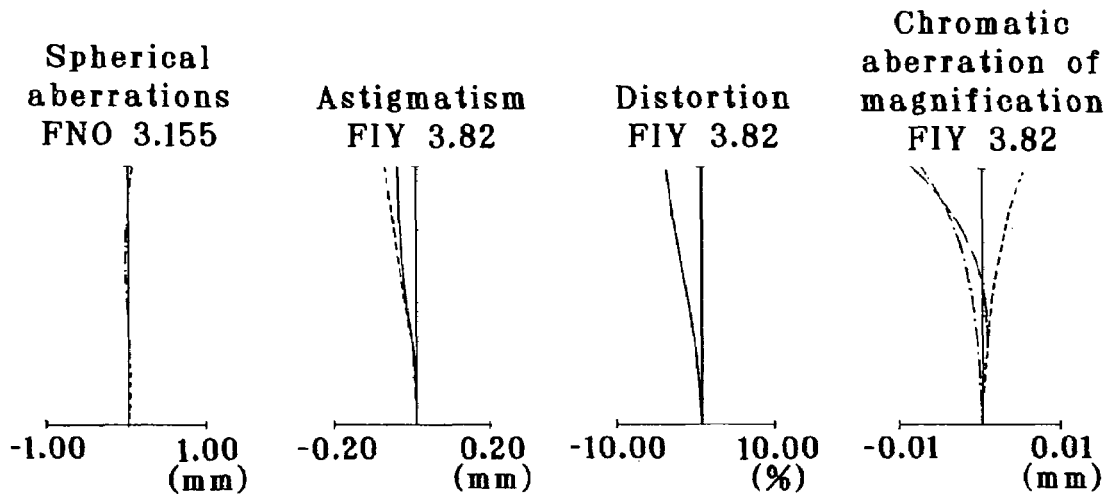
FIGS. 28(a), 28(b) and 28(c) are aberration diagrams for Example 11 upon focusing on an infinite object point.
Figure 28B:
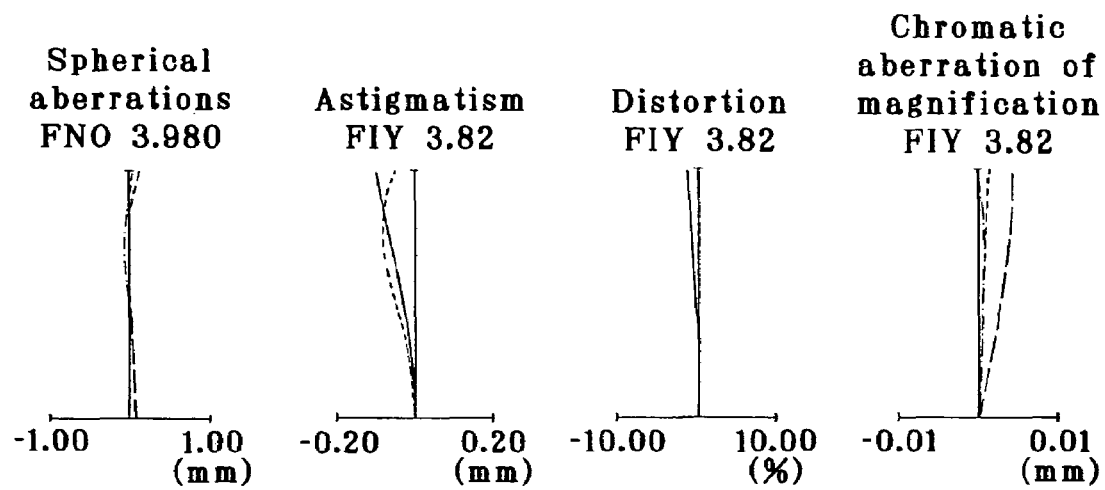
Figure 28C:
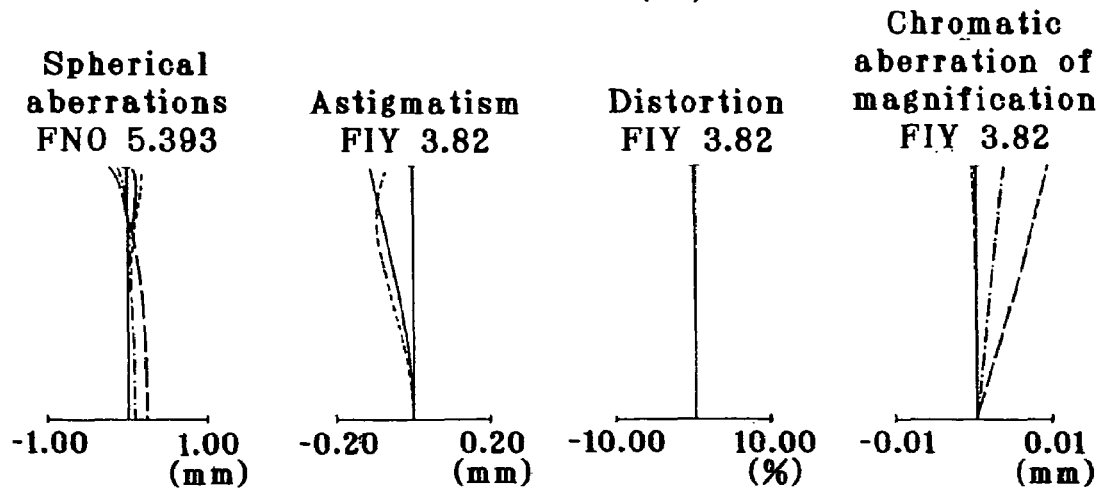
Figure 29A:
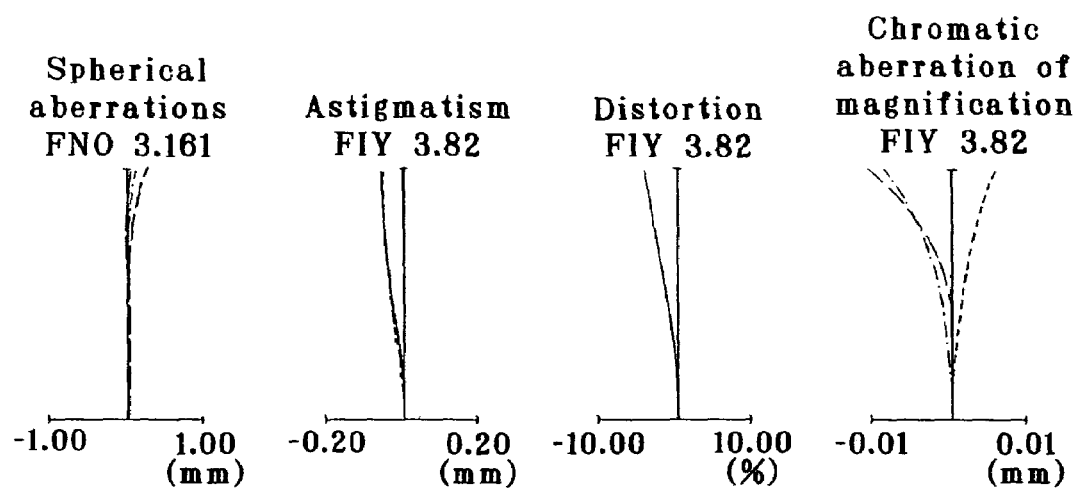
FIGS. 29(a), 29(b) and 29(c) are aberration diagrams for Example 12 upon focusing on an infinite object point.
Figure 29B:
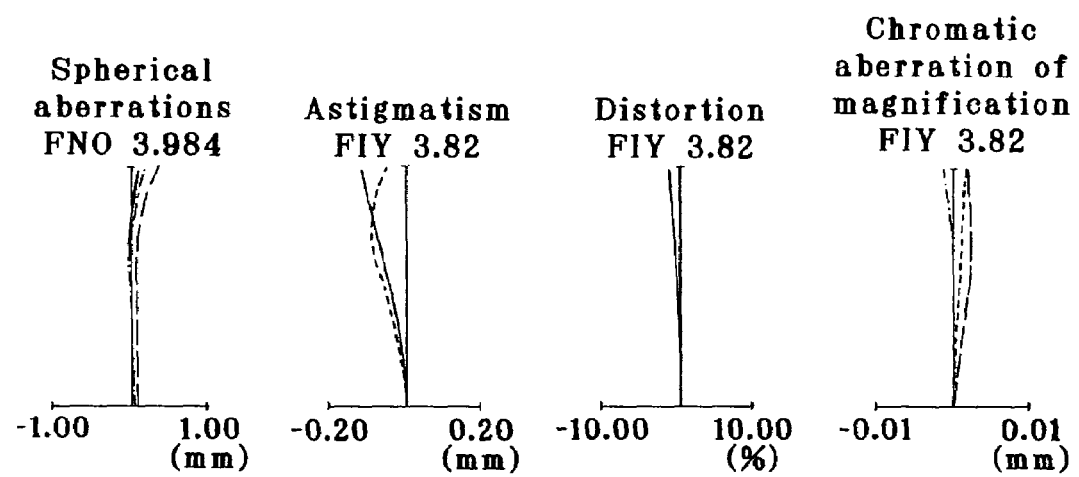
Figure 29C:
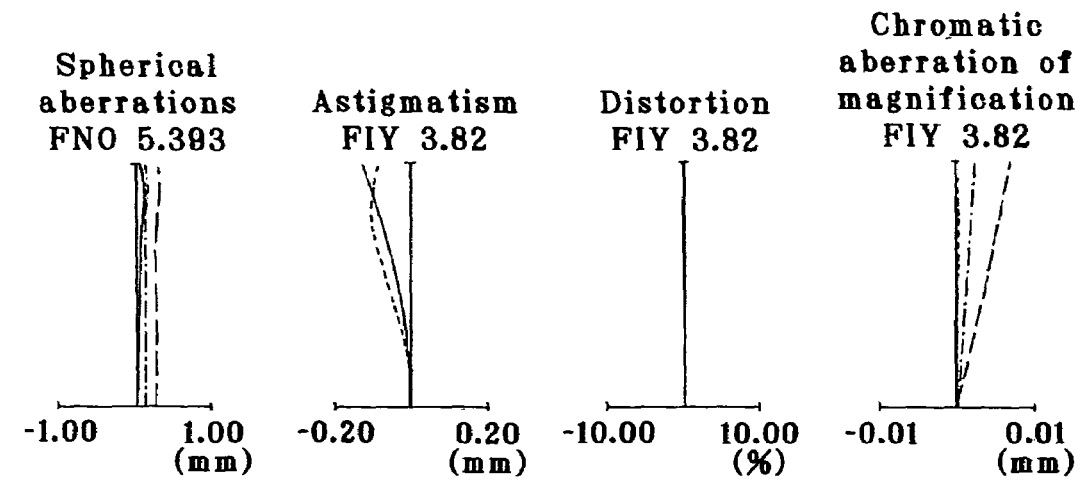
Figure 30A:
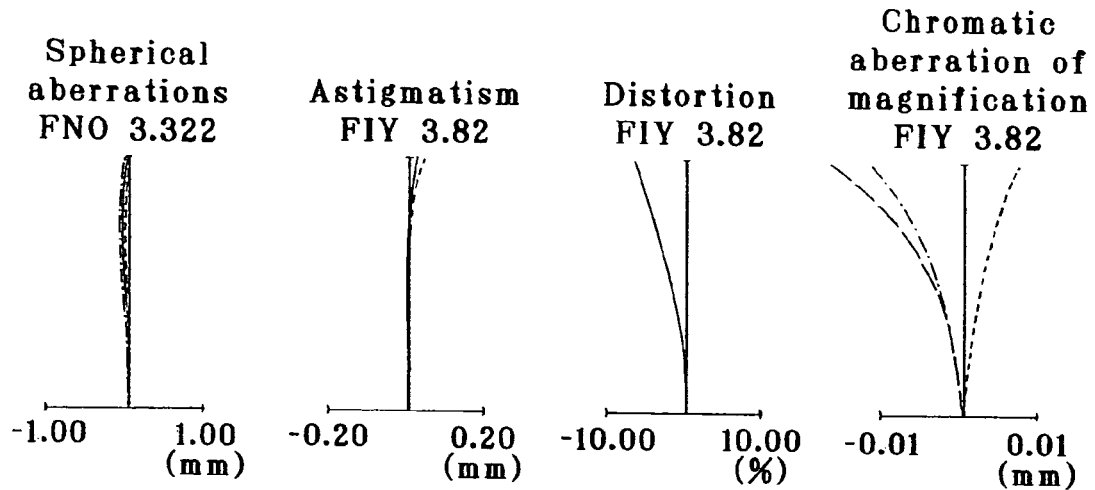
FIGS. 30(a), 30(b) and 30(c) are aberration diagrams for Example 13 upon focusing on an infinite object point.
Figure 30B:
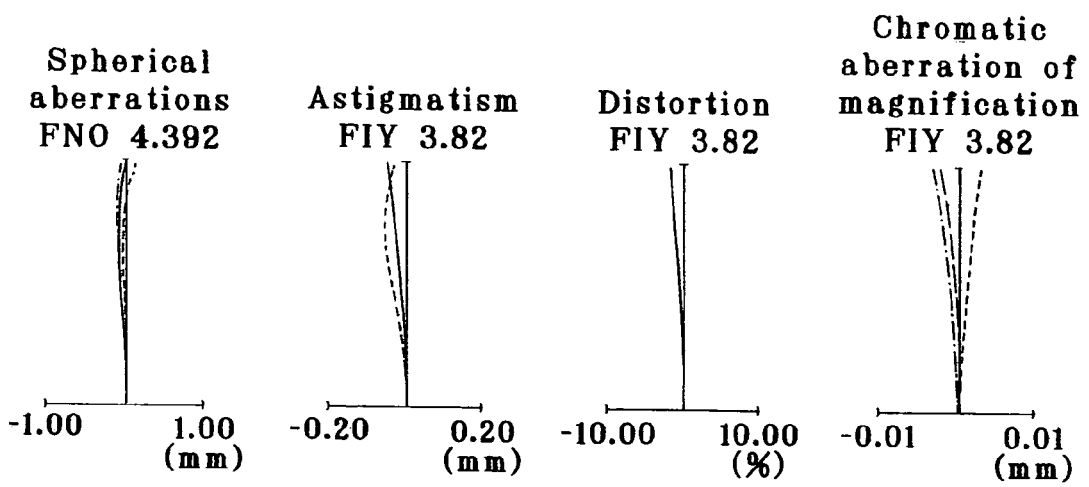
Figure 30C:
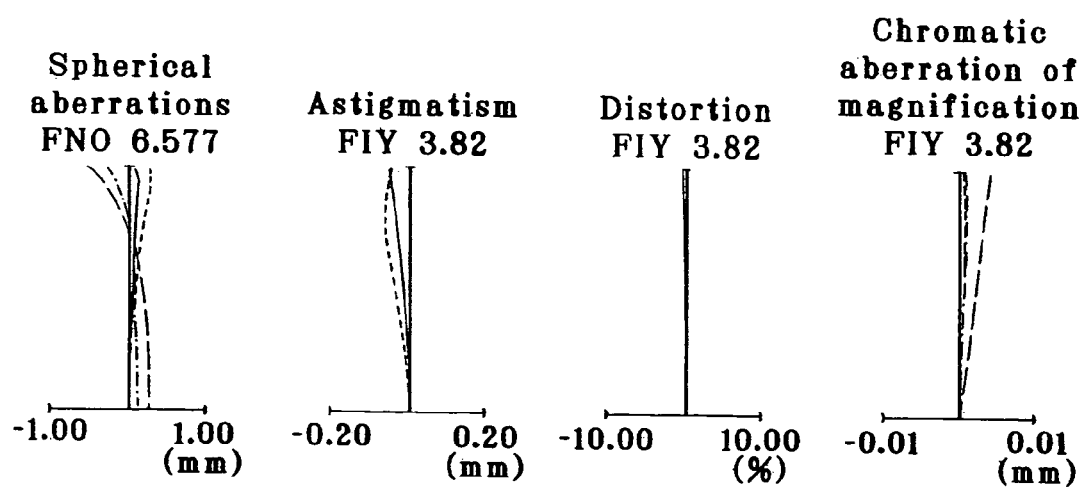
Figure 31A:
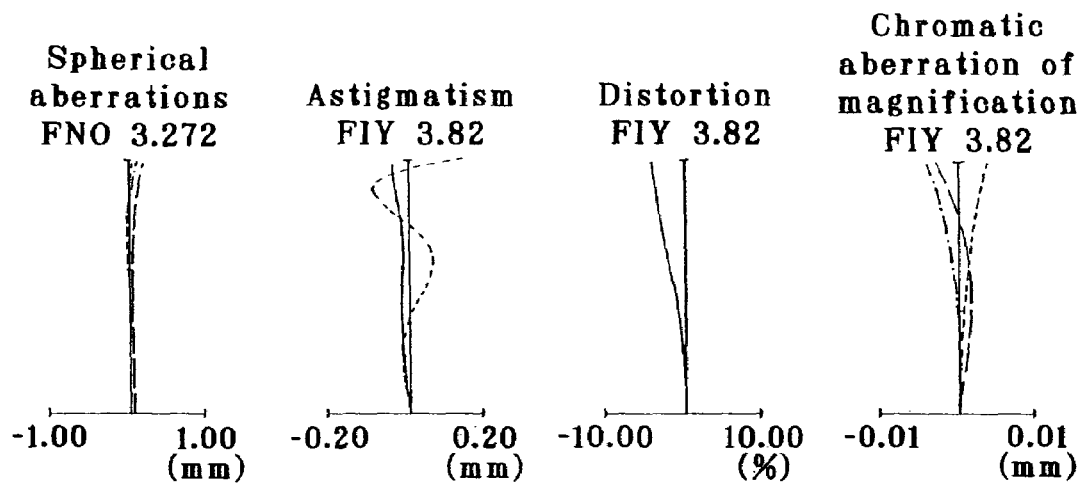
FIGS. 31(a), 31(b) and 31(c) are aberration diagrams for Example 14 upon focusing on an infinite object point.
Figure 31B:
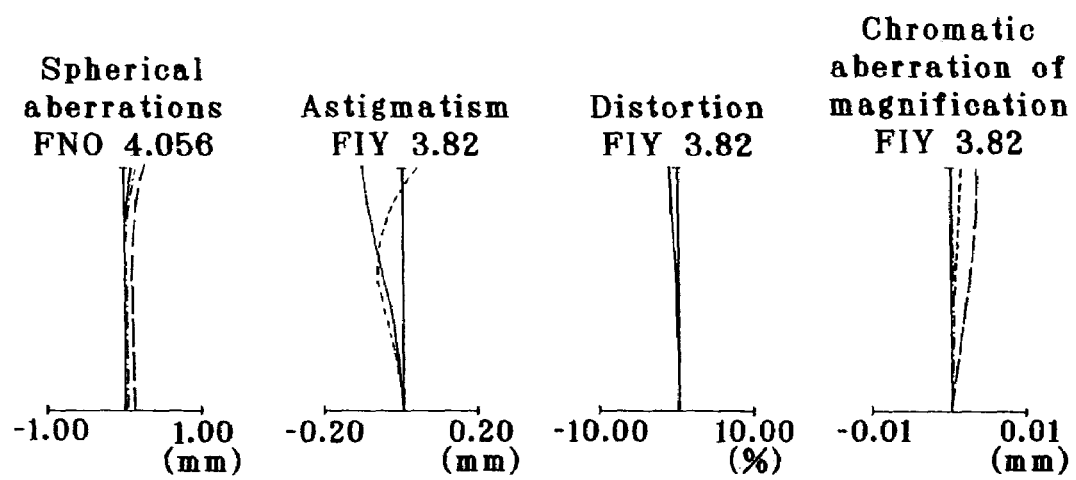
Figure 31C:
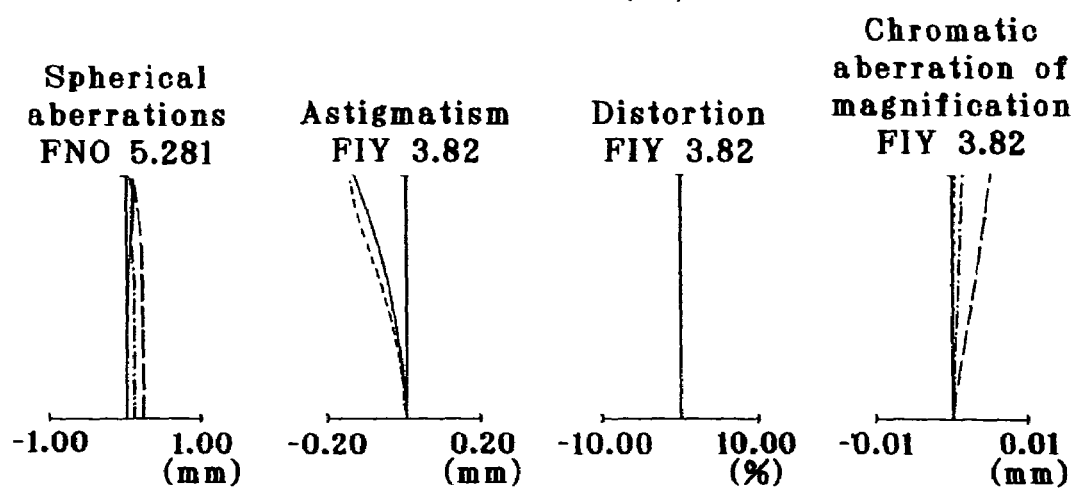
Figure 32A:
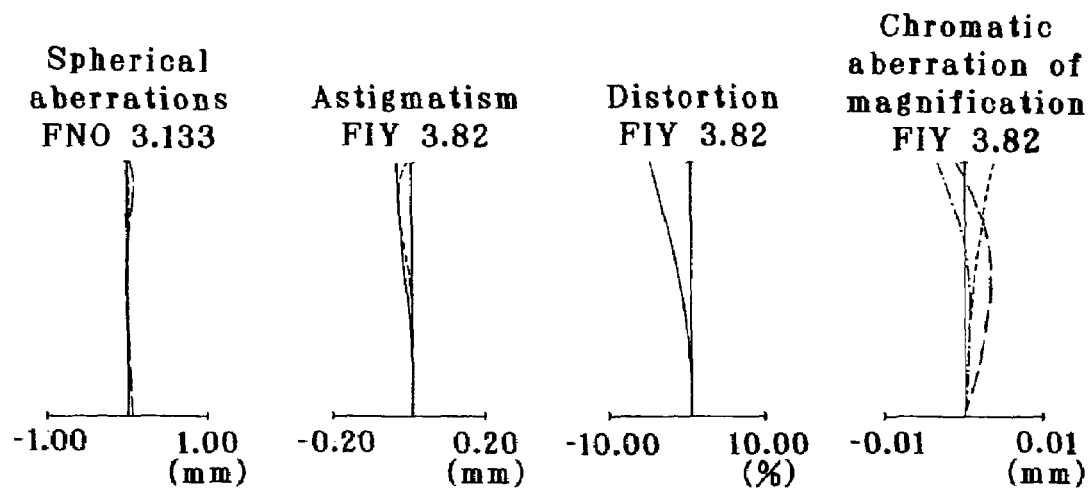
FIGS. 32(a), 32(b) and 32(c) are aberration diagrams for Example 15 upon focusing on an infinite object point.
Figure 32B:
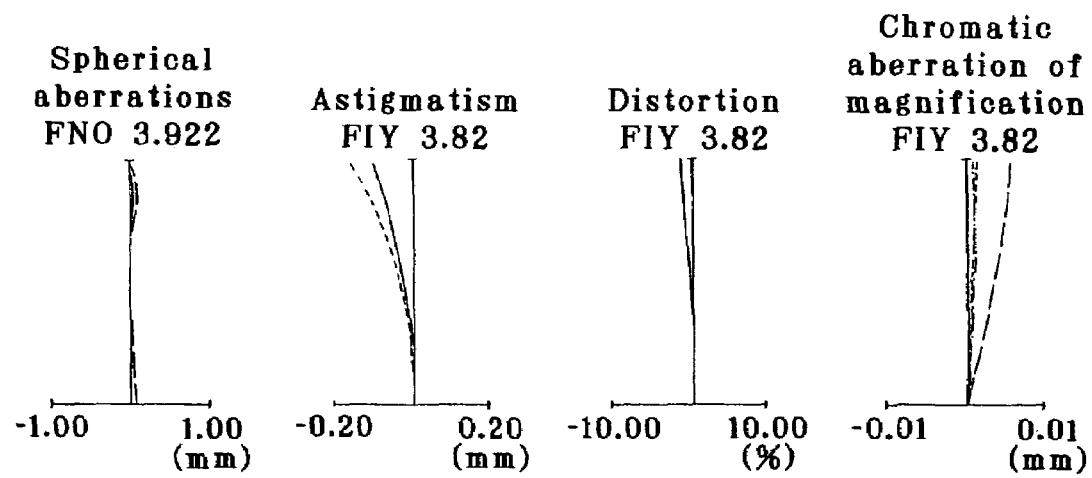
Figure 32C:
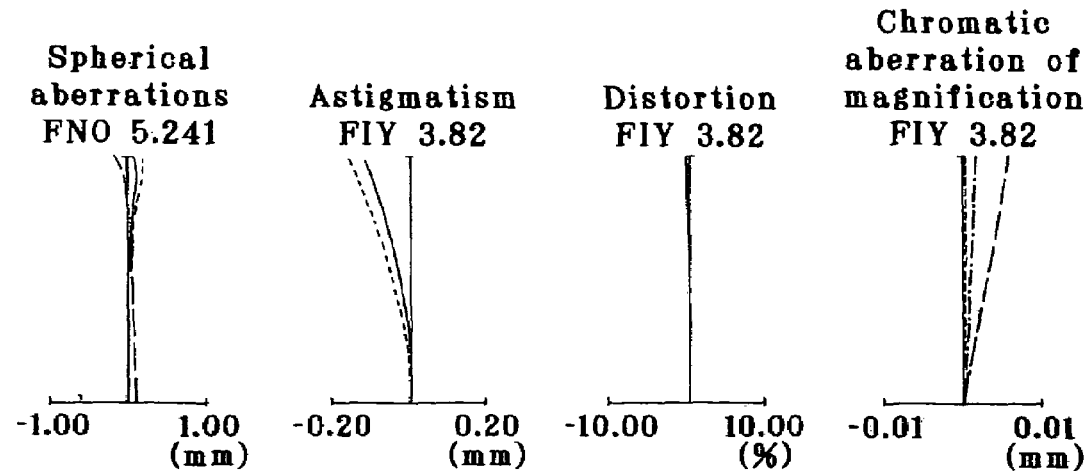
Figure 33A:
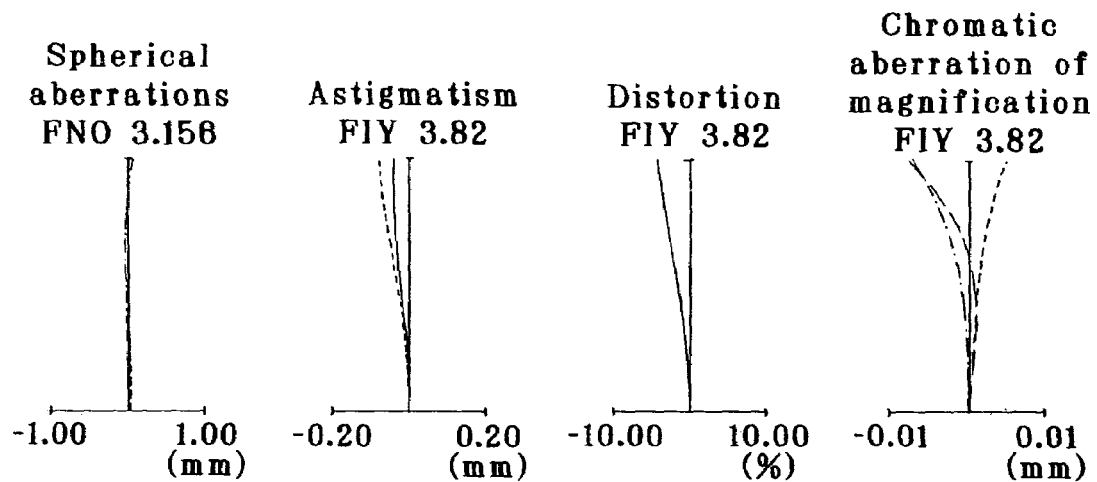
FIGS. 33(a), 33(b) and 33(c) are aberration diagrams for Example 16 upon focusing on an infinite object point.
Figure 33B:
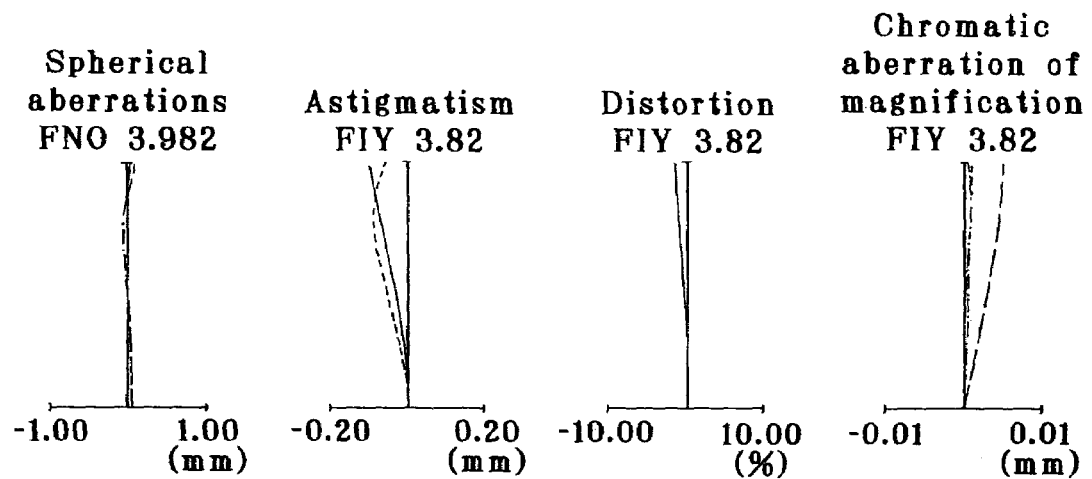
Figure 33C:
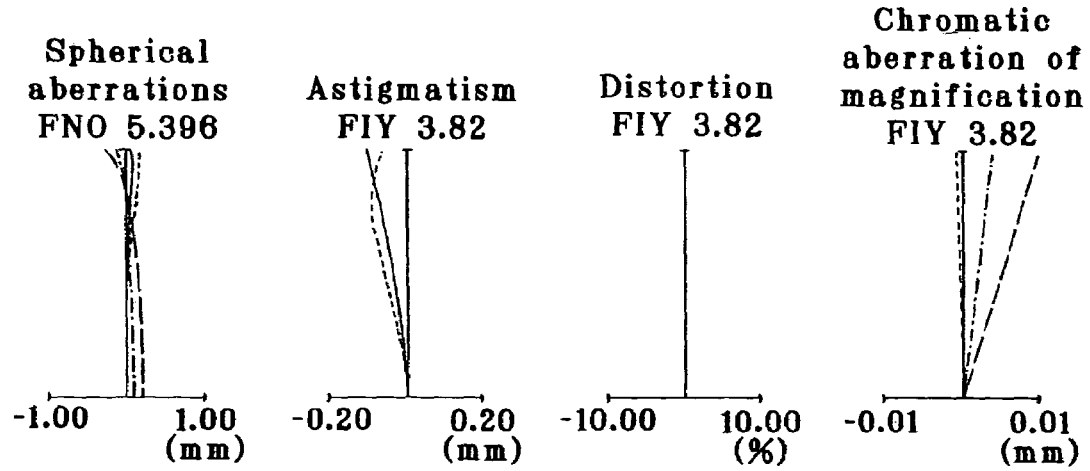
Figure 34A:
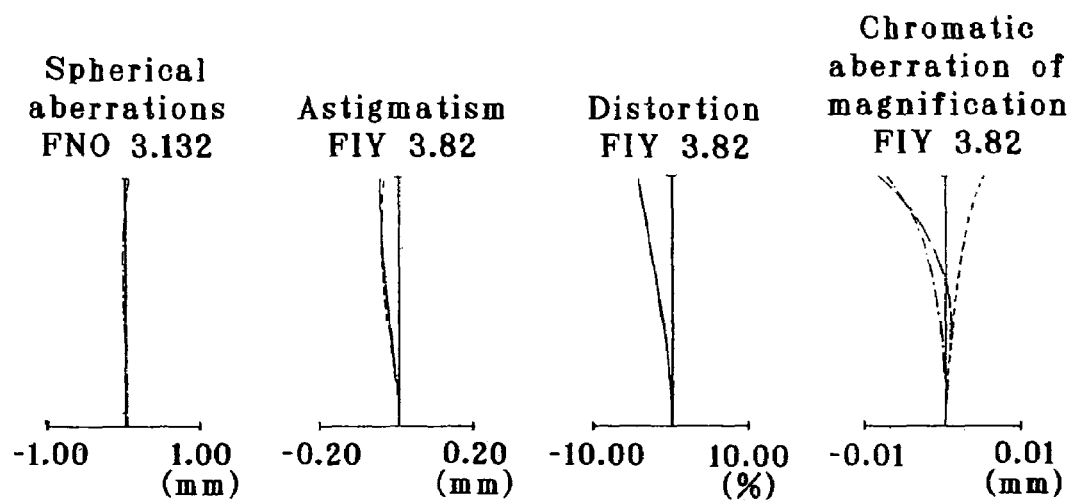
FIGS. 34(a), 34(b) and 34(c) are aberration diagrams for Example 17 upon focusing on an infinite object point.
Figure 34B:
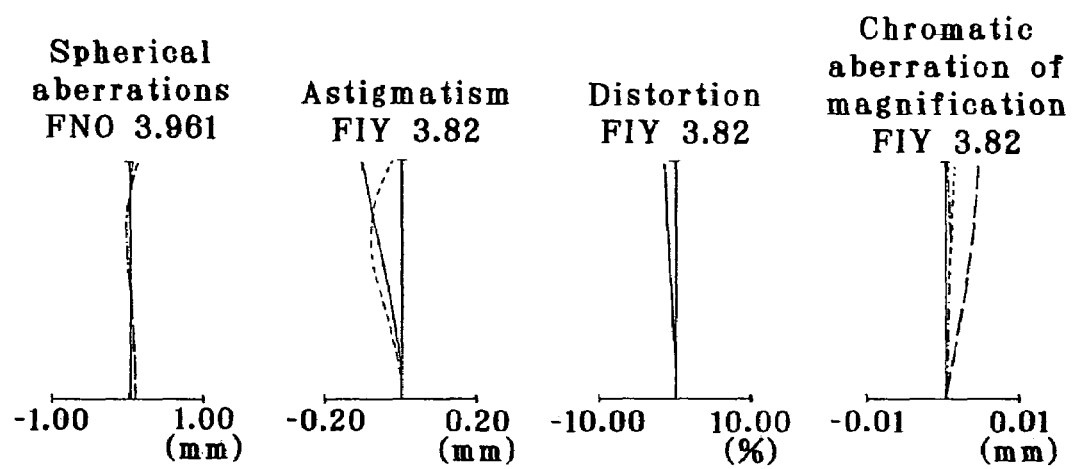
Figure 34C:
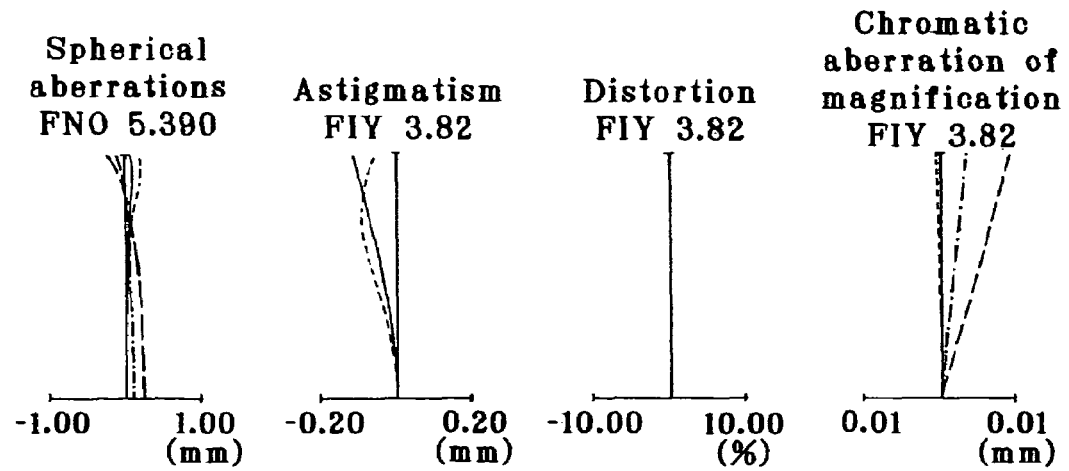

As shown in FIG. 17, Example 17 is directed to a zoom optical system made up of, in order its object side, a first lens group G1 having negative refracting power, an aperture stop S, a second lens group G2 having positive refracting power and a third lens group G3 having weak positive refracting power. Upon zooming from the wide-angle end to the telephoto end of the zoom lens system, the first lens group G1 moves in a convex locus toward the image plane side of the zoom optical system, and is positioned nearer to the image plane side at the telephoto end than at the wide-angle end. The second lens group G2 moves monotonously toward the object side in unison with the aperture stop S, and the third lens group G3 remains fixed The first lens group G1 is composed of, in order from its object side, a negative meniscus lens convex on its object side and a positive meniscus lens convex on its object side, the second lens group G2 is composed of a triplet consisting of, in order from its object side, a positive meniscus lens convex on its object side, a, negative meniscus lens convex on its object side and a double-convex positive lens, and the third lens group G3 is composed of one positive meniscus lens convex on its object side. Three aspheric surfaces are used: one for the image plane-side surface of the negative meniscus lens in the first lens group G1, one for the surface nearest to the object side of the triplet lens forming the second lens group G2, and one for the surface nearest to the image plane-side thereof.

Numerical data on each example are now given. It is noted that the symbols mentioned hereinafter but not hereinbefore have the following meanings:

f: focal length of the whole optical system,
$F_{NO}$: F-number,
$2\omega$: angle of view,
$\omega$: half angle of view,
WE: wide-angle end,
ST: intermediate setting,
TE: telephoto end,
$r_1, r_2, \ldots$: radius of curvature of each lens surface,
$d_1, d_2, \ldots$: spacing between adjacent lens surfaces,
$n_{d1}, n_{d2}, \ldots$: d-line refractive index of each lens, and
$\nu_{d1}, \nu_{d2}, \ldots$: Abbe constant of each lens. Here let x stand for an optical axis provided that the direction of travel of light is positive, and y stand for a direction orthogonal to the optical axis. Then, aspheric shape is given by $$x=(y^2/r)/[1+\{1-(K+1)(y/r)^2\}^{1/2}]$$

$$A_4 y^4 + A_6 y^6 + A_8 y^8 + A_{10} y^{10} + A_{12} y^{12}$$

where r is a paraxial radius of curvature, K is a conical coefficient, and A4, A6, A8, A10 and A12 are the $4^{th}$-, $6^{th}$-, $8^{th}$-, $10^{th}$- and $12^{th}$-order aspheric coefficients, respectively.

In the following numerical data, length is given in mm.

EXAMPLE 1

| | | | |
|---|---|---|---|
| $r_1 = 73.835$ | $d_1 = 1.20$ | $n_{d1} = 1.80610$ | $\nu_{d1} = 40.74$ |
| $r_2 = 3.773$ (Aspheric) | $d_2 = 1.60$ | | |
| $r_3 = 6.842$ | $d_3 = 1.70$ | $n_{d2} = 1.84666$ | $\nu_{d2} = 23.78$ |
| $r_4 = 17.434$ | $d_4 = $ (Variable) | | |
| $r_5 = \infty$ (Stop) | $d_5 = -0.20$ | | |
| $r_6 = 4.407$ (Aspheric) | $d_6 = 1.80$ | $n_{d3} = 1.74330$ | $\nu_{d3} = 49.33$ |
| $r_7 = -200.000$ | $d_7 = 0.80$ | $n_{d4} = 1.80518$ | $\nu_{d4} = 25.42$ |
| $r_8 = 5.242$ | $d_8 = 2.76$ | $n_{d5} = 1.48749$ | $\nu_{d5} = 70.44$ |
| $r_9 = -26.974$ (Aspheric) | $d_9 = $ (Variable) | | |
| $r_{10} = \infty$ | $d_{10} = 1.30$ | $n_{d6} = 1.51633$ | $\nu_{d6} = 64.14$ |
| $r_{11} = \infty$ | $d_{11} = $ (Variable) | | |
| $r_{12} = \infty$ (Image plane) | | | |

Aspherical Coefficients

2nd surface

K = −3.269
$A_4 = 6.23206 \times 10^{-3}$
$A_6 = -3.63433 \times 10^{-4}$
$A_8 = 2.22372 \times 10^{-5}$
$A_{10} = -6.62190 \times 10^{-7}$ 6th surface K = −3.180
$A_4 = 4.24973 \times 10^{-3}$
$A_6 = -1.98823 \times 10^{-4}$
$A_8 = 3.04193 \times 10^{-5}$
$A_{10} = -2.69865 \times 10^{-6}$ 9th surface K = 0.000
$A_4 = 4.93949 \times 10^{-3}$
$A_6 = -1.34150 \times 10^{-4}$
$A_8 = 1.74837 \times 10^{-4}$
$A_{10} = -1.48151 \times 10^{-5}$ Zooming Data (∞)

| | WE | ST | TE |
|---|---|---|---|
| f (mm) | 5.900 | 8.200 | 11.500 |
| $F_{NO}$ | 3.62 | 4.18 | 5.00 |
| $\omega$ (°) | 32.8 | 24.1 | 17.5 |
| $d_4$ | 7.29 | 3.84 | 1.30 |
| $d_9$ | 6.56 | 8.37 | 10.96 |
| $d_{11}$ | 1.18 | 1.18 | 1.18 |

EXAMPLE 2

| | | | |
|---|---|---|---|
| $r_1 = 31.097$ | $d_1 = 1.20$ | $n_{d1} = 1.80610$ | $\nu_{d1} = 40.74$ |
| $r_2 = 3.332$ (Aspheric) | $d_2 = 1.60$ | | |
| $r_3 = 6.133$ | $d_3 = 1.70$ | $n_{d2} = 1.84666$ | $\nu_{d2} = 23.78$ |
| $r_4 = 13.488$ | $d_4 = $ (Variable) | | |
| $r_5 = \infty$ (Stop) | $d_5 = -0.20$ | | |
| $r_6 = 4.379$ (Aspheric) | $d_6 = 1.80$ | $n_{d3} = 1.74330$ | $\nu_{d3} = 49.33$ |
| $r_7 = 50.000$ | $d_7 = 0.84$ | $n_{d4} = 1.80518$ | $\nu_{d4} = 25.42$ |
| $r_8 = 4.563$ | $d_8 = 2.76$ | $n_{d5} = 1.48749$ | $\nu_{d5} = 70.44$ |
| $r_9 = -15.315$ (Aspheric) | $d_9 = $ (Variable) | | |
| $r_{10} = \infty$ | $d_{10} = 1.30$ | $n_{d6} = 1.51633$ | $\nu_{d6} = 64.14$ |
| $r_{11} = \infty$ | $d_{11} = $ (Variable) | | |
| $r_{12} = \infty$ (Image plane) | | | |

Aspherical Coefficients

2nd surface

K = −3.146
$A_4 = 8.64879 \times 10^{-3}$
$A_6 = -5.82477 \times 10^{-4}$
$A_8 = 4.16275 \times 10^{-5}$
$A_{10} = -1.37380 \times 10^{-6}$ -continued 6th surface K = −3.878
$A_4 = 5.28562 \times 10^{-3}$
$A_6 = -3.13553 \times 10^{-4}$
$A_8 = 3.29362 \times 10^{-5}$
$A_{10} = -2.13641 \times 10^{-6}$ 9th surface K = 0.000
$A_4 = 4.42791 \times 10^{-3}$
$A_6 = -4.55843 \times 10^{-5}$
$A_8 = 1.14056 \times 10^{-4}$
$A_{10} = -6.29055 \times 10^{-6}$ Zooming Data (∞)

|  | WE | ST | TE |
|---|---|---|---|
| f (mm) | 5.920 | 8.200 | 11.500 |
| $F_{NO}$ | 3.58 | 4.16 | 5.00 |
| ω (°) | 32.2 | 24.0 | 17.4 |
| $d_4$ | 6.60 | 3.56 | 1.30 |
| $d_9$ | 6.76 | 8.69 | 11.46 |
| $d_{11}$ | 1.23 | 1.22 | 1.23 |

EXAMPLE 3

$r_1 = 27.175$  $d_1 = 1.20$  $n_{d1} = 1.80610$  $\nu_{d1} = 40.74$
$r_2 = 3.327$ (Aspheric)  $d_2 = 1.60$
$r_3 = 6.087$  $d_3 = 1.70$  $n_{d2} = 1.84666$  $\nu_{d2} = 23.78$
$r_4 = 12.927$  $d_4$ = (Variable)
$r_5 = \infty$ (Stop)  $d_5 = -0.20$
$r_6 = 4.355$ (Aspheric)  $d_6 = 1.80$  $n_{d3} = 1.74330$  $\nu_{d3} = 49.33$
$r_7 = 50.000$  $d_7 = 0.85$  $n_{d4} = 1.84666$  $\nu_{d4} = 23.78$
$r_8 = 5.063$  $d_8 = 2.75$  $n_{d5} = 1.51633$  $\nu_{d5} = 64.14$
$r_9 = -20.026$ (Aspheric)  $d_9$ = (Variable)
$r_{10} = \infty$  $d_{10} = 1.30$  $n_{d6} = 1.51633$  $\nu_{d6} = 64.14$
$r_{11} = \infty$  $d_{11}$ = (Variable)
$r_{12} = \infty$ (Image plane)

Aspherical Coefficients

2nd surface

K = −3.202
$A_4 = 8.94481 \times 10^{-3}$
$A_6 = -6.15065 \times 10^{-4}$
$A_8 = 4.52314 \times 10^{-5}$
$A_{10} = -1.53842 \times 10^{-6}$ 6th surface K = −4.132
$A_4 = 5.81884 \times 10^{-3}$
$A_6 = -4.01777 \times 10^{-4}$
$A_8 = 5.33499 \times 10^{-5}$
$A_{10} = -4.58420 \times 10^{-6}$
$A_{12} = -1.00000 \times 10^{-7}$ 9th surface K = 0.000
$A_4 = 4.74901 \times 10^{-3}$
$A_6 = -8.09534 \times 10^{-5}$
$A_8 = 1.32302 \times 10^{-4}$
$A_{10} = -8.52519 \times 10^{-6}$ Zooming Data (∞)

|  | WE | ST | TE |
|---|---|---|---|
| f (mm) | 5.920 | 8.200 | 11.500 |
| $F_{NO}$ | 3.58 | 4.16 | 5.00 |
| ω (°) | 32.1 | 23.9 | 17.4 |
| $d_4$ | 6.60 | 3.56 | 1.30 |
| $d_9$ | 6.57 | 8.45 | 11.18 |
| $d_{11}$ | 1.23 | 1.22 | 1.21 |

EXAMPLE 4

$r_1 = 76.650$  $d_1 = 1.20$  $n_{d1} = 1.80610$  $\nu_{d1} = 40.92$
$r_2 = 3.276$ (Aspheric)  $d_2 = 1.40$
$r_3 = 6.251$  $d_3 = 1.70$  $n_{d2} = 1.84666$  $\nu_{d2} = 23.78$
$r_4 = 16.782$  $d_4$ = (Variable)
$r_5 = \infty$ (Stop)  $d_5 = -0.20$
$r_6 = 4.384$ (Aspheric)  $d_6 = 2.30$  $n_{d3} = 1.69350$  $\nu_{d3} = 53.21$
$r_7 = 300.000$  $d_7 = 0.80$  $n_{d4} = 1.84666$  $\nu_{d4} = 23.78$
$r_8 = 6.297$  $d_8 = 2.40$  $n_{d5} = 1.48749$  $\nu_{d5} = 70.23$
$r_9 = -13.015$ (Aspheric)  $d_9$ = (Variable)
$r_{10} = \infty$  $d_{10} = 1.30$  $n_{d6} = 1.51633$  $\nu_{d6} = 64.14$
$r_{11} = \infty$  $d_{11}$ = (Variable)
$r_{12} = \infty$ (Image plane)

Aspherical Coefficients

2nd surface

K = −1.130
$A_4 = 1.83732 \times 10^{-3}$
$A_6 = -2.30469 \times 10^{-5}$
$A_8 = 4.01044 \times 10^{-6}$
$A_{10} = -1.91354 \times 10^{-7}$ 6th surface K = −0.345
$A_4 = -5.98870 \times 10^{-5}$
$A_6 = 6.13929 \times 10^{-6}$
$A_8 = -2.96420 \times 10^{-6}$
$A_{10} = 8.00000 \times 10^{-7}$ 9th surface K = 0.000
$A_4 = 4.16180 \times 10^{-3}$
$A_6 = 9.37500 \times 10^{-5}$
$A_8 = 6.17499 \times 10^{-5}$
$A_{10} = 1.48794 \times 10^{-7}$ Zooming Data (∞)

|  | WE | ST | TE |
|---|---|---|---|
| f (mm) | 5.923 | 7.997 | 11.492 |
| $F_{NO}$ | 3.61 | 4.16 | 5.09 |
| ω (°) | 32.7 | 24.8 | 17.5 |
| $d_4$ | 6.09 | 3.53 | 1.30 |
| $d_9$ | 7.10 | 8.99 | 12.17 |
| $d_{11}$ | 1.22 | 1.21 | 1.18 |

EXAMPLE 5

$r_1 = 114.165$  $d_1 = 1.00$  $n_{d1} = 1.80610$  $\nu_{d1} = 40.92$
$r_2 = 3.318$ (Aspheric)  $d_2 = 1.40$
$r_3 = 6.530$  $d_3 = 1.70$  $n_{d2} = 1.84666$  $\nu_{d2} = 23.78$
$r_4 = 20.319$  $d_4$ = (Variable)
$r_5 = \infty$ (Stop)  $d_5 = -0.20$
$r_6 = 4.040$ (Aspheric)  $d_6 = 2.30$  $n_{d3} = 1.58313$  $\nu_{d3} = 59.38$
$r_7 = -927.117$  $d_7 = 0.80$  $n_{d4} = 1.84666$  $\nu_{d4} = 23.78$
$r_8 = 7.532$  $d_8 = 2.40$  $n_{d5} = 1.48749$  $\nu_{d5} = 70.23$
$r_9 = -11.782$  $d_9$ = (Variable)

-continued (Aspheric)
$r_{10} = \infty$     $d_{10} = 1.30$     $n_{d6} = 1.51633$     $\nu_{d6} = 64.14$
$r_{11} = \infty$     $d_{11} = $(Variable)
$r_{12} = \infty$(Image plane)

Aspherical Coefficients

2nd surface $K = -0.497$
$A_4 = -5.19094 \times 10^{-4}$
$A_6 = -8.99866 \times 10^{-5}$
$A_8 = 3.08269 \times 10^{-6}$
$A_{10} = -4.03659 \times 10^{-10}$ 6th surface $K = -1.345$
$A_4 = 1.68161 \times 10^{-3}$
$A_6 = 7.65859 \times 10^{-5}$
$A_8 = -9.37869 \times 10^{-6}$
$A_{10} = 8.94817 \times 10^{-7}$ 9th surface $K = 0.000$
$A_4 = 3.57902 \times 10^{-3}$
$A_6 = 3.92389 \times 10^{-4}$
$A_8 = 2.36601 \times 10^{-6}$
$A_{10} = 2.89859 \times 10^{-8}$ Zooming Data ($\infty$)

|  | WE | ST | TE |
|---|---|---|---|
| f (mm) | 5.904 | 7.997 | 11.498 |
| $F_{NO}$ | 3.58 | 4.11 | 5.00 |
| $\omega$ (°) | 30.5 | 23.0 | 16.2 |
| $d_4$ | 6.46 | 3.68 | 1.30 |
| $d_9$ | 7.51 | 9.43 | 12.66 |
| $d_{11}$ | 1.20 | 1.19 | 1.16 |

EXAMPLE 6

$1r_1 = -125.182$     $d_1 = 1.00$       $n_{d1} = 1.80610$   $\nu_{d1} = 40.92$
$r_2 = 3.312$ (Aspheric)  $d_2 = 1.40$
$r_3 = 7.062$             $d_3 = 1.70$       $n_{d2} = 1.84666$   $\nu_{d2} = 23.78$
$r_4 = 36.331$            $d_4 = $(Variable)
$r_5 = \infty$ (Stop)     $d_5 = -0.20$
$r_6 = 4.057$ (Aspheric)  $d_6 = 2.30$       $n_{d3} = 1.58313$   $\nu_{d3} = 59.38$
$r_7 = 100.000$           $d_7 = 0.80$       $n_{d4} = 1.84666$   $\nu_{d4} = 23.78$
$r_8 = 6.615$             $d_8 = 2.40$       $n_{d5} = 1.48749$   $\nu_{d5} = 70.23$
$r_9 = -13.364$           $d_9 = $(Variable)
(Aspheric)
$r_{10} = 50.000$         $d_{10} = 1.20$    $n_{d6} = 1.48749$   $\nu_{d6} = 70.23$
$r_{11} = -50.000$        $d_{11} = $(Variable)
$r_{12} = \infty$         $d_{12} = 1.30$    $n_{d7} = 1.51633$   $\nu_{d7} = 64.14$
$r_{13} = \infty$         $d_{13} = $(Variable)
$r_{14} = \infty$(Image plane)

Aspherical Coefficients

2nd surface $K = -0.332$
$A_4 = -1.50043 \times 10^{-3}$
$A_6 = -1.60862 \times 10^{-4}$
$A_8 = 3.25971 \times 10^{-6}$
$A_{10} = 6.05120 \times 10^{-10}$ 6th surface $K = -1.287$
$A_4 = 1.60279 \times 10^{-3}$
$A_6 = 7.70238 \times 10^{-5}$
$A_8 = -8.90829 \times 10^{-6}$
$A_{10} = 8.95272 \times 10^{-7}$ -continued 9th surface $K = 0.000$
$A_4 = 3.47544 \times 10^{-3}$
$A_6 = 4.02997 \times 10^{-4}$
$A_8 = 3.07449 \times 10^{-6}$
$A_{10} = 2.96993 \times 10^{-8}$ Zooming Data ($\infty$)

|  | WE | ST | TE |
|---|---|---|---|
| f (mm) | 5.905 | 7.995 | 11.496 |
| $F_{NO}$ | 3.46 | 4.01 | 4.92 |
| $\omega$ (°) | 31.2 | 23.6 | 16.6 |
| $d_4$ | 6.30 | 3.66 | 1.30 |
| $d_9$ | 6.45 | 8.89 | 12.18 |
| $d_{11}$ | 0.80 | 0.80 | 0.80 |
| $d_{13}$ | 1.32 | 1.03 | 1.36 |

EXAMPLE 7

$r_1 = -413.848$          $d_1 = 1.00$       $n_{d1} = 1.80610$   $\nu_{d1} = 40.92$
$r_2 = 3.317$ (Aspheric)  $d_2 = 1.48$
$r_3 = 7.388$             $d_3 = 1.70$       $n_{d2} = 1.84666$   $\nu_{d2} = 23.78$
$r_4 = 43.892$            $d_4 = $(Variable)
$r_5 = \infty$ (Stop)     $d_5 = -0.20$
$r_6 = 4.055$ (Aspheric)  $d_6 = 2.19$       $n_{d3} = 1.58313$   $\nu_{d3} = 59.38$
$r_7 = 100.000$           $d_7 = 1.13$       $n_{d4} = 1.84666$   $\nu_{d4} = 23.78$
$r_8 = 6.376$             $d_8 = 2.43$       $n_{d5} = 1.48749$   $\nu_{d5} = 70.23$
$r_9 = -15.930$           $d_9 = $(Variable)
(Aspheric)
$r_{10} = 44.301$         $d_{10} = 1.20$    $n_{d6} = 1.48749$   $\nu_{d6} = 70.23$
$r_{11} = -44.574$        $d_{11} = $(Variable)
$r_{12} = \infty$         $d_{12} = 1.30$    $n_{d7} = 1.51633$   $\nu_{d7} = 64.14$
$r_{13} = \infty$         $d_{13} = $(Variable)
$r_{14} = \infty$(Image plane)

Aspherical Coefficients

2nd surface $K = -0.341$
$A_4 = -1.57613 \times 10^{-3}$
$A_6 = -1.57295 \times 10^{-4}$
$A_8 = 3.25595 \times 10^{-6}$
$A_{10} = 6.64658 \times 10^{-10}$ 6th surface $K = -1.258$
$A_4 = 1.50474 \times 10^{-3}$
$A_6 = 7.67463 \times 10^{-5}$
$A_8 = -8.90504 \times 10^{-6}$
$A_{10} = 8.95276 \times 10^{-7}$ 9th surface $K = 0.000$
$A_4 = 3.48874 \times 10^{-3}$
$A_6 = 4.00153 \times 10^{-4}$
$A_8 = 3.07420 \times 10^{-6}$
$A_{10} = 2.96881 \times 10^{-8}$ Zooming Data ($\infty$)

|  | WE | ST | TE |
|---|---|---|---|
| f (mm) | 5.902 | 7.994 | 11.498 |
| $F_{NO}$ | 3.53 | 4.24 | 5.00 |
| $\omega$ (°) | 30.2 | 22.9 | 16.3 |
| $d_4$ | 6.20 | 4.05 | 1.00 |
| $d_9$ | 3.46 | 8.69 | 8.12 |
| $d_{11}$ | 3.68 | 0.78 | 5.04 |
| $d_{13}$ | 1.16 | 1.23 | 1.23 |

EXAMPLE 8

| | | | |
|---|---|---|---|
| $r_1 = 37.691$ | $d_1 = 1.20$ | $n_{d1} = 1.80495$ | $\nu_{d1} = 40.93$ |
| $r_2 = 4.362$ (Aspheric) | $d_2 = 2.33$ | | |
| $r_3 = 8.294$ | $d_3 = 1.62$ | $n_{d2} = 1.84666$ | $\nu_{d2} = 23.78$ |
| $r_4 = 16.326$ | $d_4 =$ (Variable) | | |
| $r_5 = \infty$ (Stop) | $d_5 = -0.26$ | | |
| $r_6 = 4.636$ (Aspheric) | $d_6 = 4.02$ | $n_{d3} = 1.51635$ | $\nu_{d3} = 64.02$ |
| $r_7 = 30.000$ | $d_7 = 1.14$ | $n_{d4} = 1.80810$ | $\nu_{d4} = 22.76$ |
| $r_8 = 7.183$ | $d_8 = 1.29$ | $n_{d5} = 1.51635$ | $\nu_{d5} = 64.02$ |
| $r_9 = -25.382$ (Aspheric) | $d_9 =$ (Variable) | | |
| $r_{10} = \infty$ | $d_{10} = 0.76$ | $n_{d6} = 1.54771$ | $\nu_{d6} = 62.84$ |
| $r_{11} = \infty$ | $d_{11} = 0.50$ | | |
| $r_{12} = \infty$ | $d_{12} = 0.50$ | $n_{d7} = 1.51633$ | $\nu_{d7} = 64.14$ |
| $r_{13} = \infty$ | $d_{13} = 0.37$ | | |
| $r_{14} = \infty$ (Image plane) | | | |

Aspherical Coefficients

2nd surface $K = -0.704$
$A_4 = 2.01910 \times 10^{-4}$
$A_6 = -1.91890 \times 10^{-7}$
$A_8 = 1.20310 \times 10^{-8}$
$A_{10} = -7.41780 \times 10^{-10}$ 6th surface $K = -1.860$
$A_4 = 1.68779 \times 10^{-3}$
$A_6 = 5.98250 \times 10^{-5}$
$A_8 = -9.36385 \times 10^{-6}$
$A_{10} = 6.02976 \times 10^{-7}$ 9th surface $K = -10.683$
$A_4 = 1.92469 \times 10^{-3}$
$A_6 = 3.36702 \times 10^{-4}$
$A_8 = -5.00279 \times 10^{-5}$
$A_{10} = 5.80240 \times 10^{-6}$

Zooming Data ($\infty$)

| | WE | ST | TE |
|---|---|---|---|
| f (mm) | 5.95 | 10.08 | 17.05 |
| $F_{NO}$ | 3.15 | 3.98 | 5.39 |
| $2\omega$ (°) | 64.41 | 39.67 | 23.88 |
| $d_4$ | 12.66 | 5.55 | 1.37 |
| $d_9$ | 8.97 | 12.68 | 18.93 |

EXAMPLE 9

| | | | |
|---|---|---|---|
| $r_1 = 37.691$ | $d_1 = 1.20$ | $n_{d1} = 1.80495$ | $\nu_{d1} = 40.93$ |
| $r_2 = 4.362$ (Aspheric) | $d_2 = 2.33$ | | |
| $r_3 = 8.294$ | $d_3 = 1.62$ | $n_{d2} = 1.84666$ | $\nu_{d2} = 23.78$ |
| $r_4 = 16.326$ | $d_4 =$ (Variable) | | |
| $r_5 = \infty$ (Stop) | $d_5 = -0.26$ | | |
| $r_6 = 4.623$ (Aspheric) | $d_6 = 4.23$ | $n_{d3} = 1.51603$ | $\nu_{d3} = 64.02$ |
| $r_7 = 100.000$ | $d_7 = 1.09$ | $n_{d4} = 1.80810$ | $\nu_{d4} = 22.76$ |
| $r_8 = 8.719$ | $d_8 = 1.13$ | $n_{d5} = 1.51603$ | $\nu_{d5} = 64.02$ |
| $r_9 = -25.844$ (Aspheric) | $d_9 =$ (Variable) | | |
| $r_{10} = \infty$ | $d_{10} = 0.76$ | $n_{d6} = 1.54771$ | $\nu_{d6} = 62.84$ |
| $r_{11} = \infty$ | $d_{11} = 0.50$ | | |
| $r_{12} = \infty$ | $d_{12} = 0.50$ | $n_{d7} = 1.51633$ | $\nu_{d7} = 64.14$ |
| $r_{13} = \infty$ | $d_{13} = 0.37$ | | |
| $r_{14} = \infty$ (Image plane) | | | |

Aspherical Coefficients

2nd surface $K = -0.704$
$A_4 = 2.01910 \times 10^{-4}$
$A_6 = -1.91890 \times 10^{-7}$
$A_8 = 1.20310 \times 10^{-8}$
$A_{10} = -7.41780 \times 10^{-10}$ 6th surface $K = -3.132$
$A_4 = 3.33055 \times 10^{-3}$
$A_6 = -4.83274 \times 10^{-5}$
$A_8 = -3.28992 \times 10^{-6}$
$A_{10} = 4.12519 \times 10^{-7}$ 9th surface $K = -10.671$
$A_4 = 2.03797 \times 10^{-3}$
$A_6 = 3.37686 \times 10^{-4}$
$A_8 = -4.96072 \times 10^{-5}$
$A_{10} = 5.80349 \times 10^{-6}$

Zooming Data ($\infty$)

| | WE | ST | TE |
|---|---|---|---|
| f (mm) | 5.95 | 10.08 | 17.05 |
| $F_{NO}$ | 3.15 | 3.98 | 5.39 |
| $2\omega$ (°) | 64.40 | 39.67 | 23.88 |
| $d_4$ | 12.66 | 5.55 | 1.37 |
| $d_9$ | 8.95 | 12.66 | 18.92 |

EXAMPLE 10

| | | | |
|---|---|---|---|
| $r_1 = 37.691$ | $d_1 = 1.20$ | $n_{d1} = 1.80495$ | $\nu_{d1} = 40.93$ |
| $r_2 = 4.362$ (Aspheric) | $d_2 = 2.33$ | | |
| $r_3 = 8.294$ | $d_3 = 1.62$ | $n_{d2} = 1.84666$ | $\nu_{d2} = 23.78$ |
| $r_4 = 16.326$ | $d_4 =$ (Variable) | | |
| $r_5 = \infty$ (Stop) | $d_5 = -0.26$ | | |
| $r_6 = 4.607$ (Aspheric) | $d_6 = 4.24$ | $n_{d3} = 1.51603$ | $\nu_{d3} = 64.02$ |
| $r_7 = \infty$ | $d_7 = 1.10$ | $n_{d4} = 1.80810$ | $\nu_{d4} = 22.76$ |
| $r_8 = 9.612$ | $d_8 = 1.13$ | $n_{d5} = 1.51603$ | $\nu_{d5} = 64.02$ |
| $r_9 = -26.572$ (Aspheric) | $d_9 =$ (Variable) | | |
| $r_{10} = \infty$ | $d_{10} = 0.76$ | $n_{d6} = 1.54771$ | $\nu_{d6} = 62.84$ |
| $r_{11} = \infty$ | $d_{11} = 0.50$ | | |
| $r_{12} = \infty$ | $d_{12} = 0.50$ | $n_{d7} = 1.51633$ | $\nu_{d7} = 64.14$ |
| $r_{13} = \infty$ | $d_{13} = 0.37$ | | |
| $r_{14} = \infty$ (Image plane) | | | |

Aspherical Coefficients

2nd surface $K = -0.704$
$A_4 = 2.01910 \times 10^{-4}$
$A_6 = -1.91890 \times 10^{-7}$
$A_8 = 1.20310 \times 10^{-8}$
$A_{10} = -7.41780 \times 10^{-10}$ 6th surface $K = -3.131$
$A_4 = 3.37249 \times 10^{-3}$
$A_6 = -4.66743 \times 10^{-5}$
$A_8 = -3.92163 \times 10^{-6}$
$A_{10} = 4.65697 \times 10^{-7}$ 9th surface $K = -10.671$
$A_4 = 2.08460 \times 10^{-3}$
$A_6 = 3.53565 \times 10^{-4}$
$A_8 = -5.49632 \times 10^{-5}$
$A_{10} = 6.38510 \times 10^{-6}$

Zooming Data ($\infty$)

| | WE | ST | TE |
|---|---|---|---|
| f (mm) | 5.95 | 10.08 | 17.05 |
| $F_{NO}$ | 3.15 | 3.98 | 5.39 |

-continued

| | | | |
|---|---|---|---|
| 2ω (°) | 64.40 | 39.67 | 23.88 |
| $d_4$ | 12.66 | 5.55 | 1.37 |
| $d_9$ | 8.94 | 12.65 | 18.91 |

EXAMPLE 11

| | | | |
|---|---|---|---|
| $r_1 = 37.691$ | $d_1 = 1.20$ | $n_{d1} = 1.80495$ | $v_{d1} = 40.93$ |
| $r_2 = 4.362$ (Aspheric) | $d_2 = 2.33$ | | |
| $r_3 = 8.294$ | $d_3 = 1.62$ | $n_{d2} = 1.84666$ | $v_{d2} = 23.78$ |
| $r_4 = 16.326$ | $d_4 =$ (Variable) | | |
| $r_5 = \infty$ (Stop) | $d_5 = -0.26$ | | |
| $r_6 = 4.603$ (Aspheric) | $d_6 = 4.24$ | $n_{d3} = 1.51603$ | $v_{d3} = 64.02$ |
| $r_7 = -300.000$ | $d_7 = 1.10$ | $n_{d4} = 1.80810$ | $v_{d4} = 22.76$ |
| $r_8 = 9.954$ | $d_8 = 1.13$ | $n_{d5} = 1.51603$ | $v_{d5} = 64.02$ |
| $r_9 = -26.804$ (Aspheric) | $d_9 =$ (Variable) | | |
| $r_{10} = \infty$ | $d_{10} = 0.76$ | $n_{d6} = 1.54771$ | $v_{d6} = 62.84$ |
| $r_{11} = \infty$ | $d_{11} = 0.50$ | | |
| $r_{12} = \infty$ | $d_{12} = 0.50$ | $n_{d7} = 1.51633$ | $v_{d7} = 64.14$ |
| $r_{13} = \infty$ | $d_{13} = 0.38$ | | |
| $r_{14} = \infty$ (Image plane) | | | |

Aspherical Coefficients

2nd surface $K = -0.704$
$A_4 = 2.01910 \times 10^{-4}$
$A_6 = -1.91890 \times 10^{-7}$
$A_8 = 1.20310 \times 10^{-8}$
$A_{10} = -7.41780 \times 10^{-10}$ 6th surface $K = -3.131$
$A_4 = 3.38882 \times 10^{-3}$
$A_6 = -4.78149 \times 10^{-5}$
$A_8 = -3.72655 \times 10^{-6}$
$A_{10} = 4.44776 \times 10^{-7}$ 9th surface $K = -10.671$
$A_4 = 2.10306 \times 10^{-3}$
$A_6 = 3.52644 \times 10^{-4}$
$A_8 = -5.41202 \times 10^{-5}$
$A_{10} = 6.22955 \times 10^{-6}$ Zooming Data (∞)

| | WE | ST | TE |
|---|---|---|---|
| f (mm) | 5.95 | 10.08 | 17.05 |
| $F_{NO}$ | 3.15 | 3.98 | 5.39 |
| 2ω (°) | 64.40 | 39.67 | 23.88 |
| $d_4$ | 12.66 | 5.55 | 1.37 |
| $d_9$ | 8.93 | 12.64 | 18.90 |

EXAMPLE 12

| | | | |
|---|---|---|---|
| $r_1 = 37.691$ | $d_1 = 1.20$ | $n_{d1} = 1.80495$ | $v_{d1} = 40.93$ |
| $r_2 = 4.362$ (Aspheric) | $d_2 = 2.33$ | | |
| $r_3 = 8.294$ | $d_3 = 1.62$ | $n_{d2} = 1.84666$ | $v_{d2} = 23.78$ |
| $r_4 = 16.326$ | $d_4 =$ (Variable) | | |
| $r_5 = \infty$ (Stop) | $d_5 = -0.26$ | | |
| $r_6 = 4.300$ (Aspheric) | $d_6 = 4.31$ | $n_{d3} = 1.51742$ | $v_{d3} = 52.43$ |
| $r_7 = -5.152$ | $d_7 = 1.20$ | $n_{d4} = 1.80810$ | $v_{d4} = 22.76$ |
| $r_8 = -20.000$ | $d_8 = 0.95$ | $n_{d5} = 1.51603$ | $v_{d5} = 64.02$ |
| $r_9 = -24.338$ (Aspheric) | $d_9 =$ (Variable) | | |
| $r_{10} = \infty$ | $d_{10} = 0.76$ | $n_{d6} = 1.54771$ | $v_{d6} = 62.84$ |
| $r_{11} = \infty$ | $d_{11} = 0.50$ | | |
| $r_{12} = \infty$ | $d_{12} = 0.50$ | $n_{d7} = 1.51633$ | $v_{d7} = 64.14$ |
| $r_{13} = \infty$ | $d_{13} = 0.37$ | | |
| $r_{14} = \infty$ (Image plane) | | | |

Aspherical Coefficients

2nd surface $K = -0.704$
$A_4 = 2.01910 \times 10^{-4}$
$A_6 = -1.91890 \times 10^{-7}$
$A_8 = 1.20310 \times 10^{-8}$
$A_{10} = -7.41780 \times 10^{-10}$ 6th surface $K = -3.112$
$A_4 = 4.54021 \times 10^{-3}$
$A_6 = -8.58413 \times 10^{-5}$
$A_8 = 2.62817 \times 10^{-6}$
$A_{10} = 2.91567 \times 10^{-7}$ 9th surface $K = -10.670$
$A_4 = 2.43162 \times 10^{-3}$
$A_6 = 3.02302 \times 10^{-4}$
$A_8 = -2.43703 \times 10^{-5}$
$A_{10} = 3.51356 \times 10^{-6}$ Zooming Data (∞)

| | WE | ST | TE |
|---|---|---|---|
| f (mm) | 5.96 | 10.09 | 17.05 |
| $F_{NO}$ | 3.16 | 3.98 | 5.39 |
| 2ω (°) | 64.32 | 39.64 | 23.89 |
| $d_4$ | 12.66 | 5.55 | 1.37 |
| $d_9$ | 8.94 | 12.66 | 18.93 |

EXAMPLE 13

| | | | |
|---|---|---|---|
| $r_1 = 51.401$ | $d_1 = 1.20$ | $n_{d1} = 1.80495$ | $v_{d1} = 40.93$ |
| $r_2 = 4.250$ (Aspheric) | $d_2 = 2.33$ | | |
| $r_3 = 8.280$ | $d_3 = 1.62$ | $n_{d2} = 1.84666$ | $v_{d2} = 23.78$ |
| $r_4 = 16.031$ | $d_4 =$ (Variable) | | |
| $r_5 = \infty$ (Stop) | $d_5 = -0.26$ | | |
| $r_6 = 4.690$ (Aspheric) | $d_6 = 4.00$ | $n_{d3} = 1.51603$ | $v_{d3} = 64.02$ |
| $r_7 = 48.276$ | $d_7 = 1.09$ | $n_{d4} = 1.80810$ | $v_{d4} = 22.76$ |
| $r_8 = 8.996$ | $d_8 = 1.13$ | $n_{d5} = 1.51603$ | $v_{d5} = 64.02$ |
| $r_9 = -32.723$ (Aspheric) | $d_9 =$ (Variable) | | |
| $r_{10} = \infty$ | $d_{10} = 0.76$ | $n_{d6} = 1.54771$ | $v_{d6} = 62.84$ |
| $r_{11} = \infty$ | $d_{11} = 0.50$ | | |
| $r_{12} = \infty$ | $d_{12} = 0.50$ | $n_{d7} = 1.51633$ | $v_{d7} = 64.14$ |
| $r_{13} = \infty$ | $d_{13} = 0.37$ | | |
| $r_{14} = \infty$ (Image plane) | | | |

Aspherical Coefficients

2nd surface $K = -0.704$
$A_4 = 2.01910 \times 10^{-4}$
$A_6 = -1.91890 \times 10^{-7}$
$A_8 = 1.20310 \times 10^{-8}$
$A_{10} = -7.41780 \times 10^{-10}$ 6th surface $K = -3.132$
$A_4 = 3.33772 \times 10^{-3}$
$A_6 = -4.81743 \times 10^{-5}$
$A_8 = -4.35927 \times 10^{-6}$
$A_{10} = 5.17931 \times 10^{-7}$ 9th surface $K = -10.671$
$A_4 = 2.15229 \times 10^{-3}$
$A_6 = 3.18975 \times 10^{-4}$ -continued $A_8 = -5.59975 \times 10^{-5}$
$A_{10} = 6.63410 \times 10^{-6}$

Zooming Data (∞)

|  | WE | ST | TE |
|---|---|---|---|
| f (mm) | 5.85 | 10.56 | 20.05 |
| $F_{NO}$ | 3.32 | 4.39 | 6.58 |
| 2ω (°) | 66.60 | 38.16 | 20.40 |
| $d_4$ | 12.66 | 5.55 | 1.37 |
| $d_9$ | 9.84 | 14.64 | 24.30 |

EXAMPLE 14

| | | | |
|---|---|---|---|
| $r_1 = 37.691$ | $d_1 = 1.20$ | $n_{d1} = 1.80495$ | $\nu_{d1} = 40.93$ |
| $r_2 = 4.450$ (Aspheric) | $d_2 = 2.33$ | | |
| $r_3 = 8.294$ | $d_3 = 1.62$ | $n_{d2} = 1.84666$ | $\nu_{d2} = 23.78$ |
| $r_4 = 16.326$ | $d_4 = $ (Variable) | | |
| $r_5 = \infty$ (Stop) | $d_5 = -0.26$ | | |
| $r_6 = 4.441$ | $d_6 = 3.89$ | $n_{d3} = 1.51603$ | $\nu_{d3} = 64.02$ |
| $r_7 = -9.298$ | $d_7 = 0.98$ | $n_{d4} = 1.80810$ | $\nu_{d4} = 22.76$ |
| $r_8 = -279.238$ | $d_8 = 0.74$ | $n_{d5} = 1.51603$ | $\nu_{d5} = 64.02$ |
| $r_9 = -60.000$ (Aspheric) | $d_9 = $ (Variable) | | |
| $r_{10} = \infty$ | $d_{10} = 0.76$ | $n_{d6} = 1.54771$ | $\nu_{d6} = 62.84$ |
| $r_{11} = \infty$ | $d_{11} = 0.50$ | | |
| $r_{12} = \infty$ | $d_{12} = 0.50$ | $n_{d7} = 1.51633$ | $\nu_{d7} = 64.14$ |
| $r_{13} = \infty$ | $d_{13} = 0.37$ | | |
| $r_{14} = \infty$ (Image plane) | | | |

Aspherical Coefficients

2nd surface $K = -0.705$
$A_2 = -5.57868 \times 10^{-3}$
$A_4 = 3.37216 \times 10^{-5}$
$A_6 = 4.60028 \times 10^{-5}$
$A_8 = -4.71414 \times 10^{-6}$
$A_{10} = 1.61550 \times 10^{-7}$ 9th surface $K = -10.651$
$A_4 = 3.53185 \times 10^{-3}$
$A_6 = 1.08265 \times 10^{-4}$
$A_8 = 2.25584 \times 10^{-5}$
$A_{10} = -2.80053 \times 10^{-8}$

Zooming Data (∞)

|  | WE | ST | TE |
|---|---|---|---|
| f (mm) | 6.66 | 10.88 | 17.35 |
| $F_{NO}$ | 3.27 | 4.06 | 5.28 |
| 2ω (°) | 58.61 | 36.89 | 23.47 |
| $d_4$ | 12.66 | 5.55 | 1.37 |
| $d_9$ | 9.80 | 13.25 | 18.54 |

EXAMPLE 15

| | | | |
|---|---|---|---|
| $r_1 = 37.691$ | $d_1 = 1.20$ | $n_{d1} = 1.80400$ | $\nu_{d1} = 46.57$ |
| $r_2 = 4.393$ (Aspheric) | $d_2 = 2.33$ | | |
| $r_3 = 8.294$ | $d_3 = 1.62$ | $n_{d2} = 1.84666$ | $\nu_{d2} = 23.78$ |
| $r_4 = 16.326$ | $d_4 = $ (Variable) | | |
| $r_5 = \infty$ (Stop) | $d_5 = -0.26$ | | |
| $r_6 = 4.567$ (Aspheric) | $d_6 = 3.01$ | $n_{d3} = 1.49700$ | $\nu_{d3} = 81.54$ |
| $r_7 = 66.799$ | $d_7 = 1.67$ | $n_{d4} = 1.92286$ | $\nu_{d4} = 18.90$ |
| $r_8 = 13.949$ | $d_8 = 1.11$ | $n_{d5} = 1.51603$ | $\nu_{d5} = 64.02$ |
| $r_9 = -32.135$ (Aspheric) | $d_9 = $ (Variable) | | |
| $r_{10} = \infty$ | $d_{10} = 0.76$ | $n_{d6} = 1.54771$ | $\nu_{d6} = 62.84$ |
| $r_{11} = \infty$ | $d_{11} = 0.50$ | | |
| $r_{12} = \infty$ | $d_{12} = 0.50$ | $n_{d7} = 1.51633$ | $\nu_{d7} = 64.14$ |
| $r_{13} = \infty$ | $d_{13} = 0.37$ | | |
| $r_{14} = \infty$ (Image plane) | | | |

Aspherical Coefficients

2nd surface $K = -0.704$
$A_4 = 2.10637 \times 10^{-4}$
$A_6 = 1.07255 \times 10^{-6}$
$A_8 = -3.71750 \times 10^{-8}$
$A_{10} = 5.72629 \times 10^{-9}$ 6th surface $K = -3.130$
$A_4 = 4.08852 \times 10^{-3}$
$A_6 = -1.44925 \times 10^{-4}$
$A_8 = 1.73649 \times 10^{-6}$
$A_{10} = 7.90457 \times 10^{-7}$ 9th surface $K = -10.672$
$A_4 = 3.03679 \times 10^{-3}$
$A_6 = 1.53844 \times 10^{-4}$
$A_8 = -7.79567 \times 10^{-5}$
$A_{10} = 1.49615 \times 10^{-5}$

Zooming Data (∞)

|  | WE | ST | TE |
|---|---|---|---|
| f (mm) | 5.96 | 10.00 | 16.64 |
| $F_{NO}$ | 3.13 | 3.92 | 5.24 |
| 2ω (°) | 64.81 | 40.07 | 24.48 |
| $d_4$ | 12.66 | 5.55 | 1.37 |
| $d_9$ | 9.50 | 13.08 | 18.96 |

EXAMPLE 16

| | | | |
|---|---|---|---|
| $r_1 = 37.691$ | $d_1 = 1.20$ | $n_{d1} = 1.80495$ | $\nu_{d1} = 40.93$ |
| $r_2 = 4.362$ (Aspheric) | $d_2 = 2.33$ | | |
| $r_3 = 8.294$ | $d_3 = 1.62$ | $n_{d2} = 1.84666$ | $\nu_{d2} = 23.78$ |
| $r_4 = 16.326$ | $d_4 = $ (Variable) | | |
| $r_5 = \infty$ (Stop) | $d_5 = -0.26$ | | |
| $r_6 = 4.538$ (Aspheric) | $d_6 = 4.20$ | $n_{d3} = 1.51603$ | $\nu_{d3} = 64.02$ |
| $r_7 = 96.074$ | $d_7 = 1.05$ | $n_{d4} = 1.80810$ | $\nu_{d4} = 22.76$ |
| $r_8 = 8.579$ | $d_8 = 1.08$ | $n_{d5} = 1.51603$ | $\nu_{d5} = 64.02$ |
| $r_9 = -28.441$ (Aspheric) | $d_9 = $ (Variable) | | |
| $r_{10} = 211.718$ | $d_{10} = 0.71$ | $n_{d6} = 1.49700$ | $\nu_{d6} = 81.54$ |
| $r_{11} = 102.523$ | $d_{11} = $ (Variable) | | |
| $r_{12} = \infty$ | $d_{12} = 0.76$ | $n_{d7} = 1.54771$ | $\nu_{d7} = 62.84$ |
| $r_{13} = \infty$ | $d_{13} = 0.50$ | | |
| $r_{14} = \infty$ | $d_{14} = 0.50$ | $n_{d8} = 1.51633$ | $\nu_{d8} = 64.14$ |
| $r_{15} = \infty$ | $d_{15} = 0.37$ | | |
| $r_{16} = \infty$ (Image plane) | | | |

Aspherical Coefficients

2nd surface $K = -0.704$
$A_4 = 2.01910 \times 10^{-4}$
$A_6 = -1.91890 \times 10^{-7}$
$A_8 = 1.20310 \times 10^{-8}$
$A_{10} = -7.41780 \times 10^{-10}$ 6th surface $K = -3.131$
$A_4 = 3.53969 \times 10^{-3}$
$A_6 = -5.76418 \times 10^{-5}$ -continued $A_8 = -2.28407 \times 10^{-6}$
$A_{10} = 3.73706 \times 10^{-7}$ 9th surface $K = -10.671$
$A_4 = 2.22302 \times 10^{-3}$
$A_6 = 3.59589 \times 10^{-4}$
$A_8 = -4.93117 \times 10^{-5}$
$A_{10} = 6.01662 \times 10^{-6}$ Zooming Data (∞)

|  | WE | ST | TE |
|---|---|---|---|
| f (mm) | 5.95 | 10.09 | 17.06 |
| $F_{NO}$ | 3.16 | 3.98 | 5.40 |
| 2ω (°) | 64.35 | 39.64 | 23.87 |
| $d_4$ | 12.66 | 5.55 | 1.37 |
| $d_9$ | 6.05 | 9.77 | 16.11 |
| $d_{11}$ | 2.32 | 2.25 | 0.37 |

EXAMPLE 17

| $r_1 = 37.691$ | $d_1 = 1.20$ | $n_{d1} = 1.80495$ | $\nu_{d1} = 40.93$ |
|---|---|---|---|
| $r_2 = 4.362$ (Aspheric) | $d_2 = 2.33$ | | |
| $r_3 = 8.294$ | $d_3 = 1.62$ | $n_{d2} = 1.84666$ | $\nu_{d2} = 23.78$ |
| $r_4 = 16.326$ | $d_4 = $ (Variable) | | |
| $r_5 = \infty$ (Stop) | $d_5 = -0.26$ | | |
| $r_6 = 4.526$ (Aspheric) | $d_6 = 4.20$ | $n_{d3} = 1.51603$ | $\nu_{d3} = 64.02$ |
| $r_7 = 92.786$ | $d_7 = 1.05$ | $n_{d4} = 1.80810$ | $\nu_{d4} = 22.76$ |
| $r_8 = 8.550$ | $d_8 = 1.08$ | $n_{d5} = 1.51603$ | $\nu_{d5} = 64.02$ |
| $r_9 = -30.010$ (Aspheric) | $d_9 = $ (Variable) | | |
| $r_{10} = 110.638$ | $d_{10} = 0.76$ | $n_{d6} = 1.49700$ | $\nu_{d6} = 81.54$ |
| $r_{11} = 123.617$ | $d_{11} = 2.26$ | | |
| $r_{12} = \infty$ | $d_{12} = 0.76$ | $n_{d7} = 1.54771$ | $\nu_{d7} = 62.84$ |
| $r_{13} = \infty$ | $d_{13} = 0.50$ | | |
| $r_{14} = \infty$ | $d_{14} = 0.50$ | $n_{d8} = 1.51633$ | $\nu_{d8} = 64.14$ |
| $r_{15} = \infty$ | $d_{15} = 0.37$ | | |
| $r_{16} = \infty$ (Image plane) | | | |

Aspherical Coefficients

2nd surface $K = -0.704$
$A_4 = 2.01910 \times 10^{-4}$
$A_6 = -1.91890 \times 10^{-7}$
$A_8 = 1.20310 \times 10^{-8}$
$A_{10} = -7.41780 \times 10^{-10}$ 6th surface $K = -3.131$
$A_4 = 3.54289 \times 10^{-3}$
$A_6 = -4.52245 \times 10^{-5}$
$A_8 = -4.77798 \times 10^{-6}$
$A_{10} = 5.17175 \times 10^{-7}$ 9th surface $K = -10.671$
$A_4 = 2.18272 \times 10^{-3}$
$A_6 = 4.27937 \times 10^{-4}$
$A_8 = -6.90882 \times 10^{-5}$
$A_{10} = 7.84657 \times 10^{-6}$ Zooming Data (∞)

|  | WE | ST | TE |
|---|---|---|---|
| f (mm) | 5.91 | 10.03 | 17.04 |
| $F_{NO}$ | 3.13 | 3.96 | 5.39 |
| 2ω (°) | 64.80 | 39.84 | 23.89 |
| $d_4$ | 12.66 | 5.55 | 1.37 |
| $d_9$ | 6.05 | 9.75 | 16.03 |

FIGS. 18 to 34 are aberration diagrams for Examples 1 to 17 upon focusing on an object point at infinity. In these aberration diagrams, (a), (b) and (c) represent spherical aberrations, astigmatism, distortion and chromatic aberration of magnification at the wide-angle end, in the intermediate setting, and at the telephoto end, respectively, and "FIY" stands for an image height.

Enumerated below are the values of conditions (1) to (6) in Examples 1 to 7, from which the modulus sign is removed.

| Example | (1) | (2) | (3) | (4) | (5) | (6) |
|---|---|---|---|---|---|---|
| 1 | −25.641 | 0.31769 | 45.02 | −1.629 | 1.281 | 1.949 |
| 2 | 6.410 | 0.31769 | 45.02 | −1.481 | 1.246 | 1.942 |
| 3 | 6.410 | 0.33033 | 40.36 | −1.499 | 1.231 | 1.943 |
| 4 | 38.462 | 0.36589 | 46.45 | −1.359 | 1.228 | 1.940 |
| 5 | −118.861 | 0.36589 | 46.45 | −1.402 | 1.281 | 1.947 |
| 6 | 12.821 | 0.36589 | 46.45 | −1.391 | 1.338 | 1.947 |
| 7 | 12.821 | 0.36589 | 46.45 | −1.453 | 1.386 | 1.948 |

The values of conditions (11) to (27) in Examples 8 to 17 are given below.

| Condition | Ex. 8 | Ex. 9 | Ex. 10 |
|---|---|---|---|
| (11) | 0.92 | 0.72 | 0.65 |
| (12) | 3.12 | 3.74 | 3.75 |
| (13) | 6.47 | 21.63 | INF |
| (14) | 0.283 | 0.337 | 0.362 |
| (15) | 41.26 | 41.26 | 41.26 |
| (16) | 22.76 | 22.76 | 22.76 |
| (17) | 64.02 | 64.02 | 64.02 |
| (18) | 1.80810 | 1.80810 | 1.80810 |
| (19) | 1.51635 | 1.51603 | 1.51603 |
| (20) | 0.80 | 0.82 | 0.83 |
| (21) | 1.29 | 1.13 | 1.13 |
| (22) | −0.69 | −0.70 | −0.70 |
| (23) | 3.12 | 10.39 | INF |
| (24) | 0.62 | 0.66 | 0.66 |
| (25) | 3.12 | 10.39 | INF |
| (26) | 0.75 | 0.91 | 1.00 |
| (27) | 0.20 | 0.18 | 0.17 |

| Condition | Ex. 11 | Ex. 12 |
|---|---|---|
| (11) | 0.62 | −0.02 |
| (12) | 3.75 | 4.55 |
| (13) | 65.18 | 1.20 |
| (14) | 0.371 | 0.822 |
| (15) | 41.26 | 41.26 |
| (16) | 22.76 | 22.76 |
| (17) | 64.02 | 64.02 |
| (18) | 1.80810 | 1.80810 |
| (19) | 1.51603 | 1.51603 |
| (20) | 0.83 | 0.67 |
| (21) | 1.13 | 0.33 |
| (22) | −0.71 | −0.70 |
| (23) | −31.16 | −0.54 |
| (24) | 0.66 | 0.67 |
| (25) | 31.16 | 0.54 |
| (26) | 1.03 | 2.08 |
| (27) | 0.17 | 0.15 |

| Condition | Ex. 13 | Ex. 14 | Ex. 15 |
|---|---|---|---|
| (11) | 0.71 | 0.04 | 0.51 |
| (12) | 3.54 | 5.27 | 2.72 |
| (13) | 10.29 | 2.09 | 14.63 |
| (14) | 0.275 | 4.654 | 0.434 |
| (15) | 41.26 | 41.26 | 45.12 |
| (16) | 22.76 | 22.76 | 18.90 |
| (17) | 64.02 | 64.02 | 64.02 |
| (18) | 1.80810 | 1.80810 | 1.92286 |
| (19) | 1.51603 | 1.51603 | 1.51603 |

-continued

| | | | |
|---|---|---|---|
| (20) | 0.82 | 0.69 | 0.81 |
| (21) | 1.13 | 0.31 | 1.11 |
| (22) | −0.75 | −0.86 | −0.75 |
| (23) | 5.01 | −0.97 | 6.94 |
| (24) | 0.64 | 0.69 | 0.52 |
| (25) | 5.01 | −0.97 | 6.94 |
| (26) | 0.93 | 29.00 | 1.45 |
| (27) | 0.18 | 0.13 | 0.19 |

| Condition | Ex. 16 | Ex. 17 |
|---|---|---|
| (11) | 0.70 | 0.70 |
| (12) | 3.91 | 3.91 |
| (13) | 21.17 | 20.45 |
| (14) | 0.084 | 0.069 |
| (15) | 41.26 | 41.26 |
| (16) | 22.76 | 22.76 |
| (17) | 64.02 | 64.02 |
| (18) | 1.80810 | 1.80810 |
| (19) | 1.51603 | 1.51603 |
| (20) | 0.83 | 0.83 |
| (21) | 1.08 | 1.08 |
| (22) | −1.09 | −1.08 |
| (23) | 9.98 | 9.64 |
| (24) | 0.66 | 0.66 |
| (25) | 9.98 | 9.64 |
| (26) | 0.89 | 0.89 |
| (27) | 0.17 | 0.17 |

The present invention may be applied to electronic taking systems wherein object images formed through zoom lenses are received at image pickup devices such as CCDs for taking, inter alia, digital cameras or video cameras as well as PCs and telephone sets which are typical information processors, in particular, easy-to-carry cellular phones. Given below are some such embodiments.

Figure 35:
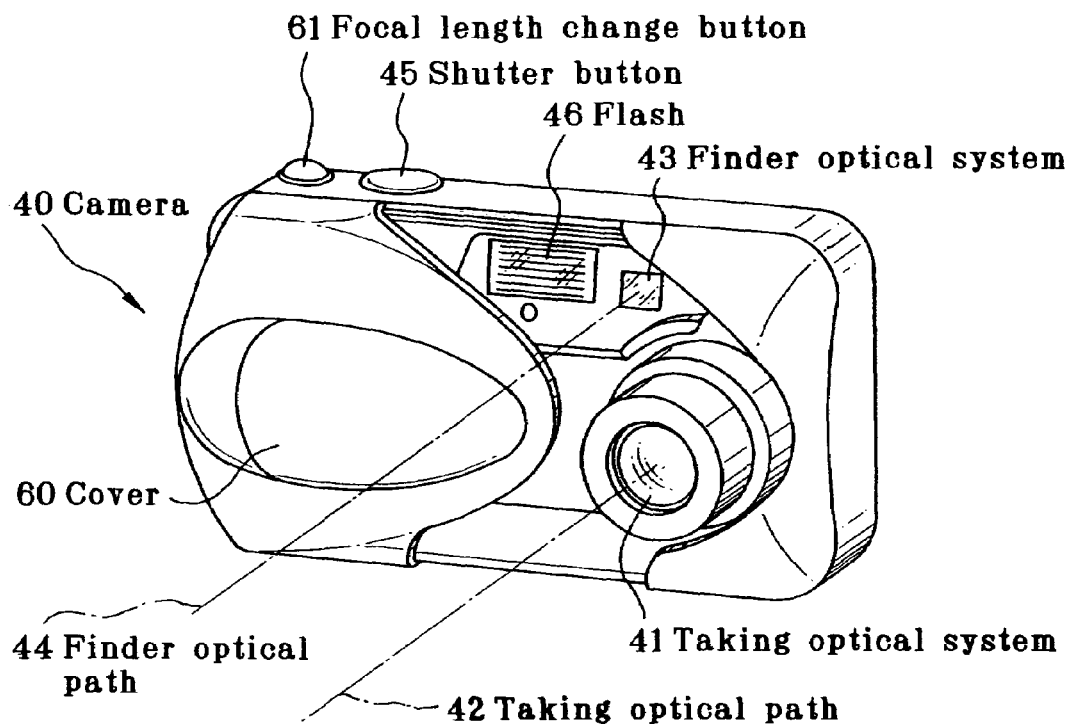
FIG. 35 is a front perspective view illustrative of the outward appearance of a digital camera that incorporates the inventive zoom optical system.
Figure 36:
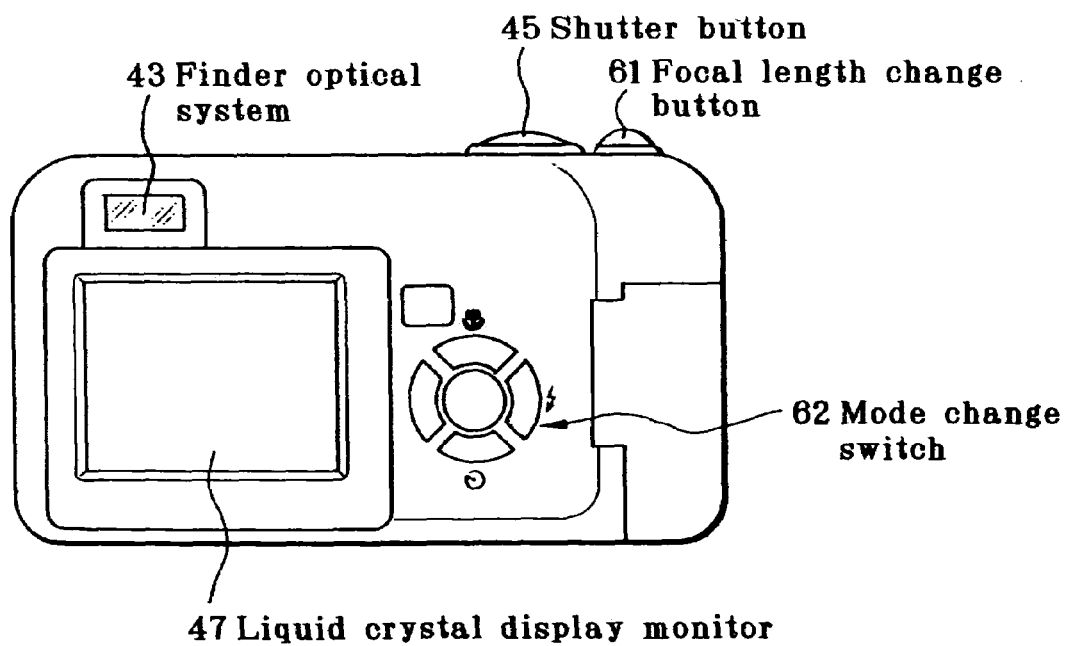
FIG. 36 is a rear perspective view of the digital camera of FIG. 35.
Figure 37:
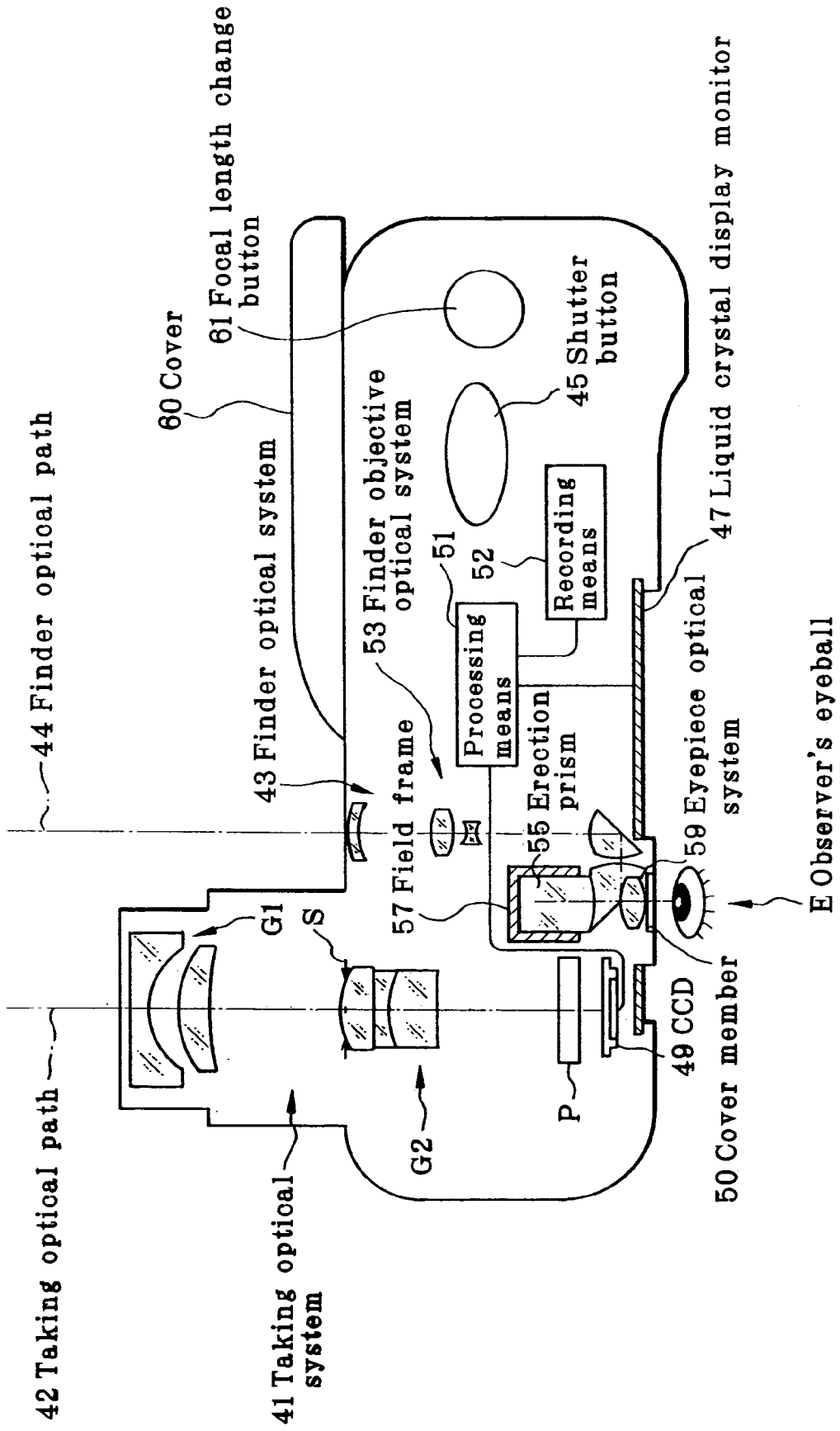
FIG. 37 is a sectional view of the digital camera of FIG. 35.

FIGS. 35, 36 and 37 are conceptual illustrations of a taking optical system 41 for digital cameras, in which the zoom optical system of the invention is built. FIG. 35 is a front perspective view of the outward appearance of a digital camera 40, and FIG. 36 is a rear perspective view of the same. FIG. 37 is a perspective plan view of the construction of the digital camera 40. In FIGS. 35 and 37, the taking optical system is shown as received at a collapsible lens mount. In this embodiment, the digital camera 40 comprises a taking optical system 41 having a taking optical path 42, a finder optical system 43 having a finder optical path 44, a shutter button 45, a flash 46, a liquid crystal display monitor 47, a focal length change button 41, a mode change switch 62 and so on. With the taking optical system 41 received at the collapsible lens mount, a cover 60 is slid to cover the taking optical system 41, finder optical system 43 and flash 46. With the cover 60 opened up to put the camera 40 in a taking mode, the taking optical system 41 comes out of the collapsible lens mount, as shown in FIG. 37. As the shutter 45 mounted on the upper portion of the camera 40 is pressed down, taking takes place through the taking optical system 41, for instance, the zoom optical system of Example 1. An object image formed by the taking optical system 41 is formed on the image pickup plane of a CCD 49 via a low-pass filter provided with an IR cut coating and a cover glass. The object image received at CCD 49 is shown as an electronic image on the liquid crystal monitor 47 via processing means 51, which monitor is mounted on the back of the camera. This processing means 51 is connected with recording means 52 in which the taken electronic image could be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver halide camera using a silver halide film in place of CCD 49.

Moreover, a finder objective optical system 53 is located on the finder optical path 44. The finder objective optical system 53 comprises a plurality of lens groups (three groups in the illustrated embodiment) and two prisms, and provides a zoom optical system with its focal length changing in association with the zoom optical system that is the taking optical system 41. An object image formed by the finder objective optical system 53 is in turn formed on the field frame 57 of an erecting prism 55 that is an image-erecting member. In the rear of the erecting prism 55 there is located an eyepiece optical system 59 for guiding an erected image into the eyeball E of an observer. It is here noted that a cover member 50 is provided on the exit side of the eyepiece optical system 59.

With the thus constructed digital camera 40, it is possible to achieve high performance and size reductions, because the taking optical system 41 is of high performance and small format, and is receivable at a collapsible lens mount.

Figure 38:
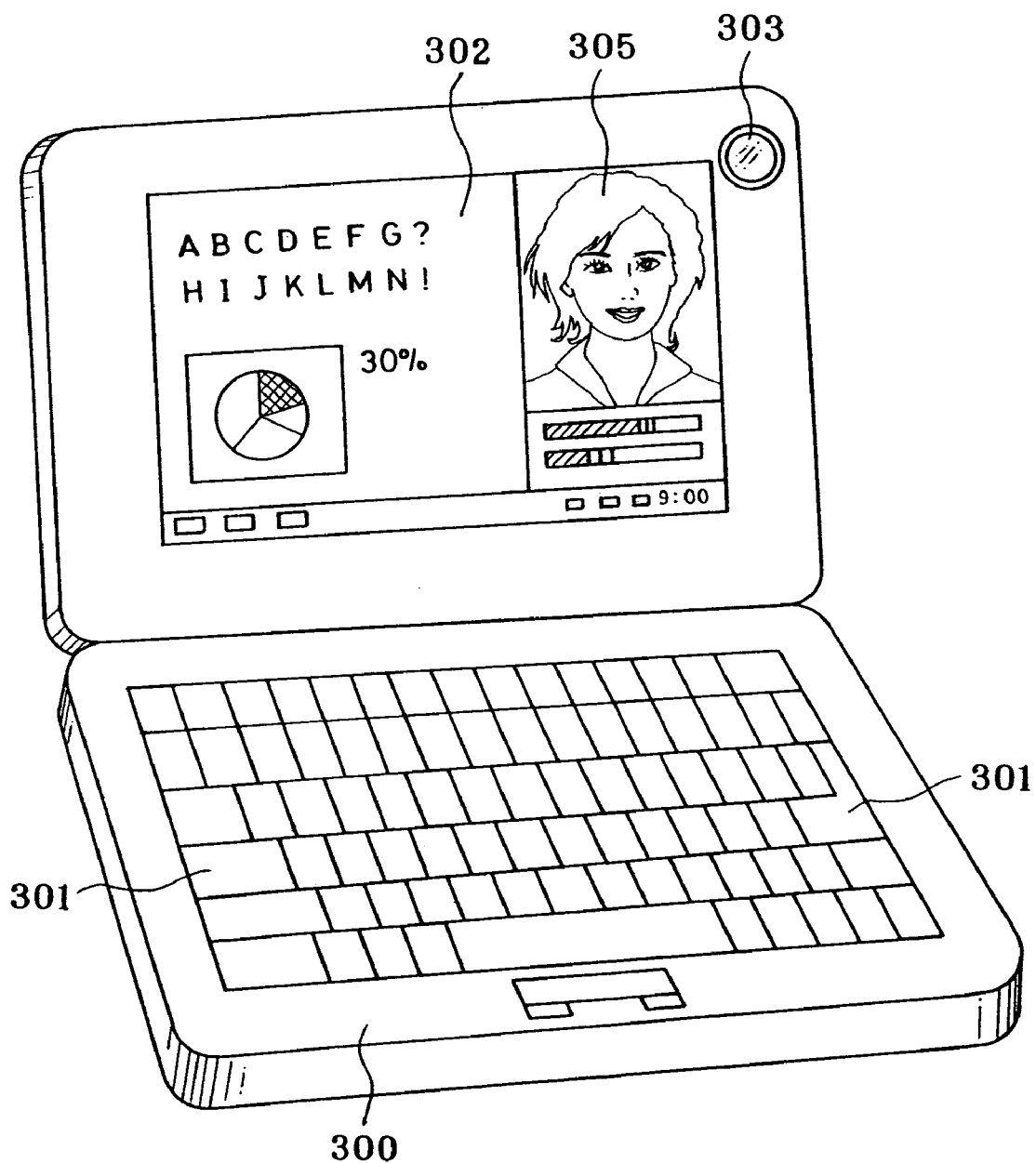
FIG. 38 is a front perspective view of an uncovered personal computer incorporating the inventive zoom optical system in the form of an objective optical system.
Figure 39:
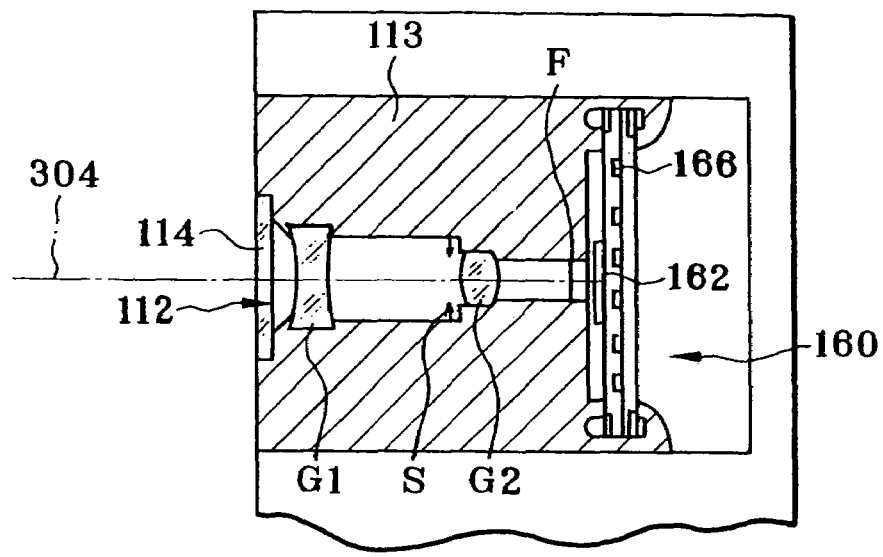
FIG. 39 is a sectional view of a taking optical system in the personal computer.
Figure 40:
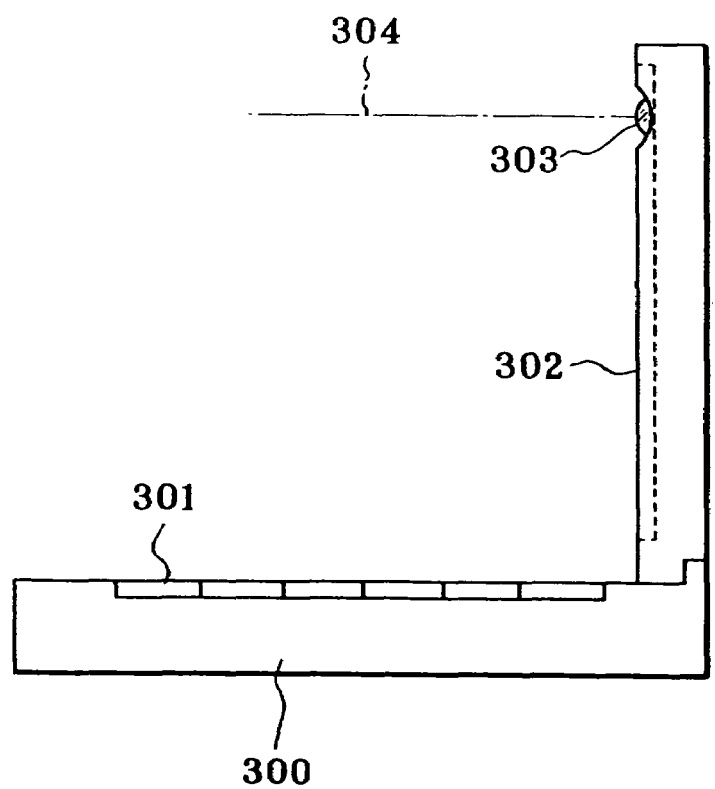
FIG. 40 is a side view of the FIG. 38 state.

FIGS. 38, 39 and 40 are illustrative of a personal computer that is one example of the information processor in which the zoom optical system of the invention is built as an objective optical system. FIG. 38 is a front perspective view of a personal computer 300 with a cover opened up, FIG. 39 is a sectional view of a taking optical system 303 in the personal computer 300, and FIG. 40 is a side view of the state of FIG. 38. As shown in FIGS. 38, 39 and 40, the personal computer 300 comprises a keyboard 301 via which an operator enters information therein from outside, information processing or recording means (not shown), a monitor 302 on which the information is shown for the operator, and a taking optical system 303 for taking an image of the operator and surrounding images. For the monitor 302, use could be made of a transmission type liquid crystal display device illuminated by backlight (not shown) from the back surface, a reflection type liquid crystal display device in which light from the front is reflected to show images, or a CRT display device. While the taking optical system 303 is shown as built in the right upper portion of the monitor 302, it may be located somewhere around the monitor 302 or keyboard 301.

This taking optical system 303 comprises, on a taking optical path 304, an objective lens 112 comprising the optical zoom optical system of the invention (roughly sketched) and an image pickup device chip 162 for receiving an image. These are built in the personal computer 300.

Here an optical low-pass filter F is additionally applied onto the image pickup device chip 162 to form an integral imaging unit 160, which can be fitted into the rear end of the lens barrel 113 of the objective lens 112 in one-touch operation. Thus, the assembling of the objective lens 112 and image pickup device chip 162 is facilitated because of no need of alignment or control of surface-to-surface spacing. The lens barrel 113 is provided at its end with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in the processing means of the personal computer 300, and shown as an electronic image on the monitor 302. As an example, an image 305 taken of the operator is shown in FIG. 38. This image 305 could be shown on a personal computer on the other end at a remote place via suitable processing means and the Internet or telephone line.

Figure 41A:
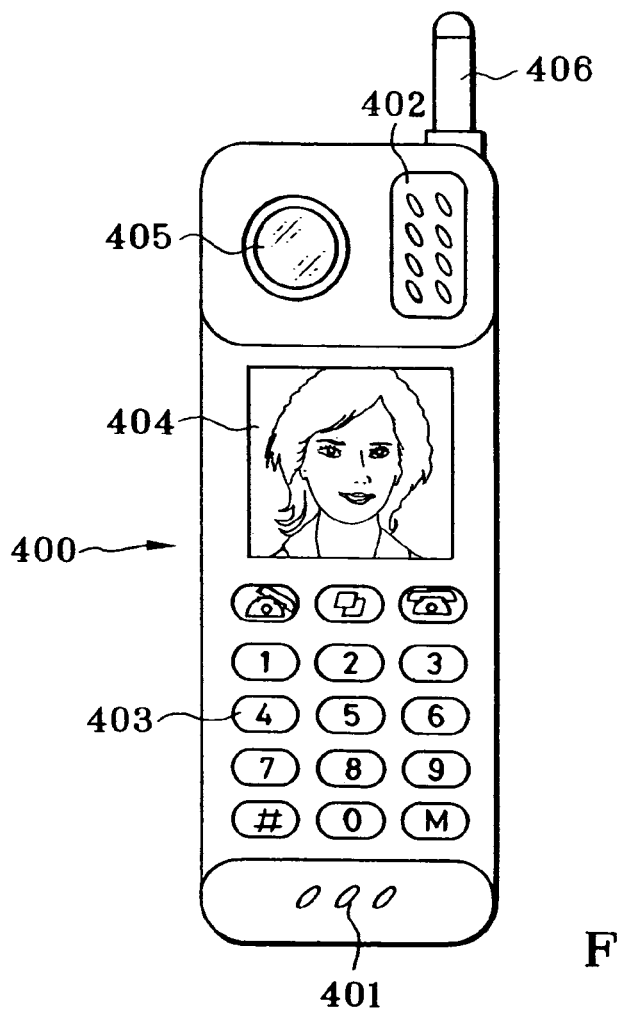
FIGS. 41(a) and 41(b) are a front view and a side view of a cellular phone incorporating the inventive zoom optical system in the form of an objective optical system.
Figure 41B:
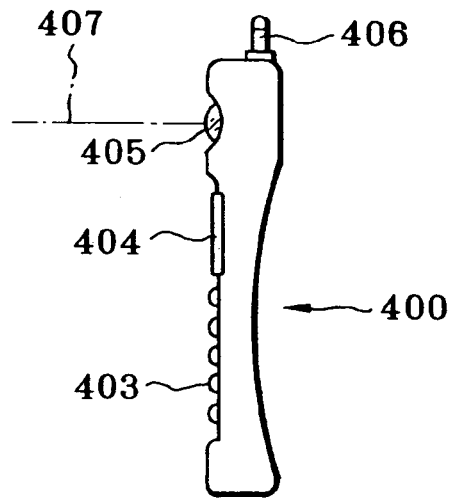
Figure 41C:
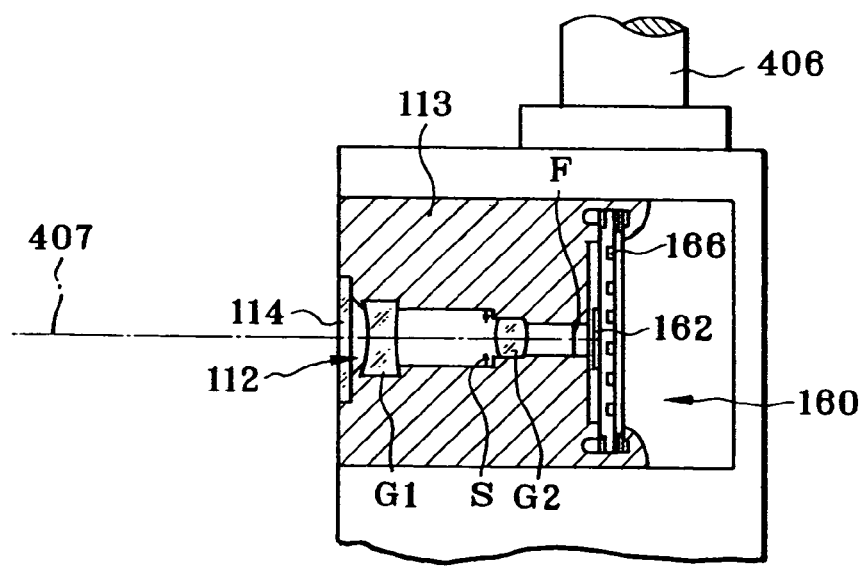
FIG. 41(c) is a side view of a taking optical system in it.

FIGS. 41(a), 42(b) and 42(c) are illustrative of a telephone set that is one example of the information processor in which the zoom optical system of the invention is built in the form of a taking optical system, especially a convenient-to-carry cellular phone. FIG. 41(a) and FIG. 41(b) are a front and a side view of a cellular phone 400, respectively, and FIG. 42(c) is a sectional view of a taking optical system 405. As shown in FIGS. 41(a), 41(b) and 41(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a taking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The-taking optical system 405 comprises, on a taking optical path 407, an objective lens 112 comprising the zoom optical system of the invention and an image pickup device chip 162 for receiving an object image. These are built in the cellular phone 400.

Here an optical low-pass filter F is additionally applied onto the image pickup device chip 162 to form an integral imaging unit 160, which can be fitted into the rear end of the lens barrel 113 of the objective lens 112 in one-touch operation. Thus, the assembling of the objective lens 112 and image pickup device chip 162 is facilitated because of no need of alignment or control of surface-to-surface spacing. The lens barrel 113 is provided at its end with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in processing means (not shown), so that the object image can be displayed as an electronic image on the monitor 404 and/or a monitor on the other end. The processing means also include a signal processing function for converting information about the object image received at the image pickup device chip 162 into transmittable signals, thereby sending the image to the person at the other end.

It is understood that if, in each embodiment, filters such as low-pass filters are removed, the thickness of the camera upon the lenses received at a collapsible lens mount can then be much more reduced.

What we claim is:

1. An optical system comprising a cemented lens having a cementing surface on an optical axis of the optical system, wherein air contact surfaces that are on a light ray entrance side and a light ray exit side of said cemented lens are aspheric and at least one cementing surface in said cemented lens satisfies condition (1):

$$6.4 < |(r/R)| \qquad (1)$$

where r is a radius of curvature of the cementing surface on the optical axis and R is a maximum diameter of the cementing surface.

2. The optical system according to claim 1, wherein said cemented lens comprises a plurality of cementing surfaces.

3. The optical system according to claim 2, wherein said cemented lens has only three lenses.

4. The optical system according to claim 1, wherein:
said optical system is an image-formation optical system that comprises:
a positive lens group of positive refracting power which comprises said cemented lens,
a negative lens group of negative power which, upon zooming, is positioned on an object side of said positive lens group with a variable spacing interposed therebetween, and
an aperture stop located between an exit surface of said negative lens group and an exit surface of said positive lens group.

* * * * *